(12) United States Patent
Mathur

(10) Patent No.: US 9,708,770 B2
(45) Date of Patent: Jul. 18, 2017

(54) PAPER, PAPERBOARD, OR LABEL STOCK COATED WITH FIBROUS STRUCTURED AMORPHOUS SILICA INCLUDING PRECIPITATED CALCIUM CARBONATE

(71) Applicant: PACIFIC NANO PRODUCTS, INC., Renton, WA (US)

(72) Inventor: Vijay K Mathur, Federal Way, WA (US)

(73) Assignee: PACIFIC NANO PRODUCTS, INC., Renton, WA (US)

( * ) Notice: Subject to any disclaimer, the term of this patent is extended or adjusted under 35 U.S.C. 154(b) by 0 days.

(21) Appl. No.: 15/350,615

(22) Filed: Nov. 14, 2016

(65) Prior Publication Data
US 2017/0058458 A1 Mar. 2, 2017

Related U.S. Application Data

(62) Division of application No. 14/262,742, filed on Apr. 26, 2014, now Pat. No. 9,580,867.

(60) Provisional application No. 61/816,649, filed on Apr. 26, 2013.

(51) Int. Cl.
| | | |
|---|---|---|
| D21H 19/58 | (2006.01) | |
| C09C 1/00 | (2006.01) | |
| D21H 19/12 | (2006.01) | |
| D21H 19/40 | (2006.01) | |

(52) U.S. Cl.
CPC ........... *D21H 19/58* (2013.01); *C09C 1/0093* (2013.01); *D21H 19/12* (2013.01); *D21H 19/40* (2013.01); *C01P 2002/72* (2013.01); *C01P 2002/77* (2013.01); *C01P 2004/03* (2013.01); *C01P 2004/45* (2013.01); *C01P 2004/54* (2013.01); *C01P 2004/61* (2013.01); *C01P 2004/80* (2013.01); *C01P 2006/10* (2013.01); *C01P 2006/12* (2013.01); *C01P 2006/22* (2013.01); *C01P 2006/62* (2013.01); *C01P 2006/63* (2013.01); *C01P 2006/65* (2013.01); *Y10T 428/252* (2015.01)

(58) Field of Classification Search
CPC ........ D21H 19/58; D21H 19/12; D21H 19/40; C09C 1/0093; Y10T 428/252; C01P 2002/72; C01P 2002/77; C01P 2004/03; C01P 2004/45; C01P 2004/54; C01P 2004/61; C01P 2004/80; C01P 2006/10; C01P 2006/12; C01P 2006/22; C01P 2006/62; C01P 2006/63; C01P 2006/65
USPC .................................................... 428/537.5
See application file for complete search history.

(56) References Cited

U.S. PATENT DOCUMENTS

| | | | |
|---|---|---|---|
| 3,660,021 A | 5/1972 | Olmsted et al. | |
| 4,167,423 A | 9/1979 | Williams | |
| 4,230,765 A * | 10/1980 | Takahashi | C01B 33/113 106/492 |
| 4,277,457 A | 7/1981 | Taga et al. | |
| 4,294,810 A | 10/1981 | Taga et al. | |
| 4,643,801 A * | 2/1987 | Johnson | D21H 17/29 162/164.1 |
| 4,647,499 A | 3/1987 | Takahashi et al. | |
| 5,219,660 A | 6/1993 | Wason et al. | |
| 5,312,484 A | 5/1994 | Kaliski | |
| 5,370,852 A | 12/1994 | Ikawa et al. | |
| 5,623,013 A * | 4/1997 | Tanaka | C08K 7/10 523/216 |
| 5,750,038 A | 5/1998 | Tsunematsu et al. | |
| 6,010,619 A | 1/2000 | Wise et al. | |
| 6,136,085 A | 10/2000 | Adams, Jr. et al. | |
| 6,251,356 B1 | 6/2001 | Mathur | |
| 6,264,736 B1 | 7/2001 | Knopf et al. | |
| 6,440,209 B1 | 8/2002 | Ravishankar et al. | |
| 6,475,459 B1 | 11/2002 | Virtanen | |
| 6,562,451 B2 | 5/2003 | Syoda et al. | |
| 6,623,555 B1 | 9/2003 | Haverinen et al. | |
| 6,726,807 B1 | 4/2004 | Mathur | |
| 7,048,900 B2 | 5/2006 | Mathur et al. | |
| 7,060,127 B2 | 6/2006 | Tanabe et al. | |
| 7,485,367 B2 | 2/2009 | Chen et al. | |
| 7,611,606 B2 | 11/2009 | Soga et al. | |
| 7,722,850 B2 | 5/2010 | Geerlings et al. | |
| 7,749,476 B2 | 7/2010 | Constanz et al. | |
| 7,758,690 B2 | 7/2010 | Nutbeem et al. | |
| 8,227,028 B2 | 7/2012 | Egami et al. | |
| 8,252,413 B2 | 8/2012 | Shimono et al. | |
| 8,354,169 B2 | 1/2013 | Feeney et al. | |
| 8,415,022 B2 | 4/2013 | Haenen et al. | |

(Continued)

FOREIGN PATENT DOCUMENTS

| | | |
|---|---|---|
| CN | 101970543 A | 2/2011 |
| CN | 101970543 A | 2/2011 |
| EP | 2546410 * | 1/2013 |
| EP | 2546410 A1 | 1/2013 |
| WO | WO 95/03251 | 2/1995 |
| WO | WO 2001/092422 A1 | 12/2001 |
| WO | WO 03/020642 A3 | 3/2003 |
| WO | WO 2003/085199 A2 | 10/2003 |
| WO | WO 2009/142739 A1 | 11/2009 |
| WO | WO 2004/176579 A3 | 10/2014 |

OTHER PUBLICATIONS

Preparation of Uniform Needle-Like Aragonite Particles by Homogeneous Preparation. Wang et al. Journal of Colloid and interface Science 218, 545-553 (1999).*

(Continued)

*Primary Examiner* — Leszek Kiliman
(74) *Attorney, Agent, or Firm* — R. Reams Goodloe, Jr.

(57) ABSTRACT

Paper, paperboard, or label stock coated with a synthetic nano-composite coating. A synthetic nano-composite coating includes a first component including a fibrous structured amorphous silica structure, and a second component including a precipitated calcium carbonate structure developed by pressure carbonation.

10 Claims, 60 Drawing Sheets

(56) References Cited

U.S. PATENT DOCUMENTS

| | | | |
|---|---|---|---|
| 8,415,267 B2 | 4/2013 | Lee | |
| 9,580,867 B2* | 2/2017 | Mathur | D21H 19/58 |
| 2003/0051841 A1* | 3/2003 | Mathur | C01B 33/24 |
| | | | 162/181.1 |
| 2003/0161894 A1* | 8/2003 | Yaniv | A61K 8/19 |
| | | | 424/687 |
| 2004/0108082 A1 | 6/2004 | Hughes | |
| 2005/0173088 A1 | 8/2005 | Grimsley | |
| 2006/0144535 A1 | 7/2006 | Nguyen et al. | |
| 2006/0272549 A1 | 12/2006 | Mathur et al. | |
| 2007/0246179 A1 | 10/2007 | Silenius et al. | |
| 2008/0008846 A1* | 1/2008 | Zhou | B41M 5/5218 |
| | | | 428/32.34 |
| 2008/0096008 A1 | 4/2008 | Yoshimura et al. | |
| 2008/0163992 A1 | 7/2008 | Mohan et al. | |
| 2008/0264302 A1* | 10/2008 | Azui | A62D 3/33 |
| | | | 106/711 |
| 2010/0239761 A1* | 9/2010 | Haenen | B41M 5/502 |
| | | | 427/288 |
| 2010/0282127 A1 | 11/2010 | Gerard et al. | |
| 2010/0304057 A1 | 12/2010 | Zeng et al. | |
| 2011/0003958 A1 | 1/2011 | Nakazawa | |
| 2011/0011305 A1* | 1/2011 | Maijala | B82Y 30/00 |
| | | | 106/31.6 |
| 2011/0229580 A1* | 9/2011 | Srivastava | A61K 9/1652 |
| | | | 424/493 |
| 2012/0082602 A1* | 4/2012 | Munz | C01F 11/181 |
| | | | 423/159 |
| 2012/0088602 A1* | 4/2012 | Morken | A43B 5/001 |
| | | | 473/371 |
| 2012/0312194 A1 | 12/2012 | Riman et al. | |
| 2013/0000518 A1 | 1/2013 | Raper et al. | |
| 2013/0195748 A1 | 8/2013 | Pohl et al. | |
| 2014/0069302 A1 | 3/2014 | Saastamoinen et al. | |

OTHER PUBLICATIONS

Wang, et al, Preparation of Uniform Needle-Like Aragonite Particles by Homogeneous Precipitation. Journal of Colloid and Interface Science 218, 545-553 (1999) Abstract (9 pages).

Potapov, V.V., Gorbach, V.A., et al, Silica Powders Production From Hydrothermal Solutions, Proceedings, Thirty-Sixth Workshop on Geothermal Reservoir Engineering, Stanford University, Stanford, California, Jan. 31-Feb. 2, 2011 (7 pages).

PCT International Search Report (5 pages) and Written Opinion of the International Searching Authority—PCT/US2014/035587 (14 pages) (mailed Nov. 28, 2014) ISA:—United States.

Oct. 10, 2016—Chinese Patent Application No. 201480023240.1—Search Report—Chinese (2 pages).

Oct. 10, 2016—Chinese Patent Application No. 201480023240.1—Search Report—English (2 pages).

EPO—Supplementary European Search Report_EP14788390 (Nov. 18, 2016)—1 page.

\* cited by examiner

SEM of Nano-Composite (SAS & FCA)

SEM of Crystalline Xonotlite (CSH)

SEM of Nano-Composite (SAS & FCA)

XRD of Nano-Composite (SAS & FCA)

SEM of Foshagite

SEM of Tobermorite

SEM of Xonotlite

Aragonite Calcium Carbonate

Scalenohedral Calcium Carbonate

Stacked Rhombohedral Calcium Carbonate

Nano Rhombohedral Calcium Carbonate

Block Flow Diagram of Manufacturing Nano-Composite

SEM of Crystalline Xonotlite (CSH)

SEM of Nano-Composite (SAS & FCA)

PAPER, PAPERBOARD, OR LABEL STOCK COATED WITH FIBROUS STRUCTURED AMORPHOUS SILICA INCLUDING PRECIPITATED CALCIUM CARBONATE

RELATED PATENT APPLICATIONS

This application claims priority from, and is a divisional of pending U.S. patent application Ser. No. 14/262,742 filed Apr. 26, 2014, which application claimed priority from prior U.S. Provisional Patent Application Ser. No. 61/816,649, filed Apr. 26, 2013, entitled FIBROUS STRUCTURED AMORPHOUS SILICA INCLUDING PRECIPITATED CALCIUM CARBONATE, COMPOSITIONS OF MATTER MADE THEREWITH, AND METHODS OF USE THEREOF, the disclosures of each are incorporated herein in their entirety, including the specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to fillers and pigments, and to paper, paperboard, or label stock, coated with such compositions.

BACKGROUND

Fillers and pigments are key components in many industrial markets, such as paper, paints, plastics, concrete, and pharmaceuticals. Filler and pigments are utilized to reduce cost, improve functionality, and to improve the end use performance. One widely used pigment is titanium dioxide ($TiO_2$), which is used to provide brightness and light scattering properties. Another widely used pigment is fumed silica, which may be added to some compositions to provide thixotropic attributes, for example, in paint products. A different product, but with a similar sounding name, is silica fume, which will also be further discussed below.

In paper products, commodity filler or pigment products such as synthetic precipitated calcium carbonate (PCC), or ground calcium carbonate (GCC) are often used. Various forms of PCC used include calcite crystalline structures, aragonite crystalline structures, and rhombohedral crystalline structures. Such crystalline structures are generally characterized by low aspect ratios, moderate brightness, and moderate light scattering power. Some of such materials provide improved optical properties. And, some of such materials provide desired attributes such as paper strength, when used in paper furnish, or in paper coatings. However, there remains a significant need in various paper products for fillers and/or pigments which might improve light scattering power. Similarly, in certain paint products, and uses thereof, there remains a need for improved light scattering power in fillers and/or pigments.

Titanium dioxide is one of the most widely used pigments in many industries, such as paints, paper, coatings, and in some composites. Such use may often be to improve brightness, and to improve opacity. The latter property, improved opacity, improves the light scattering properties, which makes a product have lowered see-through properties. For example, thin papers may be made more opaque (as if actually thicker) by the use of fillers with opacifying properties. The provision of such properties in products using titanium dioxide is primarily due to a combination of characteristics of titanium dioxide, such as a high refractive index (in the range of from about 2.49 to about 2.61), a small particle size (often in the 0.2 to 0.4 micron size), and in the manner in which adjacent particles of titanium dioxide pack when used. However, despite having a unique shape, size, and crystal structure, titanium dioxide has certain limitations. First, it has a very high density (about 4.2 grams per cubic centimeter). Further, in order to keep small titanium dioxide particles from agglomerating in various compositions, dispersants may be used. Such dispersants usually have deleterious effects on the strength properties, especially in coated paper. Also, titanium dioxide particles are highly abrasive. Finally, due to the complexity of some widely used manufacturing processes, which may include certain complex separation and purification processes, titanium dioxide is one of the most expensive fillers and/or coating pigments currently available.

Another filler and/or pigment found in various applications is fumed silica. Fumed silica (also called pyrogenic silica) is generally manufactured from flame pyrolysis of silicon tetrachloride, or by the vaporization of quartz in a 3,000° C. arc furnace. The primary particle surface area of most fumed silica is in the range of from about 50 to about 600 square meters per gram. And, amorphous fumed silica particles may be fused into chainlike secondary particles which, in turn, agglomerate into tertiary 3-dimensional particles. On limitation is of such material is that it is non-porous. Also, fumed silica is generally highly thixotropic, and may cause high viscosity compositions when added to paints and coatings. Also, the environmental impacts of the manufacturing process, and the usually high cost of fumed silica, limit its use.

Silica fume (also called micro-silica, and not to be confused with fumed silica) is an amorphous (i.e., non-crystalline) material. Silica fume is often collected as an ultra-fine powder as a by-product of silicon or ferro-silicon alloy production. Silica fume is generally in the form of spherical particles with an average particle size of about 150 nanometers, and with a surface area in the range of from about 15 to about 30 square meters per gram. Also, silica fume is a highly pozzolinic material, and thus may be used in cement and concrete to enhance compressive strength, bond strength, and abrasion resistance. However, at this time, silica fume, being a byproduct of production of other materials, is in relatively short supply.

The just discussed fillers and/or pigments are generally of limited purpose, as each may have a single or limited number of product enhancing properties. Thus, there remains an as yet unmet need for a multi-functional filler and/or pigment product that may, in many applications, replace expensive fillers such as titanium dioxide, fumed silica, or silica fume. It would be advantageous if such a new filler and/or pigment provided a combination of at least some ideal properties, such as high surface ratio, a high aspect ratio, a high brightness, and a high light scattering coefficient. And it would be even more advantageous if such a multi-functional filler and/or pigment were environmentally safe, and available at prices competitive with expensive fillers such as titanium dioxide, fumed silica, or silica fume. Consequently, provision of a unique multi-functional filler and/or pigment is believed to be an interesting and significant contribution to the art and science of fillers and pigments.

BRIEF DESCRIPTION OF THE DRAWING

Various aspects of the developments described herein will be described by way of exemplary embodiments, illustrated in the accompanying drawing figures in which like reference numerals denote like elements, and in which.

Figure 1:
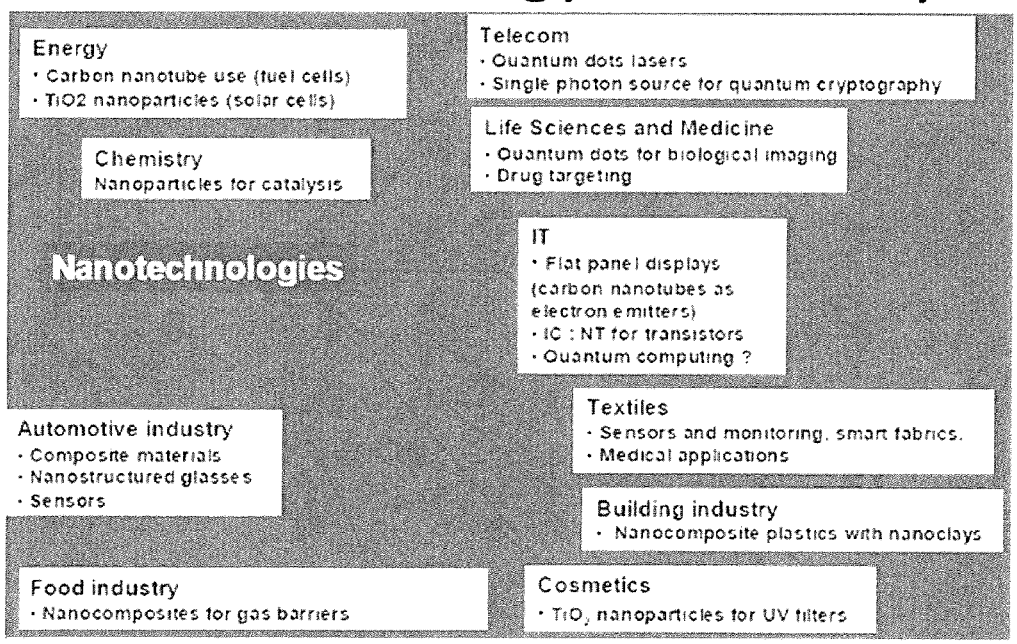
FIG. 1 is a diagram released by PIRA International in November 2005 titled The Nanotechnology Marketplace; the diagram indicates various industries that may benefit from nanotechnology, and lists some of the key areas in which research is being conducted as regards nanomaterials.

In the various figures of the drawing, like features may be illustrated with the same reference numerals, without further mention thereof. Further, the foregoing figures are merely exemplary, and may contain various elements that might be present or omitted from actual implementations of various embodiments depending upon the circumstances. An attempt has been made to provide the figures in a way that illustrates at least those elements that are significant for an understanding of the various embodiments and aspects of the developments described herein. However, various other elements for a multi-functional filler and/or pigment, especially as applied for various compositions using the same, may be utilized in order to provide useful, reliable, and highly functional fillers and/or pigments.

SUMMARY

I have now developed a novel, multi-functional, nano-composite filler. The filler includes a synthetic fibrous structured amorphous silica ("SAS") component and a nano-fibrous crystalline aragonite precipitated calcium carbonate ("FCA") component, which together may be abbreviated as a "SAS+FCA" nano-composite. In an embodiment, such a nano-composite filler maybe characterized as having high surface area (from about 50 to about 200 centimeters squared per gram). In an embodiment, when mixed with water, such a nano-composite filler and water mixture results in a pH in a relatively neutral range of from about 6.5 to about 7.5. In an embodiment, such unique nano-composites (SAS+FCA) may have a high water absorption rate, for example in the range of from about 100% to about 300%. In an embodiment, such unique nano-composites (SAS+FCA) may have a high oil absorption rate, for example in the range of from about 150% to about 300%.

Figure 2:
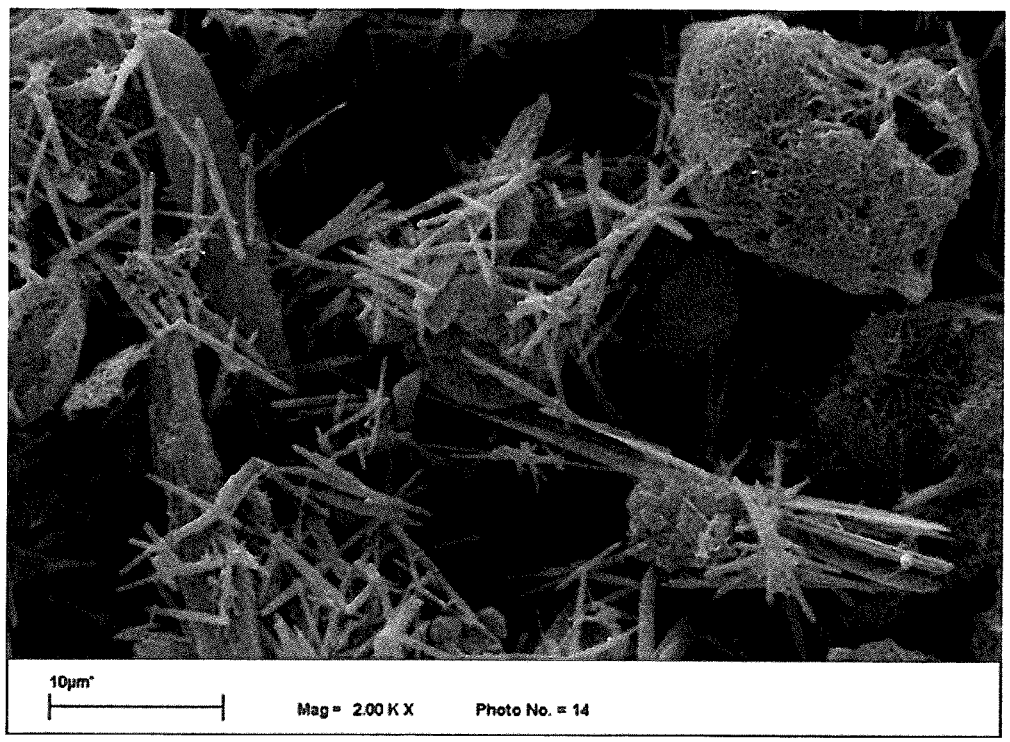
FIG. 2 is a photograph, as seen through a scanning electron microscope at a 2000 times magnification, of a nano-structured amorphous silica with nano fibrous crystalline aragonite precipitated calcium carbonate therein, made as described herein, showing "needle" shaped crystals at the bottom center of the picture which are fibrous crystalline aragonite, while the shapes in the lower left and upper right corners of the picture include structured amorphous silica.

In an embodiment, as shown in FIG. 2, a nano-composite SAS+FCA material may include at least two distinct components. As shown in FIG. 2, a first component having a globular or "hay stack" type structure may be provided. In an embodiment, such globular or "hay stack" type structure may be sized from about ten (10) microns to about forty (40) microns in size. In an embodiment, such globular "hay stack" type structure may be composed of "hair" like nano-fibers of amorphous silica, each having a selected diameter and a selected length. In an embodiment, the diameter of such amorphous silica fibers of may be in the ten (10) nanometer (nm) range. In an embodiment, the amorphous silica fibers may be in the range of from about three (3) to about four (4) microns in length. In an embodiment, the aspect ratio of such amorphous silica nano-fibers may be approximately 100:1.

In an embodiment, a second component may be provided in a nano-composite SAS+FCA material. In an embodiment, the second component may be an aragonite crystal. In an embodiment, such an aragonite crystal may have a "needle" shaped fiber structure. In an embodiment, or in various embodiments, such aragonite crystals may have an estimated diameter of from about 100 to about 200 nm. In an embodiment, or in various embodiments, such aragonite crystals may have a length of from about 3 to about 10 microns.

Figure 60:
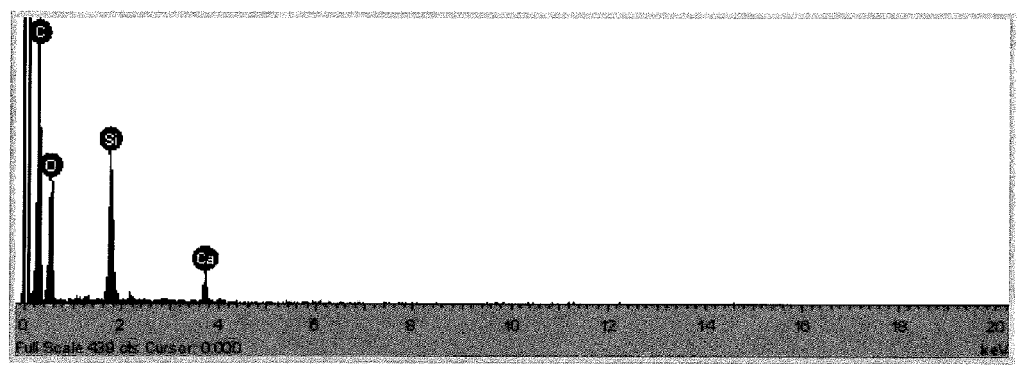
FIG. 60 is a graph of the energy dispersive spectroscopy ("EDS") analysis provided by EDAX Corporation of the unique nano-composite material (SAS+FCA) containing structured amorphous silica ("SAS") and a fibrous calcium carbonate in a selected phase, namely aragonite ("FCA").

In summary a novel nano-composite material is described herein. Such nano-composite material includes a synthetic fibrous structured amorphous silica ("SAS") component and a nano-fibrous crystalline aragonite precipitated calcium carbonate ("FCA") component. As set forth in the drawing figures, an X-ray diffraction pattern (XRD) analysis of the unique nano-composite material identified only a single constituent, which matched the X-ray diffraction (XRD) pattern of an aragonite precipitated calcium carbonate (see FIG. 3), with major peaks at 3.276, 3.398, and 1.977 D-spacing (angstroms). Thus the first structure is amorphous silica, rather than crystalline calcium silicate hydrate. Further, as noted in FIG. 60, a EDAX analysis confirmed the first component to be silica. Thus, the unique nano-composite material described herein includes first component of amorphous silica, and a second component of crystalline aragonite.

Further, the nano-composite (SAS+FCA) is believed useful as filler, for example, in paints and coatings. And, initial tests have indicated that the nano-composite (SAS+FCA) material is useful as a component of coating compounds, especially in the manufacture of paper and paper products. A myriad of uses may be developed, based on the unique properties of such synthetic nano-composite (SAS+FCA) materials, as indicated in evaluations thus far conducted.

The foregoing briefly describes a novel, unique nano-composite that includes a first component of amorphous silica, and a second component of aragonite crystals. As described herein, such aragonite crystals may advantageously be synthesized by way of pressure carbonation technique. However, the various objectives, features and advantages of the novel nano-composite materials described herein will be more readily understood upon consideration of the following detailed description, taken in conjunction with careful examination of the accompanying figures of the drawing.

DETAILED DESCRIPTION

A unique nano-composite including both (a) synthetic fibrous structured amorphous silica (SAS) and (b) nano-fibrous crystalline aragonite precipitated calcium carbonate (FCA). This nano-composite is characterized by having high surface area (approximately 50-150 cm2/g). The pH is in the neutral range of 6.5 to 7.5. It has a very high water and oil absorption in the range of 150% to 300% and 200% to 250% respectively. The Scan Electron Microscope picture (SEM) clearly shows two distinct components (FIG. 2). The first image is a globular structure of approximately 10 to 40 microns in size. That first component includes "hair" like nano-fibers, which in an embodiment may be approximately 10 nanometers (nm) in diameter. In an embodiment, the nano-fibers may be from about 3 to about 4 microns in length. An "energy dispersive x-ray spectroscopy ("EDAX") analysis confirmed the presence of $SiO_2$. The other prominent component in the photograph obtained via a scanning electron microscope ("SEM") is a "needle" fiber shaped structures with an estimated diameter of 100 to 200 nm and length ranging from 3 to 10 microns. It is significant to note that the X-Ray Diffraction pattern (XRD) analysis identified only a single component matching the XRD pattern of an aragonite precipitated calcium carbonate (see FIG. 3) with major peaks at 3.276, 3.398, and 1.977 D-spacing (in angstroms). Such analysis confirms that in an embodiment, the nano-composite material described herein may include structured amorphous silica ($SiO_2$) and fibrous crystalline aragonite carbonate. Consequently, it can be seen that in an embodiment, crystalline calcium silicate hydrates ("CSH") are converted into amorphous silica. Thus, such amorphous silica and fibrous crystalline calcium carbonate, in an aragonite phase, exist as a nano-composite material. In an embodiment, the just described "nano-composite" material simultaneously includes characteristics and performance of both amorphous silica and of a crystalline calcium carbonate in an aragonite phase, as will be further understood below in relation to examples provided.

Method for Manufacture—Starting Materials and the Process

One unique aspect of the developments described herein is the use of various phases of synthetic calcium silicate hydrates (CSH) and the use of carbon dioxide ($CO_2$) under pressure, to generate amorphous silica and a fibrous crystalline carbonate, which in an embodiment is in the aragonite phase.

Figure 4:
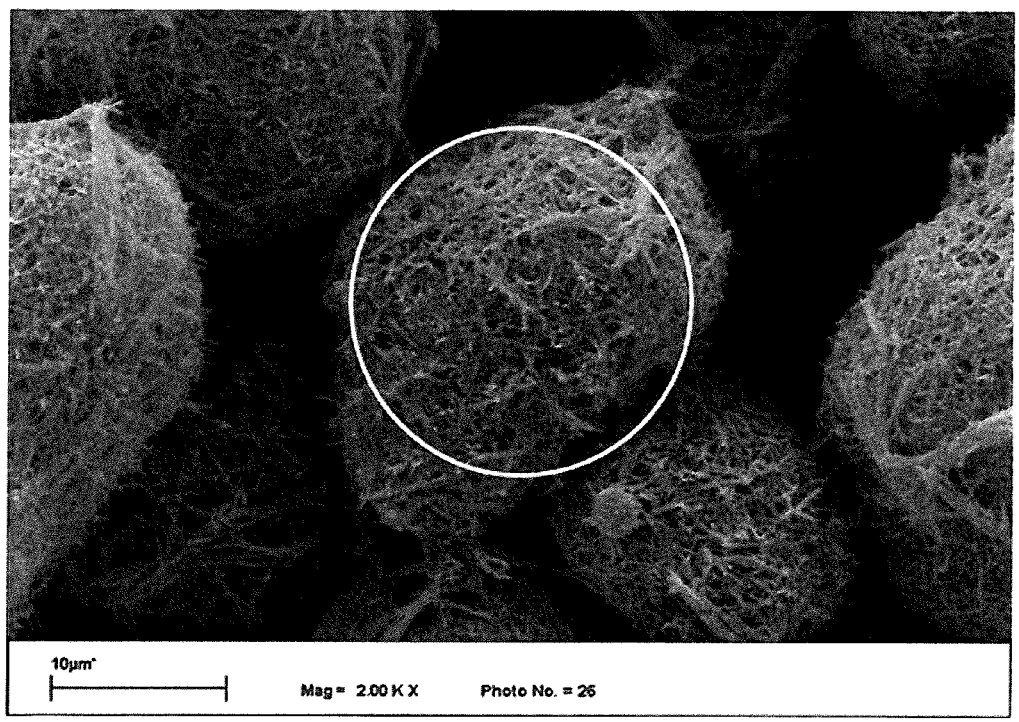
FIG. 4 is a photograph taken by a scanning electron microscope at 2000 times magnification of an embodiment for a synthetic nano fibrous calcium silicate hydrate (CSH) that was generated as a component in a novel composite material; the circled area shows a secondary "hollow" macrosphere structure of the material that is about 20 microns by 40 microns in size, and includes various nanofibers.
Figure 5:
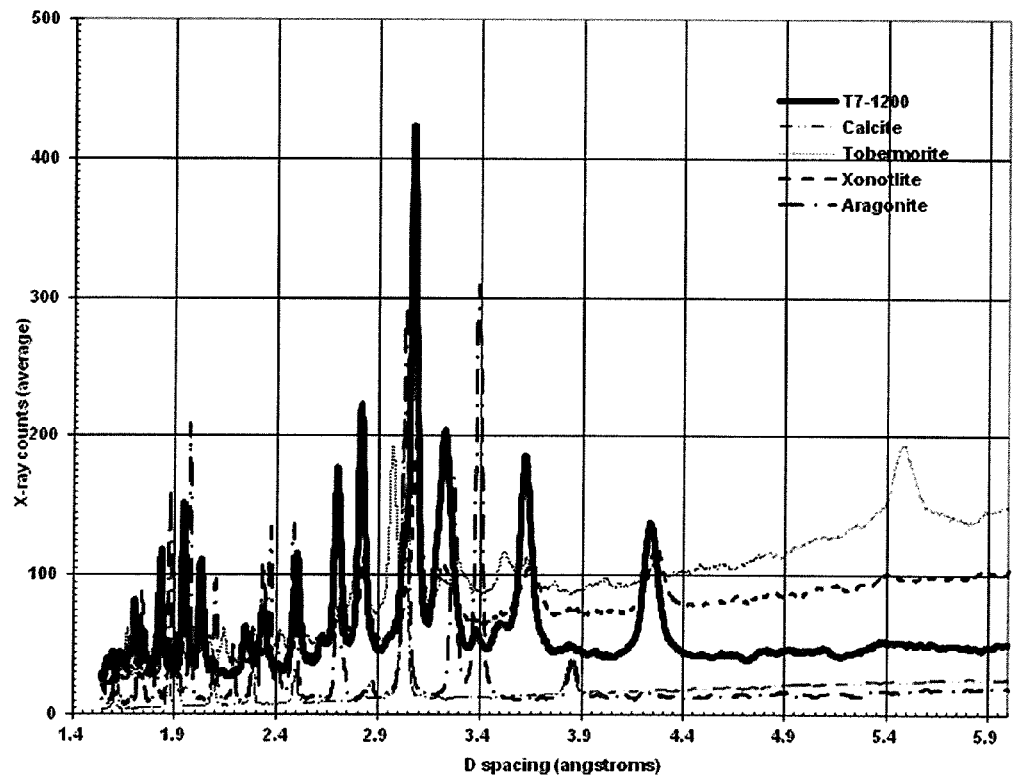
FIG. 5 is the graph of the results from an X-ray diffraction (XRD) scan of a sample of the material shown in FIG. 4, together with scans of control materials including calcite crystals, aragonite crystals, tobermorite crystals, and xonotlite crystals; the scan indicates that the sample material includes peaks at the same locations as xonotlite crystals.

An SEM photograph of one of the starting materials that may be utilized for producing a nano-composite as described herein is provided in FIG. 4. The SEM photograph shows secondary particles ranging from about 10 microns to about 40 microns. In an embodiment, the secondary particles may be made up of nano-fibers of approximately 10 nm in diameter. In an embodiment, the secondary particles may be made up of nano-fibers of from about 3 to about 4 microns in length. In an embodiment, the secondary particles may be made up of nano-fibers having an aspect ratio of about 100:1. Such starting material may be further identified by the graph of the XRD analysis, where it is seen in FIG. 5 to have a major peak at 3.22 angstroms and minor peaks at 2.04 and 8.50 angstrom, which conforms to the characteristics of the xonotlite crystal. While other types of calcium silicate hydrates may be used to provide a nano-composite as described herein, at the present time, it is believed that the conversion efficiency may be higher when using xonotlite phase calcium silicate hydrates.

Yet another novel development described herein is a process to convert a crystalline silicate hydrate such as xonotlite into amorphous silica. Such conversion may be achieved while also producing a synthetic crystalline calcium carbonate in the aragonite phase. Such a process may involve the reaction of carbon dioxide ($CO_2$) under pressure, and may be referred to as a process for pressure carbonation of nano-fibrous calcium silicate hydrates. The SEM photograph and XRD patterns of the carbonated product resulting from use of xonotlite calcium silicate hydrate as a starting material are given in FIGS. 6 and 7 respectively. Here again, the SEM photograph shows two distinct products: amorphous silica (within the solid circle) and fibrous crystalline aragonite calcium carbonate (within the dashed circle). However, the XRD identifies only a single crystalline phase, namely aragonite phase calcium carbonate.

Yet another novel development includes the use of seed materials for enhancement of reactions, to promote conversion efficiency. The efficiency of the pressure carbonation process may be enhanced by using certain seed materials and promoters or catalysts such as pre-formed amorphous silica and fibrous crystalline aragonite, with or without a non-fibrous aragonite crystal. In an embodiment, such reaction promoters and/or catalysts may include calcium hydroxide, and/or magnesium hydroxide.

Another aspect of the developments described herein is mineral fixation of carbon dioxide using synthetic fibrous fillers. A novel process for producing precipitated calcium carbonate is described herein, which enables the efficient use of "free" carbon dioxide found in flue gas, and more particularly, from flue gas containing relatively low concentrations of carbon dioxide. Prior work, involving simply the production of precipitated calcium carbonate under pressurized conditions, was described in prior U.S. Pat. No. 6,125,356, entitled "High Speed Manufacturing Process for Precipitated Calcium Carbonate employing Pressure Carbonation" was issued Jun. 26, 2001, the disclosure of which is incorporated herein in its entirety by this reference. That process was capable of providing a variety of precipitated calcium carbonate (PCC) morphologies. Various precipitated calcium carbonates that can be manufactured by that process include distinct crystal morphologies, such as calcite scalenohedral as well as calcite rhombohedral of various aspect ratios, and aragonite. SEM photographs of such crystals may be seen in FIGS. 21, 22, 23, and 24. A PCC product manufactured under that pressure carbonation system may be referred to as a Super Precipitated Calcium Carbonates ("S-PCC").

The basic chemistry for producing precipitated calcium carbonates includes the steps of calcination, slaking, and carbonation. The following chemical reactions describe such steps:

Calcination: $CaCO_3 + \Delta H \rightarrow CaO + CO_2\uparrow$  (1)

Slaking: $CaO + H_2O \rightarrow Ca(OH)_2 \Delta H\uparrow \sim pH\ 12.4$  (2)

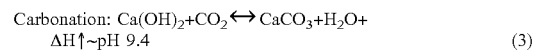

Carbonation: $Ca(OH)_2 + CO_2 \leftrightarrow CaCO_3 + H_2O + \Delta H\uparrow \sim pH\ 9.4$  (3)

In order to produce the nano-composite product(s) described herein, an additional step is required, as follows:

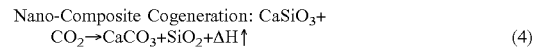

Nano-Composite Cogeneration: $CaSiO_3 + CO_2 \rightarrow CaCO_3 + SiO_2 + \Delta H\uparrow$  (4)

The carbonation reaction (equation 3 above) is an equilibrium reaction. Therefore, as the soluble calcium ion is converted to calcium carbonate precipitate, more dissolution of the calcium hydroxide takes place from the silicate slurry to increase the concentration of the calcium ion up to the solvent solubility limits (inverse temperature dependent phenomenon), until all of the available calcium hydroxide is dissolved, and all available calcium ions have been converted into calcium carbonate. It is of interest that carbon dioxide fixation using synthetic silicates under pressure is a novel method of carbon capture, i.e., fixation by mineralization.

Another aspect the developments described herein is the application of such dual component nano-composites in paper, board coatings, and other industrial applications. As further described herein, the novel nano-structured material described herein have some unique properties. In an embodiment, such properties may make it useful as filler in papermaking operations. In various embodiments, such use may provide some unusual and beneficial paper properties, resulting in superior paper products when made with the nano-structured materials described herein.

In various embodiments, the nano-structured composite materials described herein may be used at various degrees of substitution for currently used high performance coating pigments such as titanium dioxide ($TiO_2$). In various embodiments, the nano-structured composite materials described herein may be used at various degrees of substitution for calcined and other naturally occurring clays. The unique nano-composites described herein may also be used to enhance the performance of various paper properties, such as to improve surface strength of coatings (pick strength), smoothness, appearance, shade, matte finish (lower sheet gloss), print quality, wet pick, and the like. In short, the nano-composite material described herein, including nano structured amorphous silica and nano-fibrous crystalline aragonite calcium carbonate, fits nearly all of the applicable criteria of an ideal pigment.

In an embodiment, a unique nano-composite including synthetic fibrous structured amorphous silica (SAS) and a nano fibrous crystalline aragonite precipitated calcium carbonate (FCA) is provided. In an embodiment, such nano-composite may be characterized by having high surface area (approximately 50-150 meters squared per gram). In water suspension, such nano-composite material has a pH in the neutral pH range of 6.5 to 7.5. In an embodiment, such nano-composite may have a very high water absorption, say in the range of 150% to 300%. In an embodiment, such nano-composite may have a high oil absorption, say in the range of from about 200% to 250%. The Scan Electron Microscope (SEM) photograph set forth in FIG. 2 clearly shows two distinct components. The first component shown in the photograph is a globular structure of approximately 10 to 40 microns in size. That structure is composed of "hair" like nano-fibers which may be approximately 10 nm in diameter. In an embodiment, such fibers may be about 3 to about 4 microns in length. Thus the aspect ratio of those nano-fibers may be approximately 100:1. The second and prominent component in the SEM photograph is the "needle" fiber shaped structures. Those prominent components have an estimated diameter of from about 100 to about 200 nm, and length ranging from about 3 to about 10 microns. Note that the X-Ray Diffraction (XRD) pattern analysis shown in FIG. 3 identified only a single component, which component matches the XRD pattern of calcium carbonate in the form of aragonite, with major peaks at 3.276, 3.398, and 1.977 D-spacing (in angstroms). Thus the other structure was amorphous. The energy dispersive x-ray spectroscopy ("EDAX") analysis (see FIG. 60) confirmed that the amorphous structure was silica. Thus the nano-composite provided is the combination of crystalline aragonite and amorphous silica.

Figure 12:
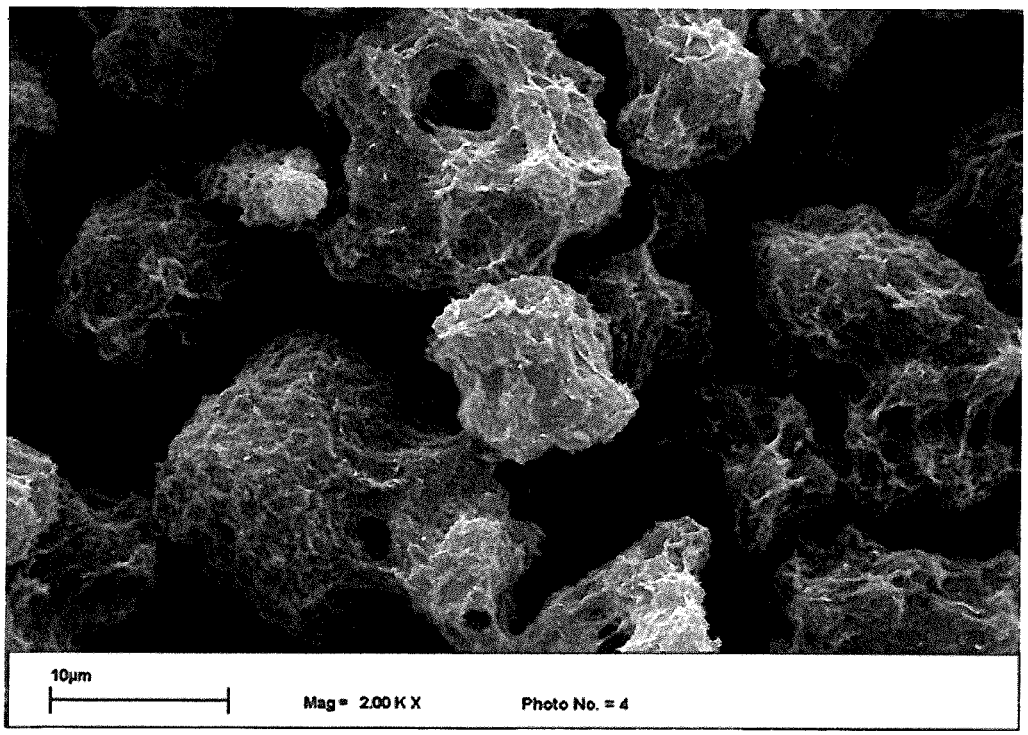
FIG. 12 is a photograph taken using a scanning electron microscope at 2,000 times magnification, of a fibrous calcium silicate hydrate, namely riversidite.
Figure 13:
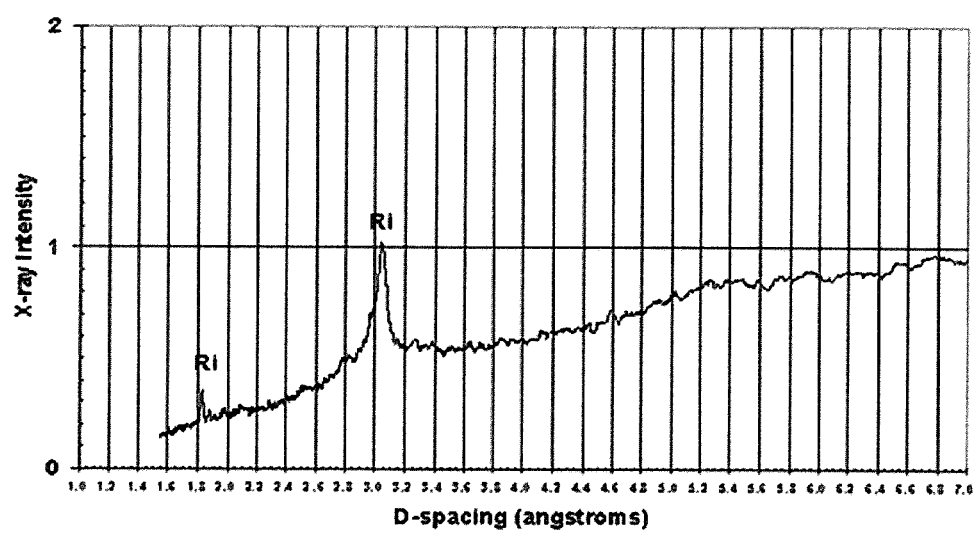
FIG. 13 is a graph of an X-ray diffraction (XRD) scan of a sample of the riversidite material just illustrated in FIG. 2; the two major XRD peaks for the riversidite material are labeled for easy reference.
Figure 14:
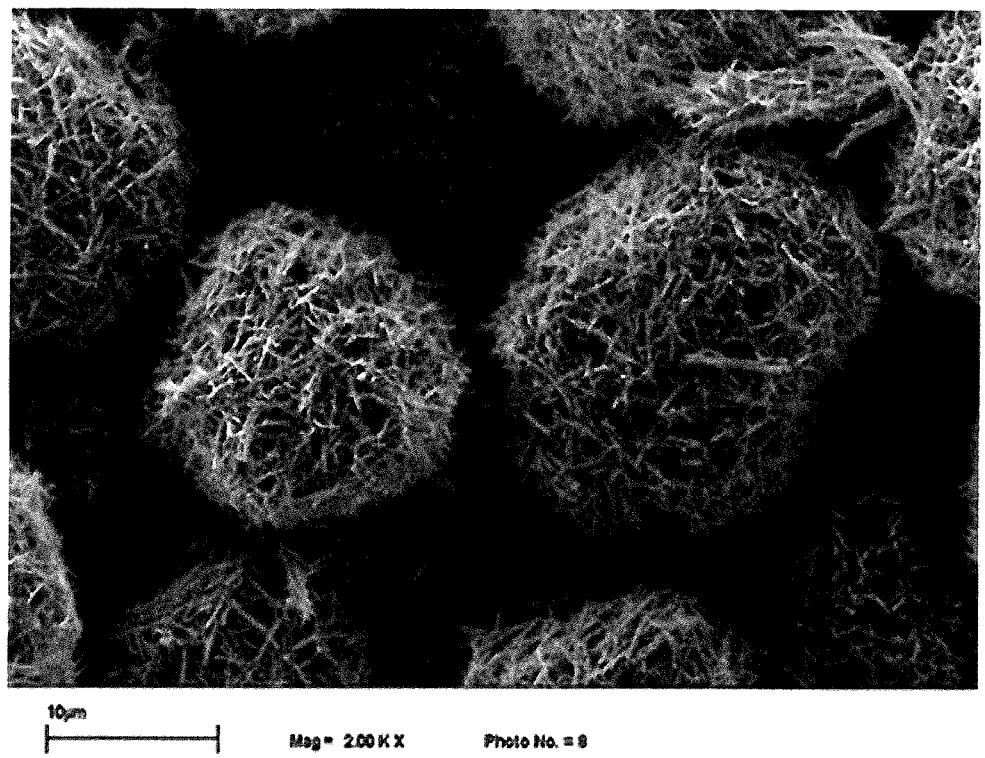
FIG. 14 is a photograph taken using a scanning electron microscope at 2,000 times magnification of another fibrous calcium silicate hydrate, namely foshagite.
Figure 15:
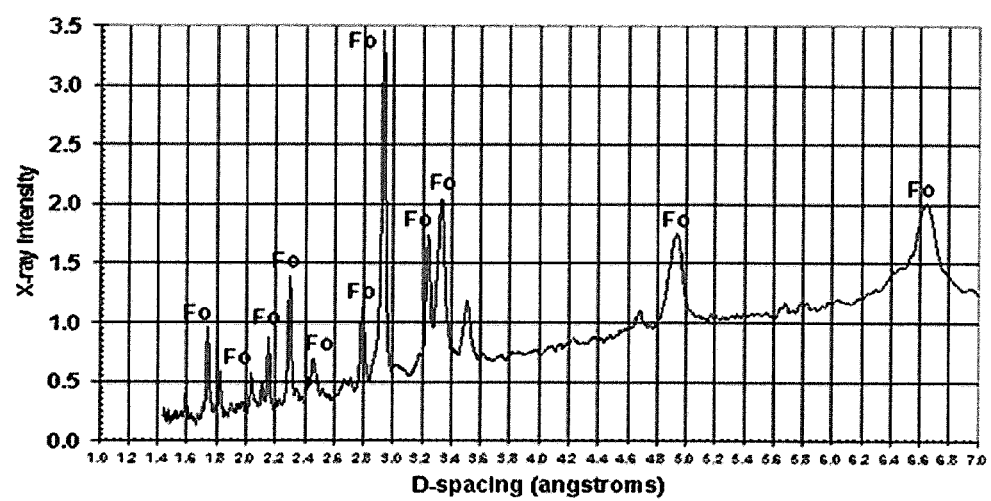
FIG. 15 is a graph of the X-ray diffraction (XRD) scan of a sample of the material just shown in FIG. 14; the major XRD peaks for this foshagite material are labeled for easy reference.
Figure 16:
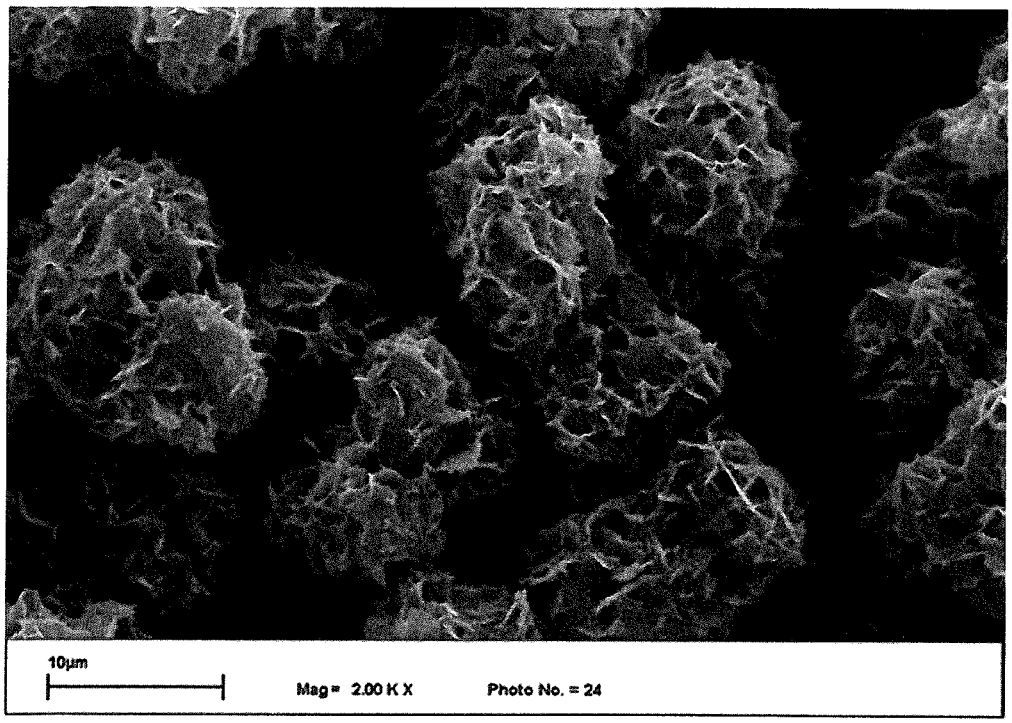
FIG. 16 is a photograph taken using a scanning electron microscope at 2,000 times magnification of another fibrous calcium silicate hydrate, namely tobermorite.
Figure 17:
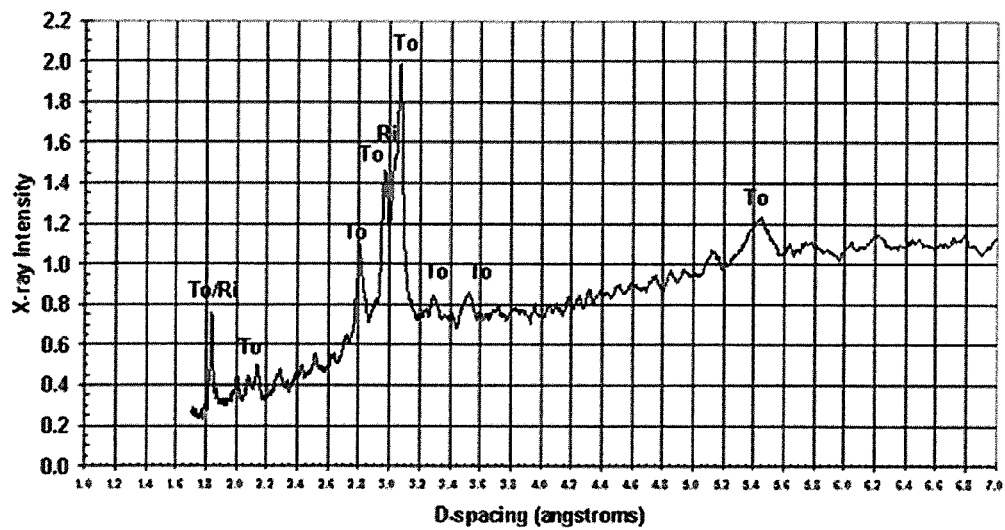
FIG. 17 is a graph of the X-ray diffraction (XRD) scan of a sample of the tobermorite material shown in FIG. 16, in which the major XRD peaks for tobermorite are labeled for easy reference; note that the major XRD peaks for riversidite also appeared in this XRD scan, and thus the major XRD peaks for riversidite also included are labeled accordingly.
Figure 18:
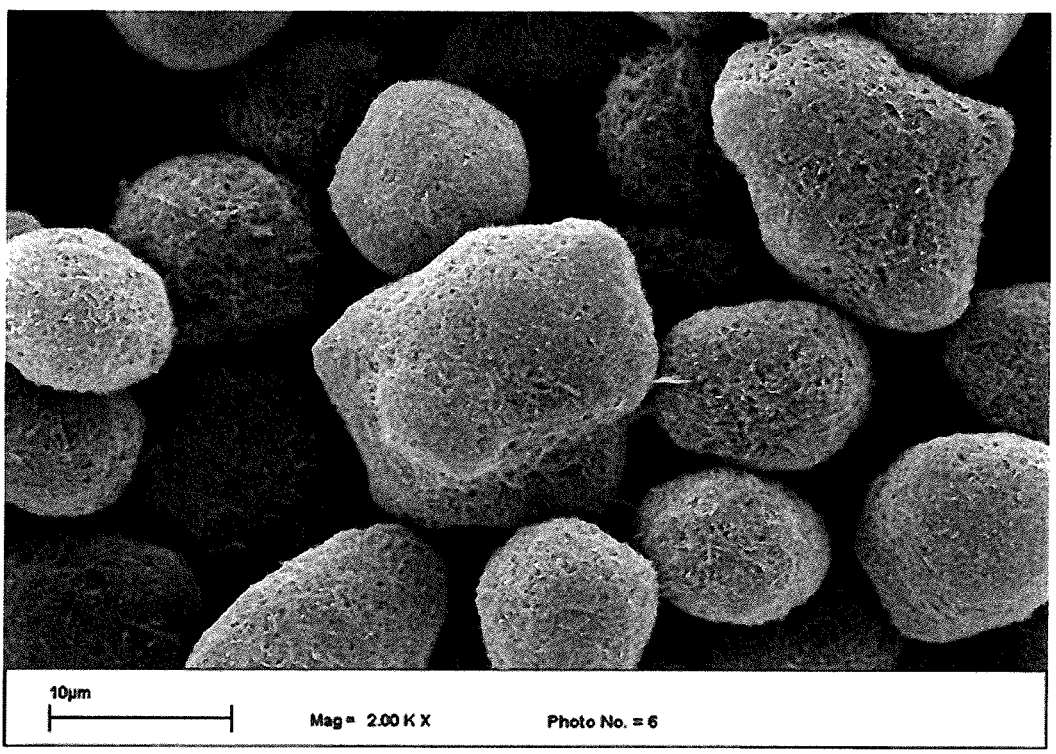
FIG. 18 is a photograph taken using a scanning electron microscope at 2,000 times magnification, illustrating another fibrous calcium silicate hydrate, namely xonotlite.
Figure 19:
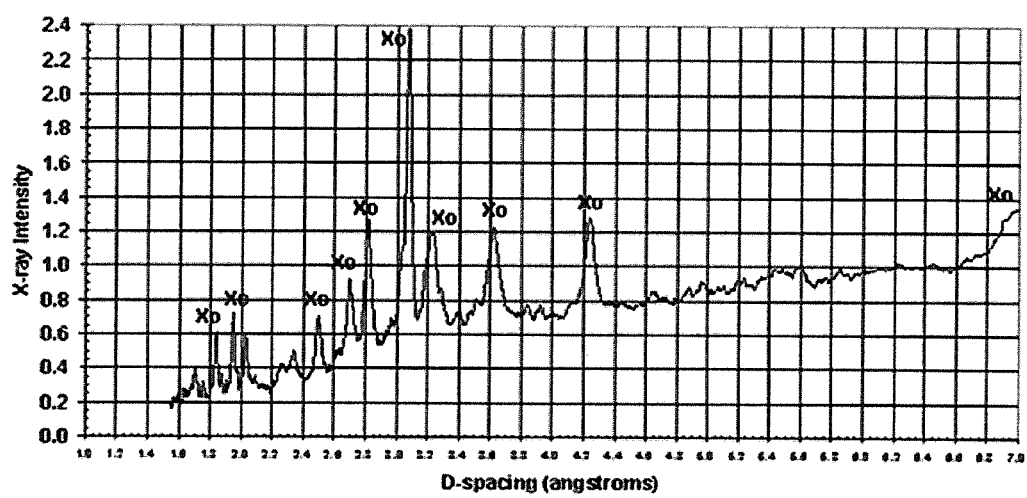
FIG. 19 is a graph of the X-ray diffraction (XRD) scan of a sample of the material shown in FIG. 18; the major XRD peaks for xonotlite are labeled for easy reference.

In an embodiment unique nano-composite materials may be produced by the pressure carbonation of one or more selected synthetic crystalline calcium silicate hydrates (CSH). Suitable synthetic crystalline calcium silicate hydrates may include riversideite (see FIGS. 12 and 13), or foshagite (see FIGS. 14 and 15), or tobermorite (see FIGS. 16 and 17), or xonotlite (see FIGS. 18 and 19).

Figure 25:
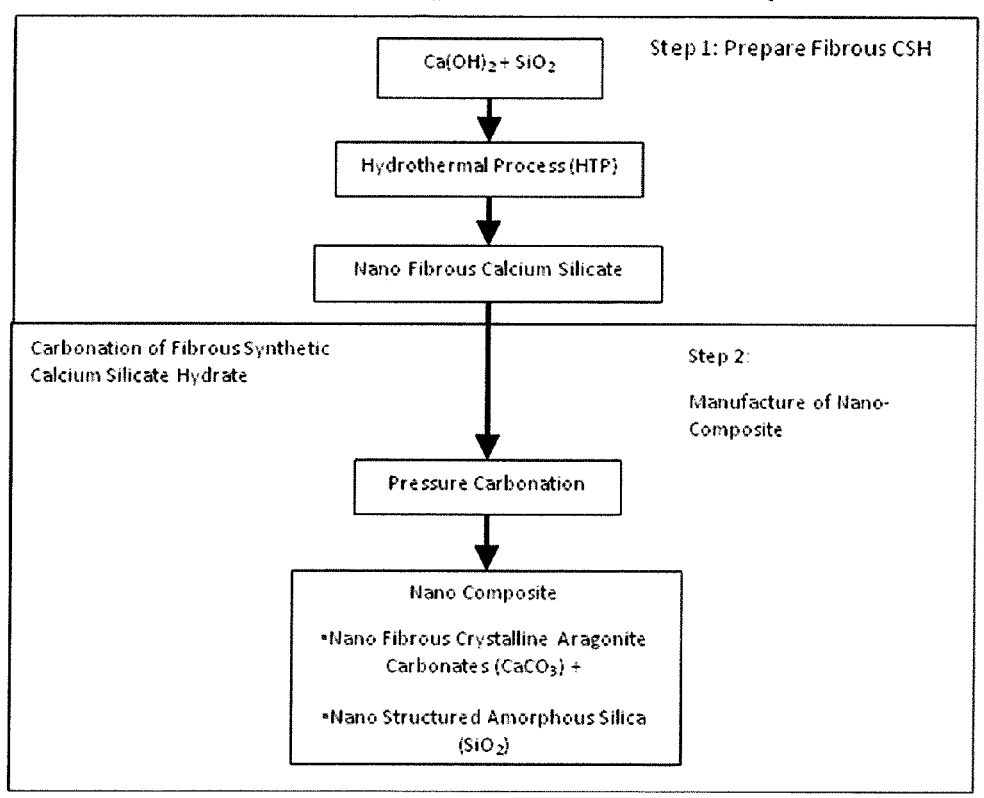
FIG. 25 provides a basic process flow diagram describing the sequence of primary reactions which may be useful for the manufacture of a nano-composite material that includes both nano-fibrous crystalline aragonite and nano-structured amorphous silica.

Several process steps may be utilized in the preparation of the unique nano-composite materials described herein. In a very basic view, there are two steps, as noted in the two blocks set forth in FIG. 25. In a first step, one or more selected synthetic silicate hydrates are prepared by using hydrothermal reaction of calcareous materials, such as lime, with siliceous materials, such as quartz or diatomaceous earth ("DE"). In a second step, the just prepared one or more selected calcium silicate hydrates are subjected to carbonation, under pressurized conditions, to produce a nano-composite structure that includes amorphous silica, generally shaped in the form of the prior crystalline calcium silicate hydrate, and additionally, crystalline calcium carbonate, which in an embodiment, appears in the aragonite phase. In an embodiment, the process(es) may be carried out in pressurizable reactors.

The manufacturing process of suitable nano-composite materials involves reacting carbon dioxide reaction with synthetic calcium silicate hydrate under pressure. In an embodiment the reaction of carbon dioxide under pressurized conditions provides carbonic acid in liquid solution for reaction with the one or more selected calcium silicate hydrates. In an embodiment, such the second step of formation of nano-composites, i.e., pressurized carbonation may be carried out in the presence of one or more seed materials, such a selected amount of a previously prepared nano-composite, a selected amount of aragonite. Further in an embodiment, reaction rates may be enhanced by utilization of a combination of calcium hydroxide and magnesium hydroxide. In an embodiment, the second step, namely pressurized carbonation, may be carried out by controlling the starting pH to the range of from about 10 to about 11.

The chemical reaction that occurs when synthetic calcium silicate hydrates are exposed to $CO_2$ is given in equation (4) above. In an experimental nano-composite manufacturing process, the carbonation of selected synthetic calcium silicate hydrates was carried out in a pressurized reactor, using a pressure carbonation process. The process variables included (a) initial reactor pressure, (b) initial reactor temperature, and (c) carbon dioxide flow rate to the reactor. In an embodiment, some process parameters and their ranges may be considered as follows:

1) Fibrous calcium silicate hydrate slurry solids (at about 0.3 to 1.0 lbs/gallon);
2) Carbon dioxide flow rates;
3) Time to reach reaction completion (in the range of from about 15 to 45 minutes);
4) Temperature profile $\Delta T$ (8-20° C.);
5) Initial temperature—approximately 60° C.; and
6) Final temperature—approximately 70° C.

Production of Synthetic Calcium Silicate Hydrates

On an embodiment, a manufacturing process for preparation of various phases of synthetic calcium silicate hydrates may be accomplished as taught in U.S. Pat. No. 6,726,807 B1, issued on Apr. 27, 2004, and entitled "Multi-Phase Calcium Silicate Hydrates, Methods for Their Preparation, and Improved Paper and Pigment Products Produced Therewith", and U.S. Pat. No. 7,048,900 B2, issued on May 23, 2006, and entitled "Method and Apparatus for Production of Precipitated Calcium Carbonate and Silicate Compounds in Common Process Equipment". The disclosures of each of the just mentioned patents, including their specification, claims, and drawing figures, are incorporated herein in their entirety by this reference.

Lime Slurry Preparation

Lime slurry is prepared according to generally accepted slaking processes, however, may in practice be carried out with one exception. For preparation of compositions of matter as described herein, the lime slurry may not be cooled. Instead, hot lime slurry (approximately 200° F.) may be screened and transferred directly to a pressurizable reactor vessel. It should be noted that the solubility of calcium hydroxide is very low in water and is inversely proportional to the temperature of that water. For example, the concentration of lime, calcium oxide (CaO), in pure water, at 32° F. is reported to be 0.14%. When the temperature of the water rises to boiling, 212° F., the solubility of the lime, calcium oxide (CaO), falls to 0.05%.

Siliceous Slurry Preparation

Various siliceous materials such as quartz, water glass, clay, pure silica, natural silica (sand), natural diatomaceous earth, fluxed calcined diatomaceous earth, or combinations thereof, may be used as source(s) of silicious material. In an experimental preparation of calcium silicate hydrates, an ultra-fine grade of fluxed calcined diatomaceous earth ("FCDE") was utilized, and was made into a water slurry at approximately 1.22 lbs FCDE per gallon of slurry. More generally, an aqueous slurry of silicious material at a concentration of from about 1 pound to about 1.5 pounds of silica per gallon of slurry can be used. It should be noted that the solubility of silica/quartz, (unlike that of $Ca(OH)_2$), is directly proportional to temperature. For example, quartz is only slightly soluble up to 212° F. From about 212° F. to 266° F., quartz starts solubilizing, and around 518° F., (270° C.), a maximum solubility is reached at about 0.07%. The dissolution of silica may be represented as per the reaction described in equation 5:

$$(SiO_2)n+2nH_2O \rightarrow Si(OH)_4 \quad (5)$$

The solubility of silica in water may be increased by raising pH, such as by using various additives (i.e. sodium hydroxide). Silica solubility is also at least to some extent a function of particle size, thus in an embodiment, a smaller particle size, such as may be provided by use of ultra-fine fluxed calcined diatomaceous earth (FCDE) may be advantageous.

Hydro-Thermally Reacting the Lime Slurry and the Silicious Slurry

First, the amount of CaO in a lime slurry and the amount of $SiO_2$ in a diatomaceous earth slurry may be adjusted to give a selected $CaO/SiO_2$ mole ratio. Second, the concentration of the two slurries (CaO and $SiO_2$) and the final concentration of the mixture were adjusted by using water so as to have a final concentration in the autoclave between 0.2 and 1.0 lbs/gallon.

The reaction was carried out in a pressurized reactor vessel, with three major steps:
1. Heating the slurry to the desired temperature (e.g. 180° C. to 250° C.).
2. Reacting at temperature for a specified time (e.g. 120 min to 240 min).
3. Stopping the reaction and cooling down (e.g. 25 min to 30 min).

The pressurized reactor vessel was cooled down by passing quenching water through an internal cooling coil and/or an external jacketed cooling system. The cool down process took approximately 30 to 60 minutes, in order to reduce the temperature from 446° F. (230° C.) to 176° F. (80° C.). Recognition of the inverse solubility of lime in water with respect to temperature has been utilized in an effort to produce the desired composition and various phases of calcium silicate hydrate material.

Without limiting the developments described herein to any particular mechanism or theory, in some respects, it is presently believed that certain reactions occur during the hydrothermal reaction between calcious material and silicious material. More particularly, solid calcium hydroxide $Ca(OH)_2$ particles may react with $SiO_2$ in a gel phase to yield a calcium silicate hydroxide whose crystallochemical structure can be written as $Ca_6Si_6O_{17}(OH)_2$ (xonotlite). As the temperature is further raised from about 356° F. to about 482° F., calcium silicate hydrate condenses with the remaining $Ca(OH)_2$ particles to give yet another calcium silicate hydrate, this time with a distinct X-ray diffraction pattern and a crystallochemical formula of $Ca_4(SiO_3)_3(OH)_2$ (foshagite). Thus, the process(es) described herein may produce not only single phase calcium silicate hydrates, but may also produce calcium silicate hydrates having multiple phases therein. Different calcium silicate hydrates may be made by changing the lime/silica ratio, slurry concentration, reaction temperature and reaction time. The use of different additives like sodium hydroxide, sugar, and chelating compounds may also be utilized and manipulated to create diverse products.

More generally, a wide variety of calcium silicate hydrates may be prepared by manipulating the following process parameters:
1. Lime/Silica ratio
2. Reaction Temperature
3. Slurry Concentration
4. Reaction Time
5. Heating and Cooling Sequence The various phases were produced by changing the calcium to silica molar ratio from 0.75 to 1.35, by changing the reactant concentrations from 0.4#/gallon to 1.0#/gallon, and by changing the reaction temperature from 180° C. to 260° C. and the reaction time ranging from 2 hours to 4 hours. The products from the reaction were then cooled from a maximum of 260° C. and a minimum of 180° C. to 70° C.

High Pressure Reactor & Equipment for Manufacturing Multiple Calcium Silicate Hydrates, Lab Scale In an embodiment, the process described herein utilizes a hydrothermal reaction that may be carried out under superatmospheric conditions, using pressurized reactor equipment. As an example, a reactor used in the lab was a specialized, high pressure, high temperature, two liter reactor vessel. It was fitted with an outside jacketed heater and internal cooling coil system. The reactor was also fitted with a Rustin 200 impeller. The agitator/impeller was connected to a variable speed magnetic drive motor. Additionally, the pressure vessel was fitted with a sample/dip tube and a vent system used to maintain pressure at a desired level. The completely assembled reactor was capable of pressures of up to 1000 psig. All heating and cooling processes of the reactor were controlled via an external controller (RX-330).

The process consisted of reacting lime at approximately 2 lbs/gallon and a silica source such as diatomaceous earth and/or quartz at about 1.5 lbs/gallon. The reactions were made in a pressurized reactor over temperature range of 180° C. to 250° C. and the corresponding steam pressure, ranging from 200 psig (pounds per square inch gauge) to 600 psig. The total reaction time was approximately 4 to 6 hours. The resulting slurry concentration ranged from 0.3 lbs/gallon to 1.0 lbs/gallon.

The process conditions for the hydrothermal reaction such as calcium to silica ratio, slurry solids percentage, and temperature of reaction, were varied as shown in Table 1 below to prepare different crystal phases of calcium silicate hydrates, such as riversideite, tobermorite, xonotlite, and foshagite. For further specific examples, see U.S. Pat. No. 6,726,807 B1, issued on Apr. 27, 2004 for "Multi-phase Calcium Silicate Hydrates, Methods for Their Preparation, and Improved Paper and Pigment Products Produced Therewith", which is incorporated herein in its entirety, by this reference.

TABLE 1

Synthetic Calcium Silicate Hydrate Preparation-Process Conditions

| Reaction Conditions | | | Products | |
|---|---|---|---|---|
| Calcium/Silica Ratio | Slurry Solids (#/gal) | Temperature (°C.) | Crystal Phase | Crysto-Chemical Formula |
| 0.76 | 1.00 | 188 | Riversideite | $Ca_5Si_6O_{17}(OH)_2$ |
| 0.90 | 0.60 | 200 | Tobermorite | $Ca_5Si_6O_{16}(OH)_2$ |
| 1.05 | 0.45 | 230 | Xonotlite | $Ca_6Si_6O_{17}(OH)_2$ |
| 1.30 | 0.40 | 250-300 | Foshagite | $Ca_5Si_6O_{17}(OH)_2$ |

Figure 8:
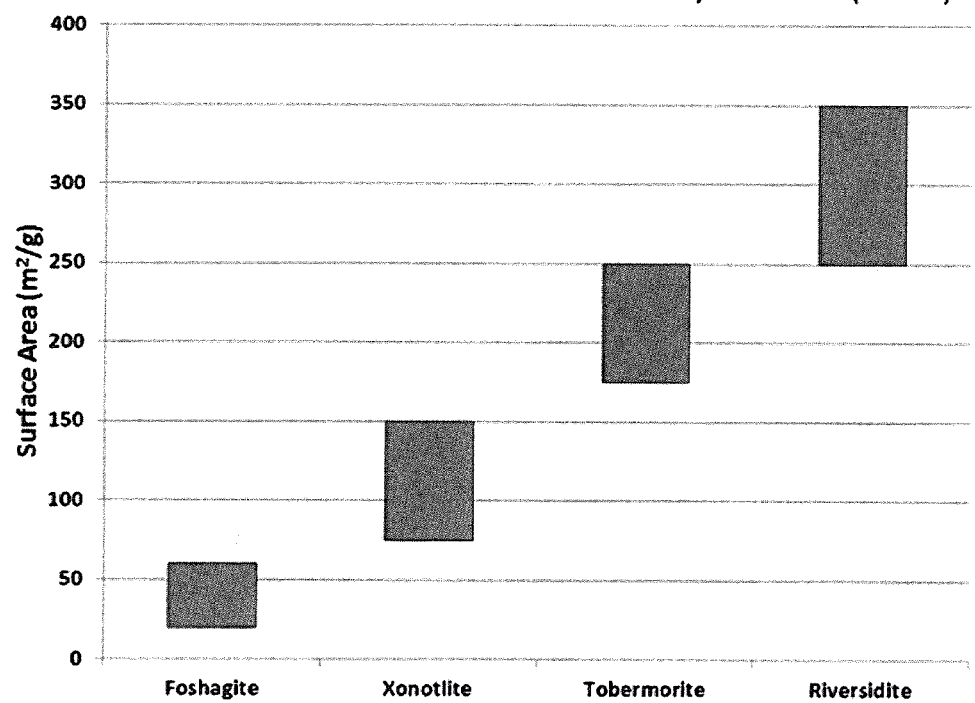
FIG. 8 is a graph showing the surface areas of different phases (i.e., the different forms, namely foshagite, xonotlite, tobermorite, and riversidite) of nano fibrous calcium silicate hydrates; the surface areas were obtained using the BET (Brunauer-Emmet-Teller) method (see S. Brunauer, P. H. Emmett and E. Teller, J. Am. Chem. Soc., 1938, 60, 309).
Figure 9:
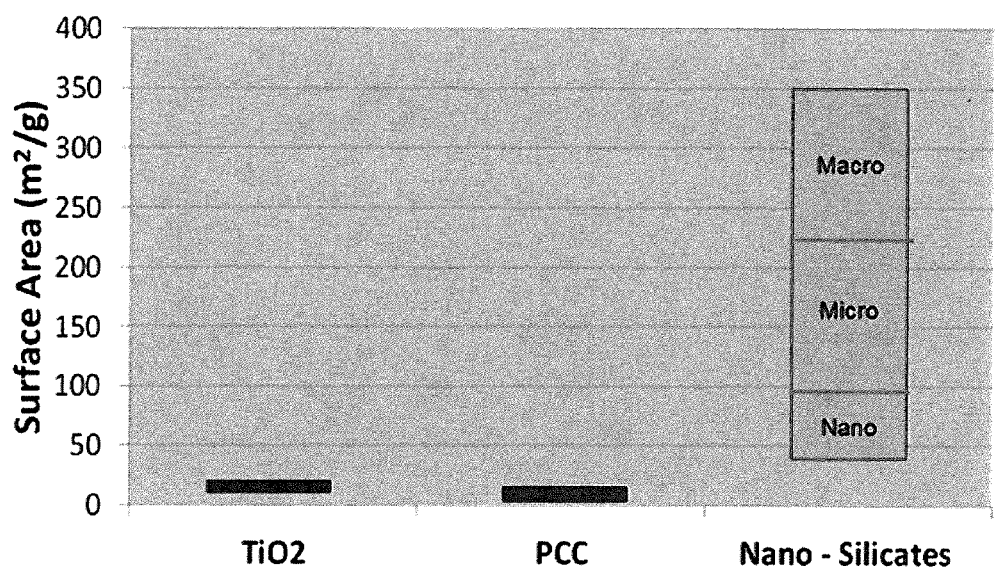
FIG. 9 is a graph which shows the surface areas (BET measurements) of nano fibrous calcium silicate hydrates against two common macro-sized mineral pigments, namely precipitated calcium carbonate (PCC) and titanium dioxide ($TiO_2$).
Figure 10:
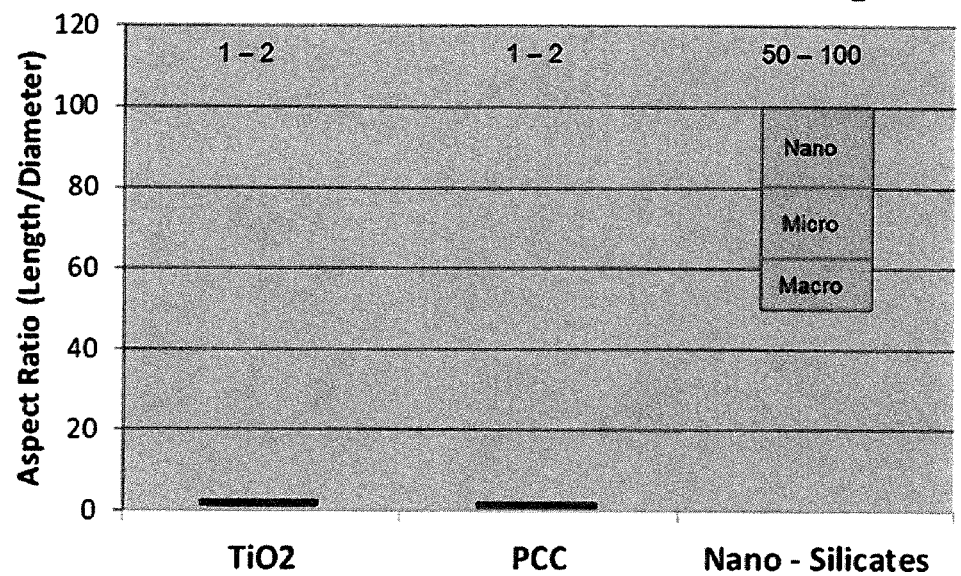
FIG. 10 is a graph which shows the relative aspect ratio of nano fibrous calcium silicate hydrates against two common macro-sized mineral pigments, namely precipitated calcium carbonate (PCC) and titanium dioxide ($TiO_2$).
Figure 11:
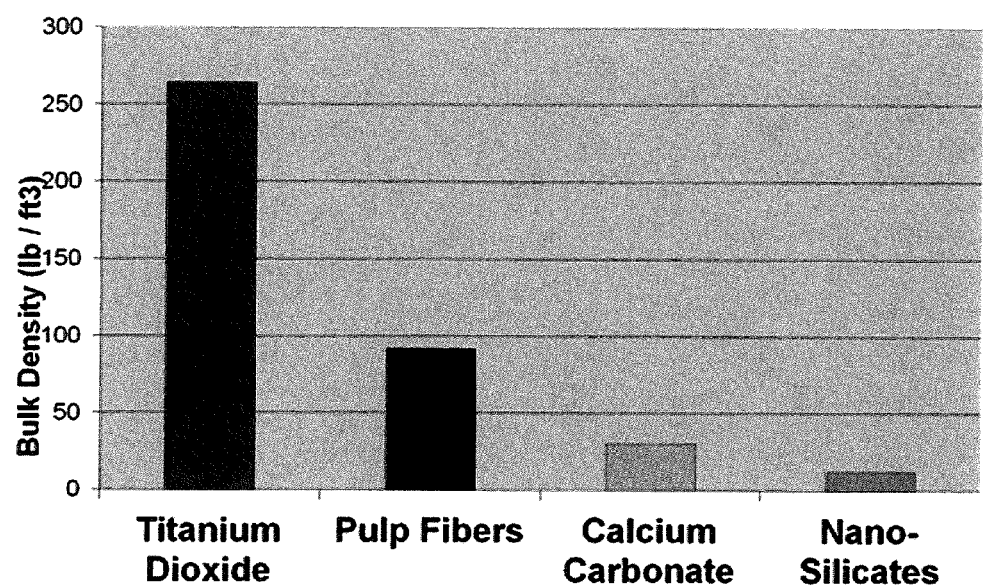
FIG. 11 is a graph showing the relative bulk densities (in pounds per cubic foot) of nano fibrous calcium silicate hydrates against various papermaking materials, namely pulp fibers, precipitated calcium carbonate (PCC), and titanium dioxide ($TiO_2$).

Some of the characteristics of the above noted phases of crystalline calcium silicate hydrates are provided in Table 2. Such crystal phases may be characterized, at least in part, by their: (1) X-Ray diffraction pattern, (2) surface area, (3) water absorption, (4) aspect ratio, and (5) bulk density. A graphical representation of typical surface areas of the noted phases of calcium silicate hydrates is provided in FIG. 8. A graphical comparison of the surface area of the nano-silicate composite material described and claimed herein with titanium dioxide ($TiO_2$) and with precipitated calcium carbonate (PCC) is shown in FIG. 9. A graphical comparison of the aspect ratio of the nano-silicate composite material described and claimed herein with titanium dioxide ($TiO_2$) and with precipitated calcium carbonate (PCC) is shown in FIG. 10. A graphical comparison of the bulk density of the nano-silicate composite material described and claimed herein with titanium dioxide ($TiO_2$), pulp fibers, and calcium carbonate is shown in FIG. 11.

TABLE 2

Characteristics of Various Calcium Silicate Hydrate Phases

| Crystal Phase | Riversideite | Tobermorite | Xonotlite | Foshagite |
|---|---|---|---|---|
| I. X-ray Diffraction Peaks (Å) | | | | |
| 1. Major Peak | 3.055 | 11.0 | 3.02 | 2.93 |
| 2. Minor Peeks | 3.58, 2.80 | 3.71, 3.00 | 2.04, 8.50 | 2.16, 4.96 |
| II. Surface Area ($m^2/g$) | 275-325 | 175-250 | 80-150 | 20-50 |
| III. Water Absorption (%) | 200-350 | 400-550 | 600-750 | 800-1000 |
| IV. Aspect Ratio (L:D) | ~5:1 | ~7.5:1 | ~30:1 | ~200:1 |
| V. Brightness (ISO) | 90-94 | 92-94 | 94-96 | 94-96 |
| VI. Bulk Density ($lbm/ft^3$) | 12.0 | 12.0 | 12.0 | 12.0 |

Figure 20:
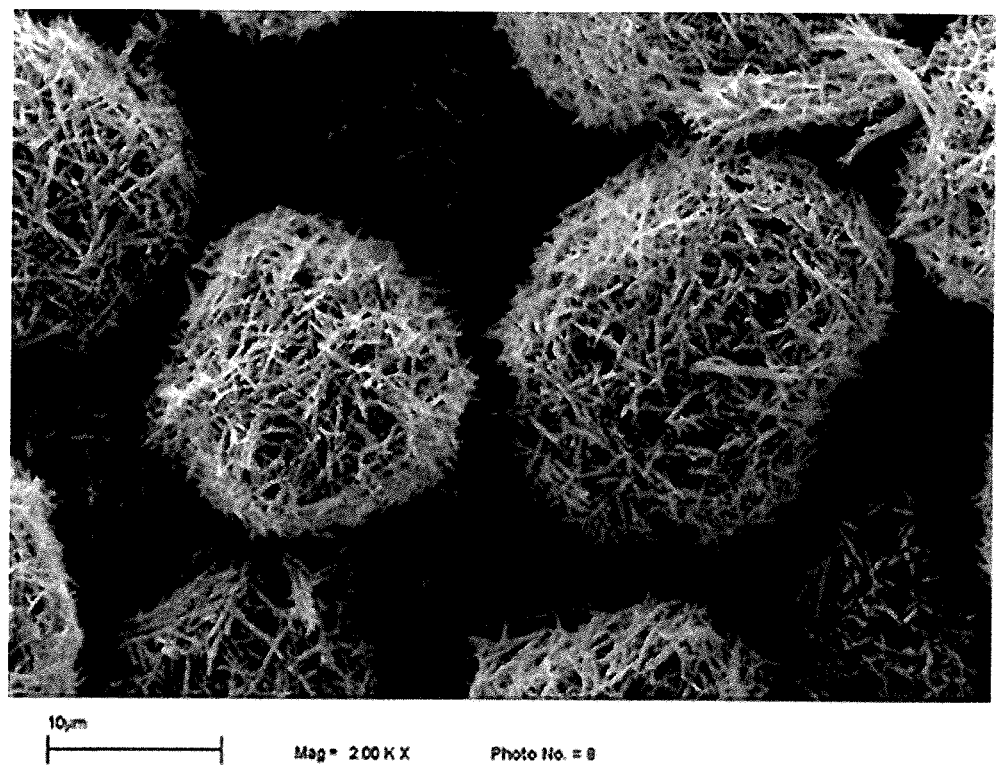
FIG. 20 is a photograph taken using a scanning electron microscope at 2000 times magnification of foshagite crystals; note that the primary structure shows nano-fibers while a secondary structure provides nano-fibers agglomerated into a "hollow" macrospherical structure.
Figure 21:
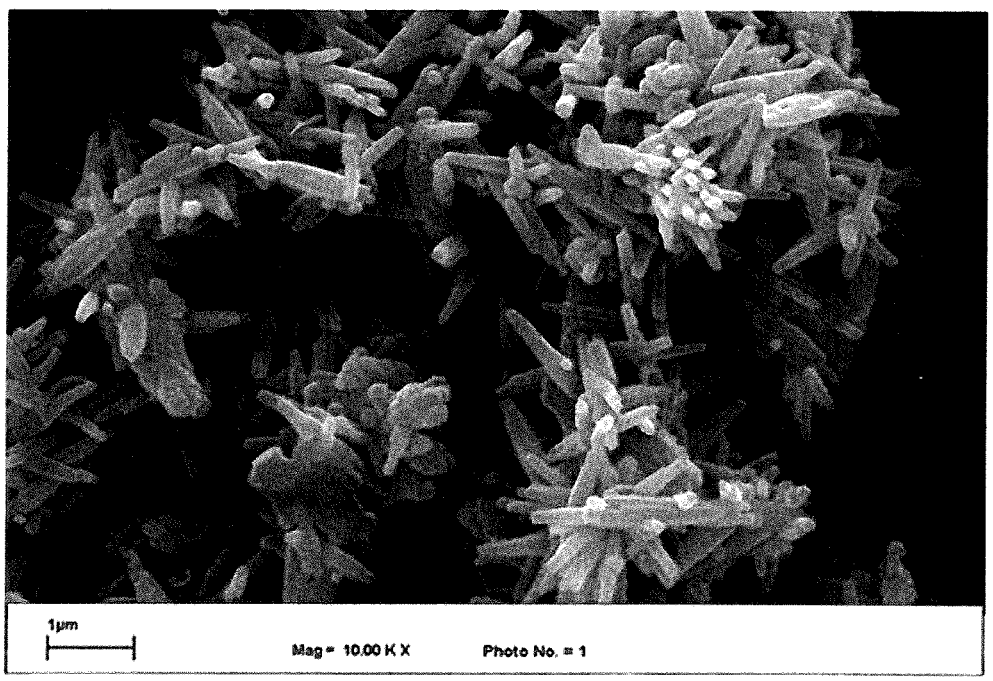
FIG. 21 shows a photograph taken using a scanning electron microscope at 10,000 times magnification of precipitated aragonite phase calcium carbonate crystals made by a pressure carbonation technique as more fully described herein below.
Figure 22:
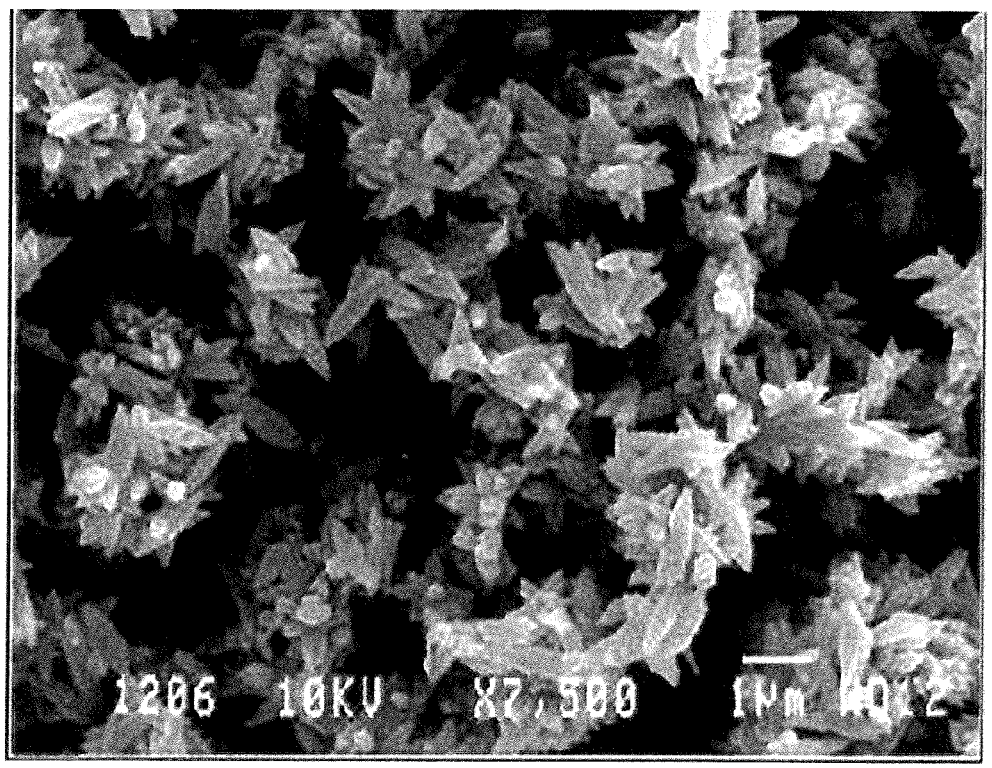
FIG. 22 shows a photograph taken using a scanning electron microscope at 10,000 times magnification of precipitated scalenohedral phase calcium carbonate crystals made by a pressure carbonation technique as more fully described herein below.
Figure 23:
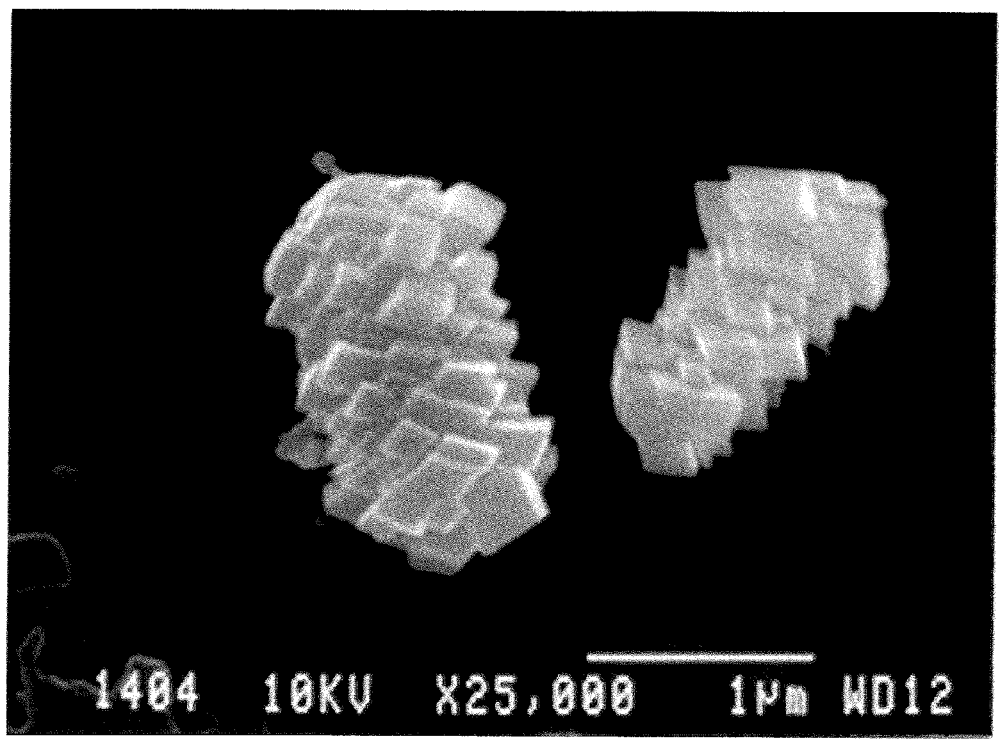
FIG. 23 shows a photograph taken using a scanning electron microscope at 10,000 times magnification of unique rhombohedral phase calcium carbonate crystals made by a pressure carbonation technique as more fully described herein below.
Figure 24:
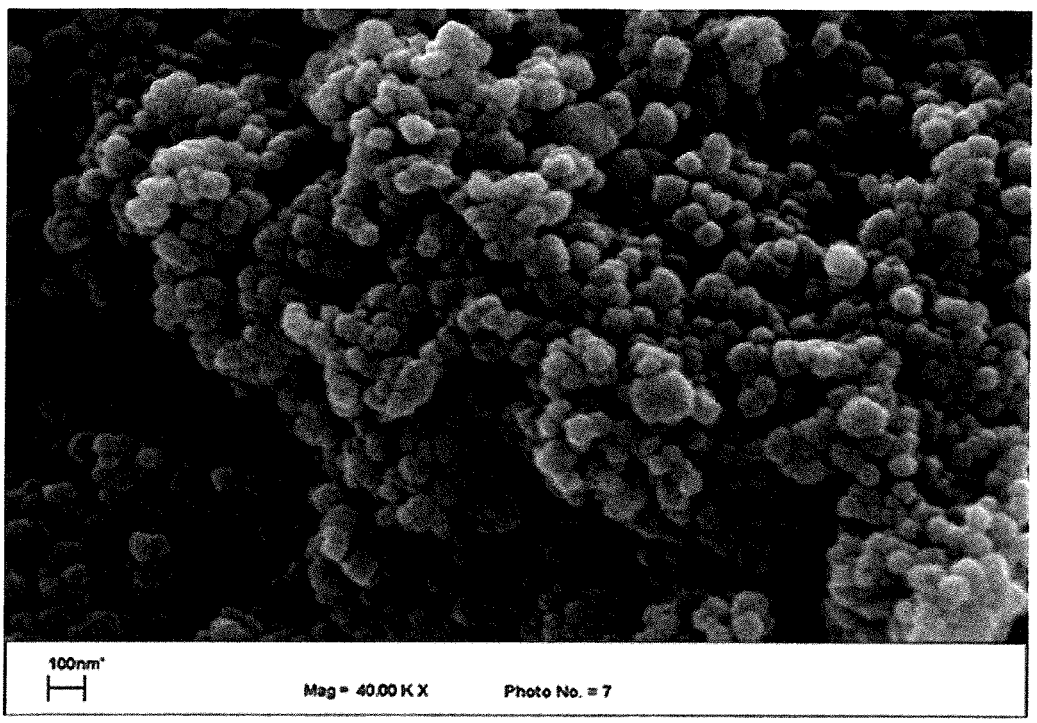
FIG. 24 shows a photograph taken using a scanning electron microscope at 40,000 times magnification of unique nano-rhombohedral phase calcium carbonate crystals made by a pressure carbonation technique as more fully described herein below; note that the primary particles agglomerate into secondary structures of from about 1 to about 2 microns in size.

The scanning electron microscope ("SEM") photographic images and corresponding x-ray diffraction ("XRD") patterns of the above noted four different phases of calcium silicate hydrate products are shown in FIGS. 12 through 19. The reaction conditions clearly influence the crystal structure and habit, and the chemical composition and the physical properties such as surface area, water absorption, brightness and bulk density. Depending on reaction conditions, such calcium silicate hydrates may be produced as macro particles, or as nano-fibers, or as macro fibers with a broad range of surface area, particle sizes, shapes and aspect ratios as shown in the just referenced drawing figures, and the above Tables 1 and 2. Additional SEM photographs given in FIG. 20 illustrates an embodiment that provides an example of a secondary structure for a suitable calcium silicate hydrate as a starting material in the manufacture of a nano-composite containing amorphous silica and calcium carbonate crystals in the form of aragonite.

A specific example of the experimental preparation of a selected synthetic nano fibrous calcium silicate hydrate, namely xonotlite, is now provided. The reaction was carried out at selected conditions, in order to produce xonotlite. The reaction was carried out in a high pressure 7.5 liter reactor supplied by Parr Instruments. The hydrothermal process conditions are given in Table 3 below. The resulting xonotlite properties are summarized in Table 4.

TABLE 3

Process Conditions for manufacture of Synthetic Xonotlite

| Ca/Si Ratio | 1.05 |
|---|---|
| Solids (#/gal) | 0.45 |
| Temperature (° C.) | 230 |
| Reaction Time (hrs) | 2 |
| Reaction Volume (L) | 4.8 |
| Total Mass (lbs) | 0.57 |

TABLE 4

Properties of Synthetic Xonotlite

| pH | 11.6 |
|---|---|
| Surface Area (m2/g) | 137 |
| Water Absorption (%) | 315 |
| Oil Absorption (%) | 379 |
| X-Ray Diffraction | Xonotlite (See FIG. 5) |
| Scan Electron Microscope | See FIG. 4 |
| Total Mass (lbs) | 0.57 |

The final pH of the xonotlite slurry was 11.6. The BET surface area for the dry xonotlite was 137 square meters per gram. The water and oil absorption of the dry xonotlite were 315% and 379% respectively. The Scan Electron Microscope (SEM) photograph and X-ray diffraction (XRD) pattern of the produced xonotlite are shown in FIGS. 4 and 5 respectively. The X-ray diffraction pattern set forth in FIG. 5 shows the predominate presence xonotlite. The SEM photograph shown in the circled area of FIG. 4 indicates a secondary fibrous hollow macrosphere structure made up primarily of nano-fibers.

Formation of Nano-Structured Composite.

Cogeneration of a nano-composite including structured amorphous silica (SAS) and fibrous crystalline aragonite carbonate (FCA) by pressure carbonation may be accomplished, once one or more selected calcium silicate hydrates are available as a raw material, and a supply of carbon dioxide is available. The cogeneration of a nano-composite (SAS+FCA) involves pressure carbonation.

Seeding.

It has been found that efficiency of the carbonation of fibrous silicate may be significantly improved by adding certain seed materials, and/or reaction promoter materials, and/or catalysts, and/or pH modifiers, as further described below. In an embodiment, suitable seed materials may include previously generated nano-composite materials that include cogenerated nano fibrous structured amorphous silica and nano fibrous crystalline aragonite. Additional seed materials may include commercially produced calcium carbonates ($CaCO_3$) in the aragonite phase. The total quantity of seed materials to be added may range from about 2% to about 20% of the total weight of reactants.

Catalysts/Promoters

Catalysts may include a mixture of calcium hydroxide ($Ca(OH)_2$) and magnesium hydroxide ($Mg(OH)_2$). The total quantity of catalytic material may range from about 2.0% to about 10.0%, and the ratio of calcium hydroxide to magnesium hydroxide may range from about 1:1 to about 2:1. Such catalysts also serve as pH buffers and promoters, and help to remove certain impurities from process water. In an embodiment, before the start of pressure carbonation, the described seed materials, and catalysis/promoters were added to a xonotlite slurry produced as described above.

Pressure Carbonation of Synthetic Calcium Silicate Hydrates (CSH)

As the seed material was added to a hot silicate slurry (<70° C.), the slurry was cooled to a final temperature ranging from 50° C. to 75° C. The reaction vessel was then pressurized using a non-reactive gas to a pressure ranging from 30 psig to 100 psig. After that, a carbon dioxide ($CO_2$) containing gas flow was injected under pressure through the vessel. The carbon dioxide composition of the gas stream varied between 5% and 100% $CO_2$ by weight. The gas flow was between 1.3 liters per minute to 7.2 liters per minute, and provided a theoretical reaction rate of between about 1.5 grams per liter per minute to about 8 grams per liter per minute. Throughout the carbonation reaction, the contents were agitated with a built-in agitator. The paraxial tip speed of the agitator was 8800 inches per minute (at a rotational speed of 700 RPM). The lab reaction was carried out in a 5.7 liter pressurized Parr reactor. Rotational speed (RPM) was measured by a tachometer attached to the motor of the agitator. The reaction temperature was measured by using a thermocouple temperature probe. Carbon dioxide flow rate was measured using a carbon dioxide specific flow meter with a totalizer to calculate the total carbon dioxide consumed. The pressure was recorded by a pressure probe and shown on a pressure gauge.

The carbonation reaction between the silicate slurry and carbon dioxide is an exothermic reaction. Thus, as the reaction proceeded, the temperature of the slurry increased. The end of the carbonation reaction was indicated by the reactor temperature reaching a peak and then stabilizing to a plateau. Usually the increase in temperature ($\Delta T$) was in the range of 5° C. to 15° C., depending on the reactivity of the silicate, and the composition of the starting calcium silicate hydrate. The end of the carbonation reaction was also indicated by plotting the temperature profile.

During reaction, the incoming $CO_2$ was continuously consumed by the calcium constituents of the CSH. Thus, while the $CO_2$ was initially introduced at an initial pressure of approximately 70 psig, and, while the temperature increased due to the exothermic nature of the carbonation reaction, the pressure in the reactor remained fairly close to the initial pressure. However, at the end of the reaction, the calcium ions ($Ca^{++}$) and carbonate ions ($CO_3^{--}$) were fully consumed. In the experimental apparatus, the excess carbon dioxide at the end of the reaction started to increase the pressure of the reactor. Thus, while the end of the reaction was indicated by the temperature plot, another indicator was an increase in the rate of change in the pressure of the reaction vessel.

Thus the completion of the carbonation of calcium silicate hydrates was indicated by the temperature reaching a plateau and the pressure increasing significantly. The progress of the pressure carbonation reaction was also monitored by following the pH and conductivity of the slurry. The pH, as per equation 2 above decreased from an initial pH of approximately 11 to a final pH of 6.5 to 7.5. The conductivity also fell as the free calcium ($Ca^{++}$) ions were used up to produce non-ionic $CaCO_3$. The above noted pH was measured after the temperature reached a maximum and the pressure rate started to increase.

Another test utilized was the Mohr's Salt test. That test involved applying a solution of ammonium iron(II) sulfate (Mohr's Salt, namely $(NH_4)_2Fe(SO_4)_2 \cdot 6H_2O$)) to a sample of the nano-composite slurry. The development of a green color indicated the presence of aragonite crystal phase. This test was further confirmed by an X-ray diffraction (XRD) analysis. Another test conducted was the surface area of the final product, using the BET method. In an embodiment, a range of surface areas was found, from about 50 square meters per gram to about 150 square meters per gram.

An example of cogeneration of a nano-composite (SAS+ FCA), namely structured amorphous silica and fibrous crystalline aragonite carbonate, is now provided. A reaction was carried out according to the conditions necessary to produce a nano-composite of structured amorphous silica and fibrous crystalline aragonite carbonate. The reaction was carried out in a high pressure 7.5 L reactor supplied by Parr Instruments. The pressure carbonation process conditions are given in Table 5 below. The resulting nano-composite properties are summarized in Table 6.

Previous work has shown that different sources of silica (Flux calcined diatomaceous earth, ground quartz, and regular diatomaceous earth) will result in different silicate properties. The xonotlite formation reaction example above was conducted using a flux calcined Diatomaceous Earth product as a silica source. The X-Ray Diffraction pattern and SEM photograph of a resulting nano-composite (SAS+FCA) is [provided in FIGS. 6 and 7, respectively.

TABLE 5

Summary of Process Conditions - Carbonation of Xonotlite

| | |
|---|---|
| Initial Temp (° C.) | 60 |
| Final Temp (° C.) | 70 |
| $\Delta T$ (° C.) | 10 |
| Volume (gal) | 1.27 |
| Solids (lb/gal) | 0.45 |
| Total Mass (lb) | 0.57 |
| CO2 Flow (L/min) | 3.6 |
| Start Pressure (psig) | 70 |

Product Testing Parameters

Figure 6:
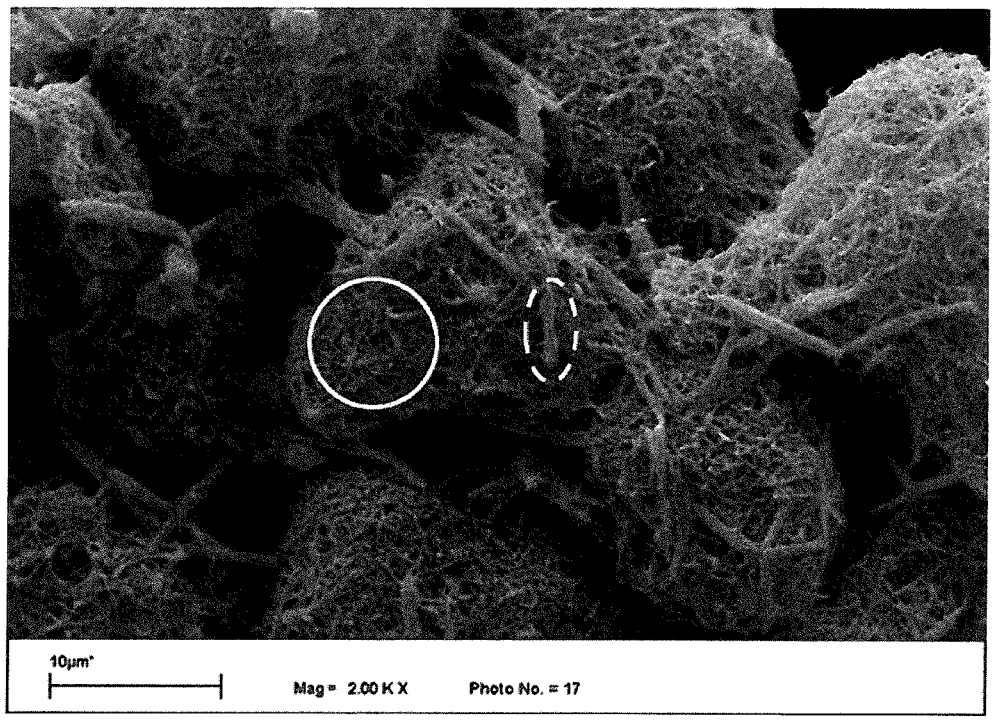
FIG. 6 is a photograph taken in a scanning electron microscope at 2000 times magnification of a sample of a composite including nano structured amorphous silica and nano fibrous crystalline aragonite (precipitated calcium carbonate) made by a process described herein; the material in the small oval is a fibrous crystalline aragonite, while the material in the large circle includes a structured amorphous silica.

Some product parameters tested were:
1) Surface Area—BET Method (m2/g);
2) pH;
3) Chemical Test for crystal structure (Aragonite or Calcite) (e.g. Mohr's Salt test);
4) Water Absorption;
5) Oil Absorption;
6) X-Ray Diffraction Pattern (XRD See FIG. 7); and
7) Scanning Electron Micrograph (SEM See FIG. 6).

Some calculated parameters were:
1) CO2 Efficiency (%); and
2) Reaction Rate (grams per liter per minute).

TABLE 6

Summary of Properties of Nano-Composite including Nano Fibrous Structured Amorphous Silica (SAS) and Nano Fibrous Crystalline Aragonite Calcium Carbonate (FCA)

| | |
|---|---|
| pH | 6.7 |
| Surface Area (m2/g) | 119 |
| Water Absorption (%) | 277 |
| Oil Absorption (%) | 230 |
| X-Ray Diffraction | Aragonite (See FIG. 7) |
| Scan Electron Microscope | See FIG. 6 |
| Solids (lb/gal) | 0.63 |
| Reaction Volume (L) | 4.8 |
| Total Mass (lb) | 0.78 |
| CO2 Used (L) | 65 |
| CO2 Efficiency (%) | 76% |

Figure 7:
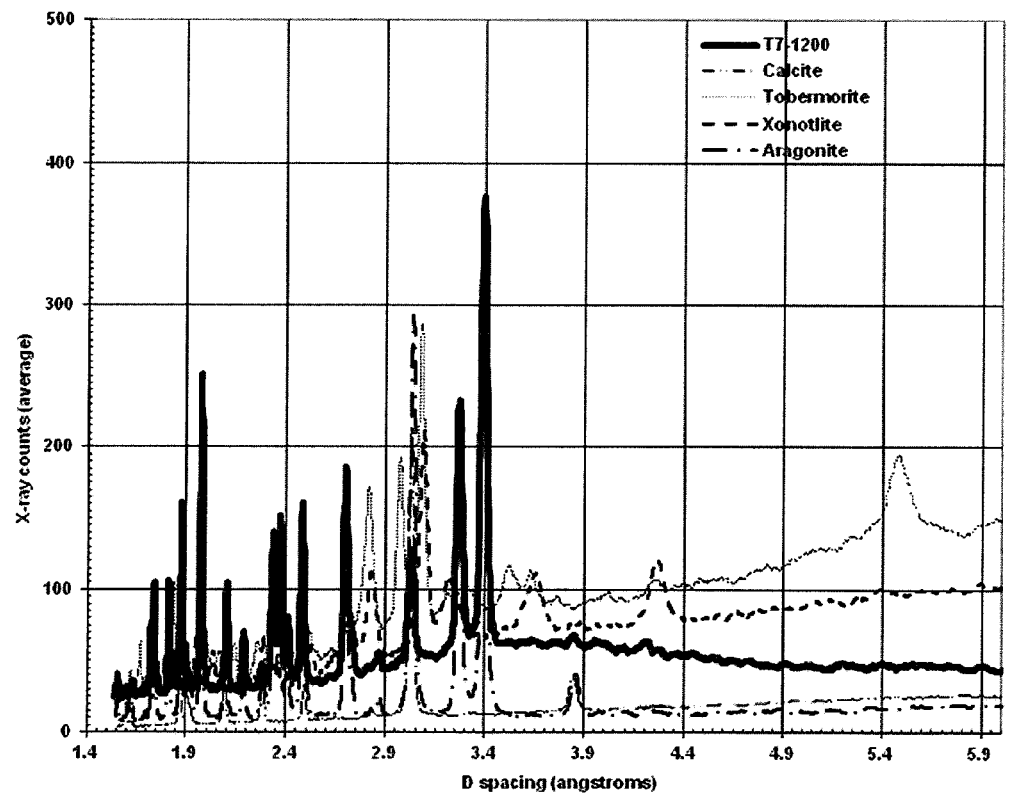
FIG. 7 is a graph of the X-ray diffraction (XRD) scan of a sample of the material shown in FIG. 6, along with scan of some controls including calcite, aragonite, tobermorite, and xonotlite; this XRD data indicates that the sample material includes peaks at the same locations as aragonite crystals.

The XRD pattern (see FIG. 7) for the carbonated synthetic silicate showed Nano Fibrous Crystalline Aragonite (precipitated calcium carbonate) and a trace of synthetic silicate (Tobermorite). The photographs taken with a scanning electron microscope (see FIG. 6), however, show two distinct component structures. A first structure resembled the shape of one of the raw materials, namely the xonotlite calcium silicate hydrate. The second structure resembled crystalline aragonite precipitated calcium carbonate. However, since crystalline silica was virtually absent in the X-Ray diffraction pattern, it may be inferred that the silica component was, after the carbonation reaction, essentially in a non-crystalline, i.e. amorphous form. The SEM photograph of the raw materials, namely synthetic xonotlite and its corresponding XRD are given in FIGS. 4 and 5. The SEM photograph of the resulting nano-composite material (SAS+FCA) compound, after the pressure carbonation process, as well as its corresponding XRD, are shown in FIGS. 6 and 7, respectively.

A comparison of a selected raw material, and of a sample of the finished product, namely a nano-composite (SAS+FCA) may be instructive. An SEM photograph of a selected raw material, namely xonotlite crystals, is shown in FIG. 4. The XRD for those xonotlite crystals is provided in FIG. 5. As illustrated in FIG. 5, after carbonation of the xonotlite raw materials, the SEM of the carbonated xonotlite showed two distinct structures, namely aragonite (dashed oval) and $SiO_2$ (solid circle). However, as shown in FIG. 7, the X-Ray diffraction pattern of the novel nano-composite materials (SAS+FCA) showed the presence of a single predominant crystalline component, namely aragonite calcium carbonate. Thus, it can be inferred that the remaining $SiO_2$ was in an amorphous form. Thus, the work discovered that the carbonation of synthetic calcium silicate hydrates was technically feasible, and resulted in an unexpected nano-composite (SAS+FCA) product.

In one aspect, the pressure carbonation of synthetic calcium silicate hydrates resulted in the unexpected formation of a nano-fibrous crystalline aragonite calcium carbonate (FCA). Such crystal structure was also confirmed by the chemical chromatic test using Mohr's Salt (green color). And, since the xonotlite, silica portion of the XRD shown in FIG. 5 was not detected in the XRD pattern of the nano-composite illustrated in the XRX shown in FIG. 7, it is postulated that the final, carbonated nano-composite (SAS+FCA) material was mostly nano-fibrous structured amorphous silica (SAS), which was produced from a crystalline calcium silicate hydrate.

Example 1

Step 1: Preparation of Synthetic Calcium Silicate Hydrate—Xonotlite

Initially, 117.4 grams of ½" rotary pebble lime (from Graymont Lime Co.) was accurately weighed and slaked in 350 milliliters of reverse osmosis water. The slaking reaction is exothermic and caused the slurry temperature to rise to near boiling. When the slurry temperature was very near boiling and before much of the water had evaporated, an additional 90 milliliters of water was added to both dilute and cool the slurry. The slurry was then agitated for 30 minutes to insure slaking completion before being screened through a 100 mesh screen. The slurry was then transferred to the 5 liter autoclave previously described and tested for lime availability in accordance with ASTM method C25. Approximately 137.2 grams of fine fluxed calcined diatomaceous earth (FCDE) (MW-27 from Eagle Picher Minerals) was weighed and added to 750 ml of hot water (concentration of approximately 1.52 lb/gallon). The silica slurry was added to the screened and tested lime slurry. The exact amount of silica slurry added to lime slurry was determined by the lime availability such that a mol ratio of approximately 1.05 mol $CaO/SiO_2$ would be maintained. The total slurry volume was also adjusted by adding water to a final concentration of 0.45 lb/gallon. The autoclave was continuously agitated at a constant speed of 250 rpm. The starting temperature of the slurry was approximately 25° C. The reactor was heated for approximately 100 min in order to reach the target temperature of 230° C. The temperature was maintained at 230° C. for 2 hours, after which, the "quenching" water was flushed through the cooling coil built inside the autoclave. This cooling process was maintained until the inside vessel temperature reached approximately 80° C. (roughly 30 min), at which point, the vessel was depressurized and opened and the reaction products were transferred to a holding vessel for storage. One portion of the resultant slurry was tested for pH. The other part of the slurry was dried in a 105° C. oven for 12 hours. During the drying process, the slurry formed hard lumps, which had to be broken up through the use of a mortar and pestle. The powdered, dry product was brushed through a 100 mesh screen to insure product uniformity during testing. The pigment in this example was designated MW-2.

Tests carried out on the dry powder were as follows:

1. Surface Area (BET Method);
2. pH;
3. Percent Water Absorption;
4. Percent Oil Absorption;
5. X-ray diffraction analysis; and
6. Scanning Electron Micrograph (SEM).

The process conditions are given in Table 7 and the pigment properties are given in Table 8:

TABLE 7

Process conditions of Xonotlite Formation (MW-2)

| Batch # | Raw Material | Molar Ratio ($CaO/SiO_2$) | Concentration (lb/gallon) | Temperature (° C.) | Reaction Time (hours) |
|---|---|---|---|---|---|
| MW-2 | FCDE | 1.05 | 0.45 | 230 | 2 |

TABLE 8

Properties of Xonotlite (MW-2)

| Batch # | BET ($m^2/g$) | pH | Water Absorption (%) | Oil Absorption (%) |
|---|---|---|---|---|
| MW-2 | 137 | 11.6 | 315 | 379 |

The x-ray diffraction pattern of this novel, synthetic multiphase calcium silicate hydrate, namely xonotlite, is given in FIG. 5. This product gave a unique x-ray pattern. The pattern indicated that the powder had one major phase. The summary of the characteristic "peaks" is shown in Table 9. The major peaks for phase I were found to indicate the presence of calcium silicate hydrate-xonotlite-($Ca_6Si_6O_{17}(OH)_2$) with major peaks at d(Å)=3.107, d(Å)=1.75 and a minor peak at d(Å)=3.66.

TABLE 9

X-ray diffraction peak analysis and summary for MW-2

| Common Name | Crystallchemical Formula | d-spacing (Major) | d-spacing (median) | d-spacing (Minor) |
|---|---|---|---|---|
| Xonotlite | $Ca_6Si_6O_{17}(OH)_2$ | d = 3.107 Å | d = 1.75 Å | d = 3.66 Å |

Some SEM pictures at 1,500 times magnification are shown in FIG. 4. The SEM clearly shows the "fibrous" structure of xonotlite. The diameter of the "nano-fibers" ranges from 10-20 nm while the length ranges from 1 to 5 microns. This gives the material an aspect ratio of about 100:1. The SEM also depicts the three dimensional structure of the secondary particles of calcium silicate hydrates. Such secondary structure has a "pillow" or "haystack" or "globular" type appearance. The structure appears to have been formed by an interlocking of the primary "fibrous" crystals and some inter-fiber bonding due to hydro gel of silica formed during the initial stages of hydro-thermal reaction. Because of these two main reasons, the secondary particles are fairly stable and do not significantly lose their 3-d structure when subjected to process shear. In addition, these particles also seem to withstand the pressure encountered during the calendaring or finishing operations integral to papermaking and coating. The median size of the secondary particles, as seen, ranges from 10 to about 40 microns.

Step 2: Cogeneration of Nano-Composite Having a Structured Amorphous Silica Component and a Fibrous Crystalline Carbonate (Aragonite) Component by Pressure Carbonation The xonotlite slurry produced in step 1 was placed into a reactor at a slurry concentration of 0.45 pounds per liter. The starting carbonation temperature was 60° C. The reaction was carried out under a starting pressure of 70 psig. Carbon dioxide gas was bubbled through the reactor. The flow of carbon dioxide was at the rate of 3.6 liters per minute. As the reaction proceeded, the reaction temperature increased, with the temperature starting at 60° C. and ending at approximately 70° C. The end of the reaction was indicated when the temperature reached a maximum and then declined. The point of inflection in the temperature curve was taken as the completion point of the carbonation reaction. The pressure in the vessel spiked due to the incoming and unused CO2. The reaction vessel was first depressurized by opening the pressure control valve and then opened and the reaction products were transferred to a holding vessel for storage. A portion of the resultant slurry was dried in a 105° C. oven for 12 hours. During the drying process, the slurry formed hard lumps, which had to be broken up through the use of a mortar and pestle. The now powdered, dry product was brushed through a 100 mesh screen to insure product uniformity when testing. The pigment in this example was designated MW-2-ARA.

The tests carried out on the dry powder were as follows:
1. Surface Area (BET Method);
2. pH;
3. Percent Water Absorption;
4. Percent Oil Absorption (ASTM D281-12);
5. Mohr Salt Test;
6. X-ray diffraction analysis; and
7. Scanning Electron Micrograph (SEM).

The process conditions for cogeneration of nano-composites are given in Table 10 and the product properties are given in Table 11.

TABLE 10

Process conditions of MW-2-ARA

| Batch # | Start Temperature (° C.) | Final Temperature (° C.) | Δ T (° C.) | Start Pressure (psig) | $CO_2$ Flow Rate (L/min) |
|---|---|---|---|---|---|
| MW-2-ARA | 60 | 70 | 10 | 70 | 3.6 |

TABLE 11

Properties of Nano-Comoosite (MW-2-ARA)

| Batch # | BET ($m^2/g$) | pH | Water Absorption (%) | Oil Absorption (%) | Mohr Salt Test |
|---|---|---|---|---|---|
| MW-2-ARA | 119 | 6.7 | 277 | 230 | Green |

The XRD pattern given in FIG. 7 clearly identifies the presence of crystalline xonotlite as a predominant component. However, no XRD peak for a silica product (SiO2) was observed.

As seen in FIG. 7, the XRD pattern for a carbonated synthetic calcium silicate hydrate showed a peak for precipitated calcium carbonate, namely aragonite (Nano-fibrous crystalline aragonite), and a peak for a trace of synthetic calcium silicate hydrate (namely tobermorite). As seen in FIG. 6, however, the SEM photographs for the nano-composite (SAS+FCA) shows two distinct structural features, namely $SiO_2$ (in the solid circle) and aragonite (in the dashed oval). The first structural feature, $SiO_2$, resembles the original starting material, namely a haystack or globular structure similar to the structure seen in the xonotlite (see the large circle illustrated in FIG. 4 above). The second structural feature resembles a crystalline aragonite PCC (see FIG. 21). The presence of a silica product was confirmed by an EDAX analysis (see FIG. 60). Since the silica product was virtually absent in the X-Ray diffraction pattern of the nano-composite (SAS+FCA) as shown in FIG. 7, it may be inferred that the silica component was essentially non-crystalline, or amorphous.

Example 2

Step 1: Preparation of Synthetic Calcium Silicate Hydrate—Xonotlite

A novel multiphase calcium silicate hydrate of was formed by way of the hydrothermal reaction of lime and silica as described in Example 1. The difference was that the silica source used was a non-calcined or natural diatomaceous earth. The sample was labeled MN-2. The process conditions are given in Table 12 and the pigment properties are given in Table 13.

TABLE 12

Process conditions of Xonotlite Formation (MN-2)

| Batch # | Raw Material | Molar Ratio ($CaO/SiO_2$) | Concentration (lb/gallon) | Temperature (° C.) | Reaction Time (hours) |
|---|---|---|---|---|---|
| MN-2 | Natural DE | 1.05 | 0.45 | 230 | 2 |

TABLE 13

Properties of Xonotlite (MN-2)

| Batch # | BET (m²/g) | pH | Water Absorption (%) | Oil Absorption (%) |
|---|---|---|---|---|
| MN-2 | 75 | 12.2 | 432 | 290 |

Figure 26:
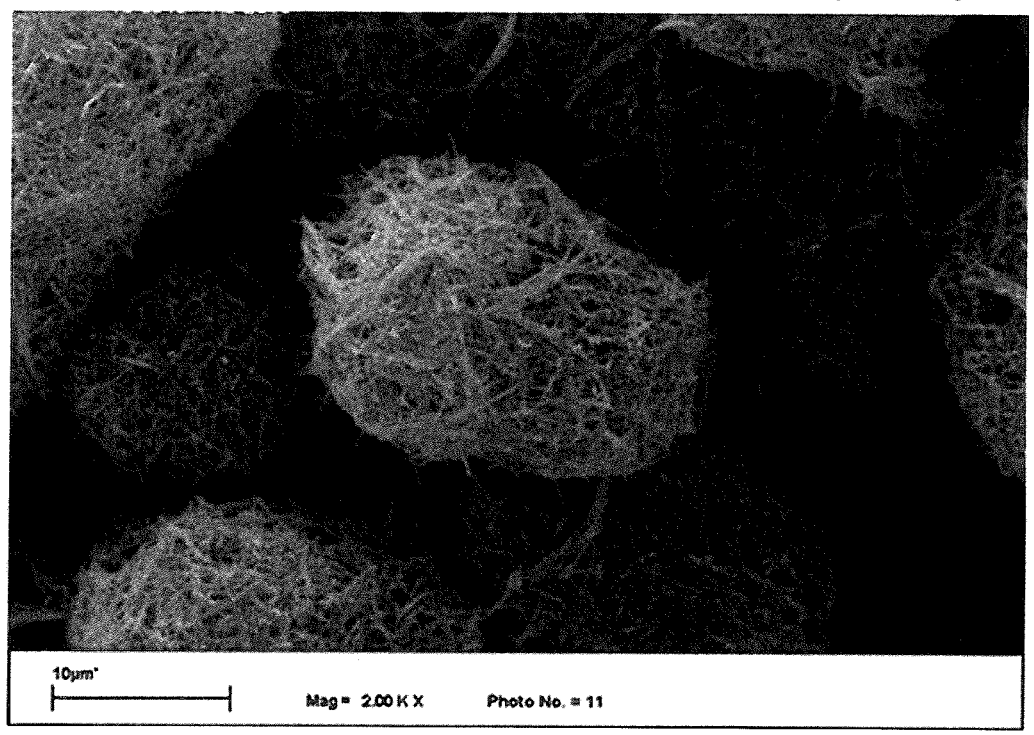
FIG. 26 shows a photograph taken using a scanning electron microscope at 2000 times magnification of a unique synthetic calcium silicate hydrate in the xonotlite phase, showing macro structured particles that may be selected as a raw material in the manufacture of a nano-composite material that includes both nano-fibrous crystalline aragonite and nano-structured amorphous silica.
Figure 27:
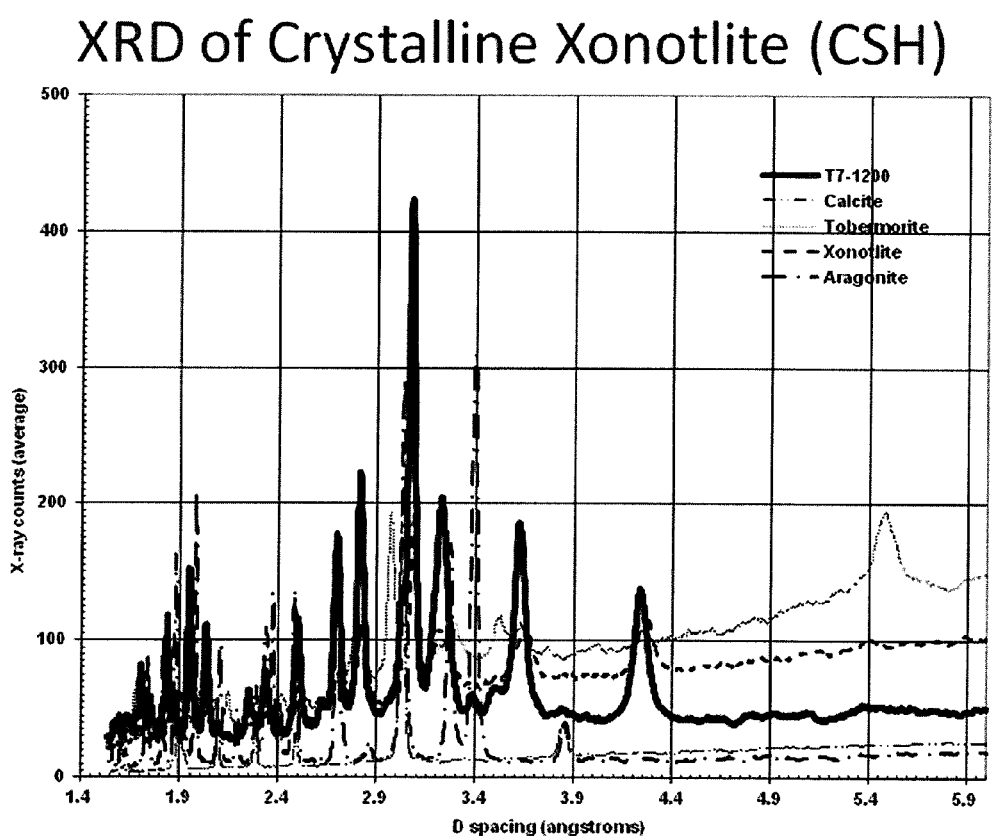
FIG. 27 shows a graph of an X-ray diffraction (XRD) scan of a sample of the unique material just shown in FIG. 26 (designated as sample material T7-1200), along with some standard control materials including calcite, aragonite, tobermorite, and xonotlite; note that the data indicates that the sample material includes peaks at the location of major XRD peaks of xonotlite, with a minor amount of tobermorite.

The graph of the XRD pattern of this nano-composite is a given in FIG. 27. The SEM photograph of this nano-composite is given in FIG. 26.

Step 2: Cogeneration of Nano-Composite Having a Structured Amorphous Silica Component and a Fibrous Crystalline Carbonate (Aragonite) Component by Pressure Carbonation In this step, the same process conditions were followed as in Example 1. The sample was labeled MN-2-ARA. The process conditions for cogeneration are given in Table 14 and the pigment properties are given in Table 15:

TABLE 14

Process conditions of MN-2-ARA

| Batch # | Start Temperature (° C.) | Final Temperature (° C.) | Δ T (° C.) | Start Pressure (psig) | $CO_2$ Flow Rate (L/min) |
|---|---|---|---|---|---|
| MN-2-ARA | 60 | 70 | 10 | 70 | 3.6 |

TABLE 15

Properties of Nano-Composite (MN-2-ARA)

| Batch # | BET (m²/g) | pH | Water Absorption (%) | Oil Absorption (%) | Mohr Salt Test |
|---|---|---|---|---|---|
| MN-2-ARA | 119 | 6.7 | 277 | 230 | Green |

Figure 3:
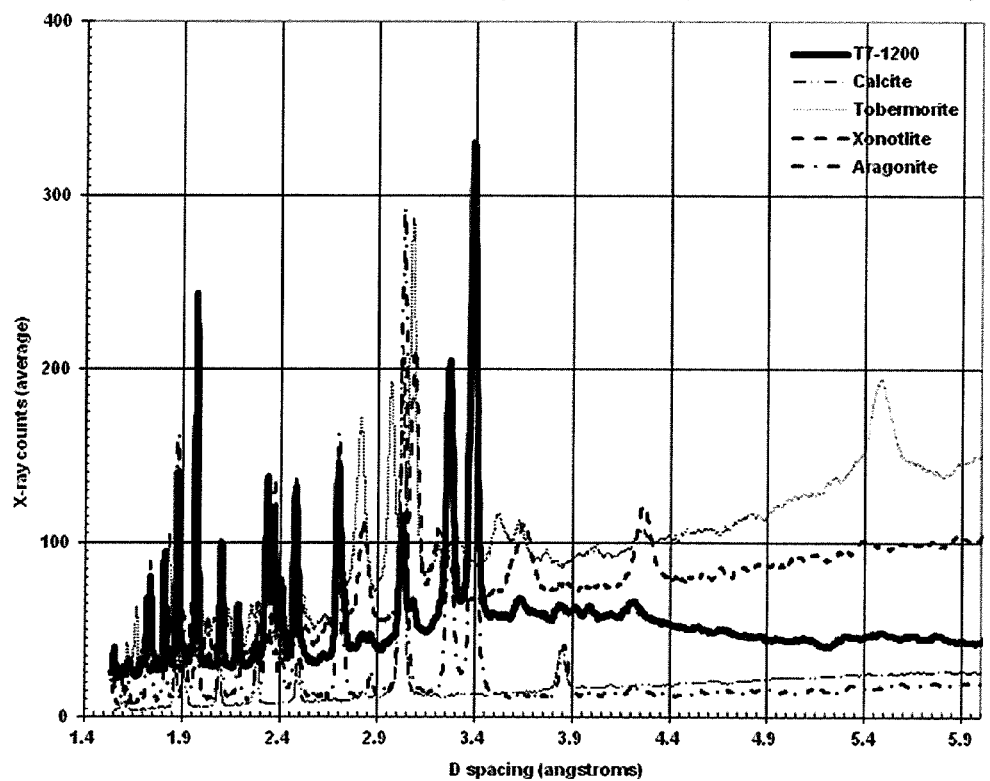
FIG. 3 is a graph of an X-ray diffraction (XRD) scan of the sample just shown in FIG. 2 above, along with scans of control compounds including calcite, aragonite, tobermorite, and xonotlite; the data indicates that the sample includes XRD peaks at the same locations as the aragonite crystalline sample, with a minor amount of tobermorite crystals.

The graph of the XRD pattern of this nano-composite is provided in FIG. 3. The SEM photograph of this nano-composite is given in FIG. 2.

Example 3

Step 1: Preparation of Synthetic Calcium Silicate Hydrate—Tobermorite

This novel, multiphase calcium silicate hydrate of was formed by the same hydrothermal reaction of lime and silica as described in Example 1. The differences were that the silica source was course ground quartz (Sil-Co-Sil 106 from US Silica). The reaction temperature was reduced to 220° C., and the reaction time was increased to 4 hours. Finally, the $CaO/SiO_2$ molar ratio was increased to 1.30 while the solids of the slurry were decreased to 0.36 lbs/gallon. This product was made in a 30 gallon reactor with similar probes and agitator as the 2 gallon reactor described above. The sample was labeled T30-8-078. The process conditions are given in Table 16 and the pigment properties are given in Table 17:

TABLE 16

Process conditions of Tobermorite Formation (T30-8-078)

| Batch # | Raw Material | Molar Ratio ($CaO/SiO_2$) | Concentration (lb/gallon) | Temperature (° C.) | Reaction Time (hours) |
|---|---|---|---|---|---|
| T30-8-078 | Ground Quartz | 1.30 | 0.36 | 220 | 4 |

TABLE 17

Properties of Tobermorite (T30-8-078)

| Batch # | BET (m²/g) | pH | Water Absorption (%) | Oil Absorption (%) |
|---|---|---|---|---|
| T30-8-078 | 239 | 10.8 | 559 | 600 |

Figure 28:
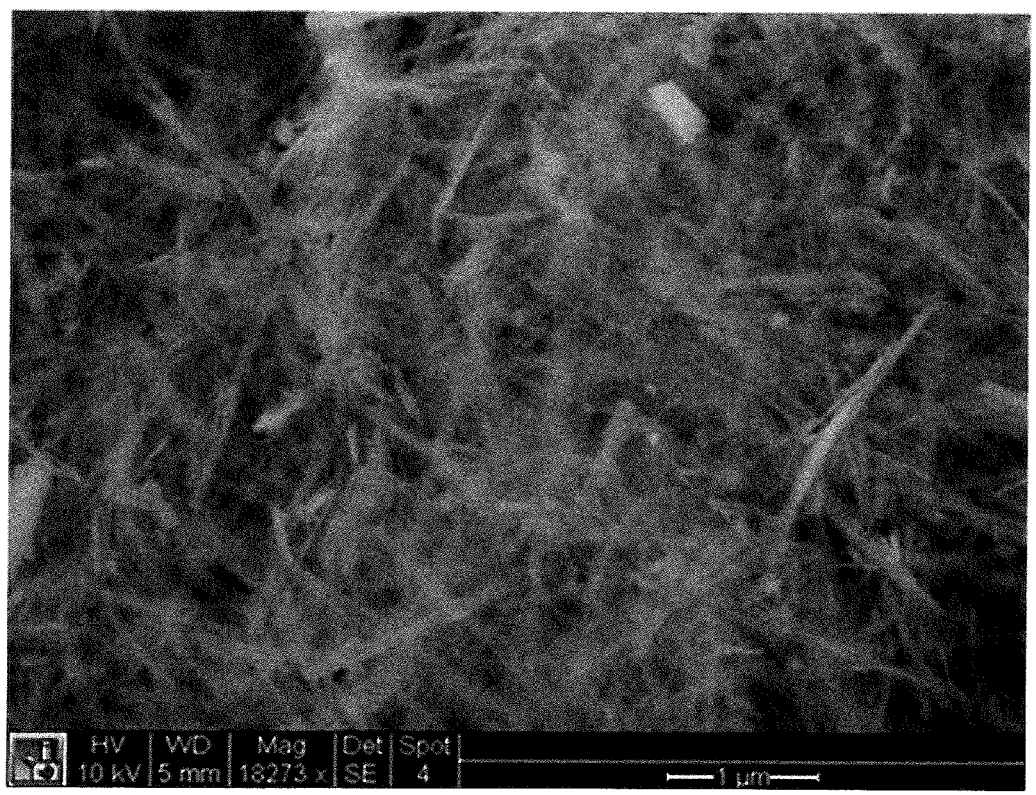
FIG. 28 shows a photograph taken using a scanning electron microscope at 18,273 times magnification of a synthetic nano-fibrous calcium silicate hydrate in the xonotlite phase, which may be selected as a useful raw material in the manufacture of a nano-composite containing a structured amorphous silica and a fibrous calcium carbonate crystal in a selected phase such as aragonite.
Figure 29:
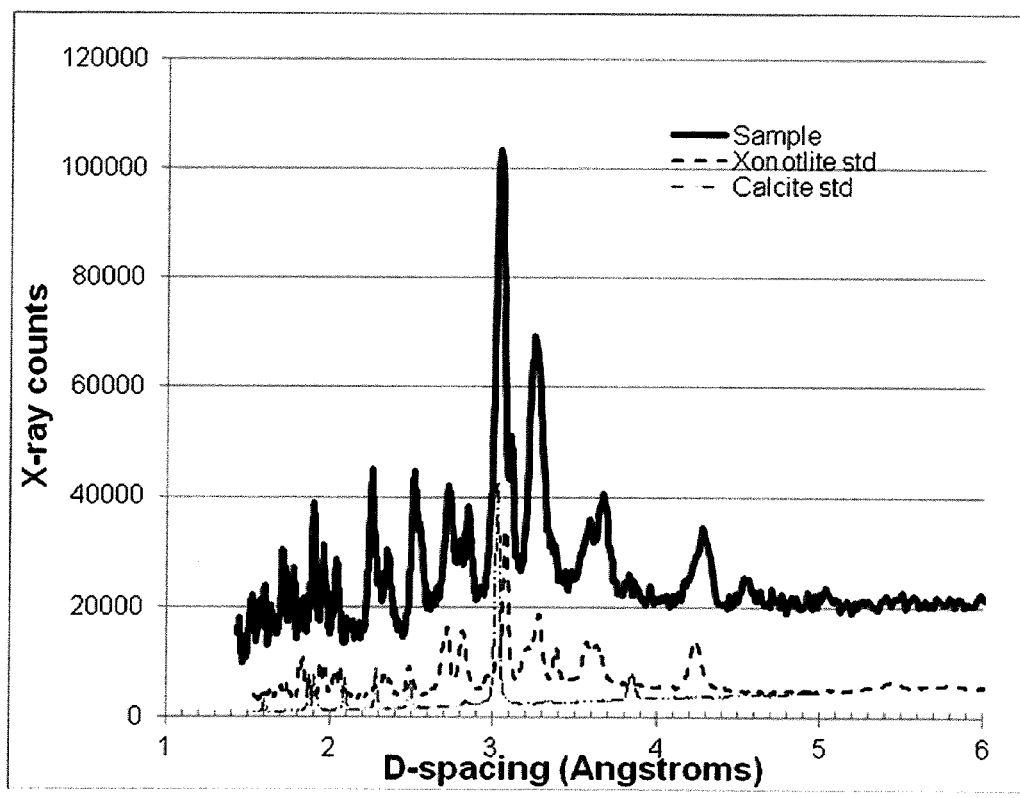
FIG. 29 shows a graph of an X-ray diffraction (XRD) scan of a sample of the calcium silicate hydrate material just illustrated in FIG. 28, along with two other standard control materials, namely xonotlite and calcite; note that the sample material includes peaks at the location of major XRD peaks of xonotlite.

The SEM photograph of this silicate is given in FIG. 28. The graph of the XRD pattern of this silicate is a given in FIG. 29.

Step 2: Cogeneration of Nano-Composite Having a Structured Amorphous Silica Component and a Fibrous Crystalline Carbonate (Aragonite) Component by Pressure Carbonation In this example seed material was added to the slurry. Otherwise, the process conditions were the same as set forth in Example 1. The sample ID was T30-8-078-ARA. The process conditions for cogeneration are given in Table 18 and the pigment properties are given in Table 19:

TABLE 18

Process conditions of T30-8-078-ARA

| Batch # | Start Temperature (° C.) | Final Temperature (° C.) | ΔT (° C.) | Start Pressure (psig) | $CO_2$ Flow Rate (L/min) |
|---|---|---|---|---|---|
| T30-8-078-ARA | 60 | 70 | 10 | 70 | 112 |

TABLE 19

Properties of Nano-Composite (T30-8-078-ARA)

| Batch # | BET (m²/g) | pH | Water Absorption (%) | Oil Absorption (%) | Mohr Salt Test |
|---|---|---|---|---|---|
| T30-8-078-ARA | 112 | 6.8 | 191 | 207 | Green |

Figure 30:
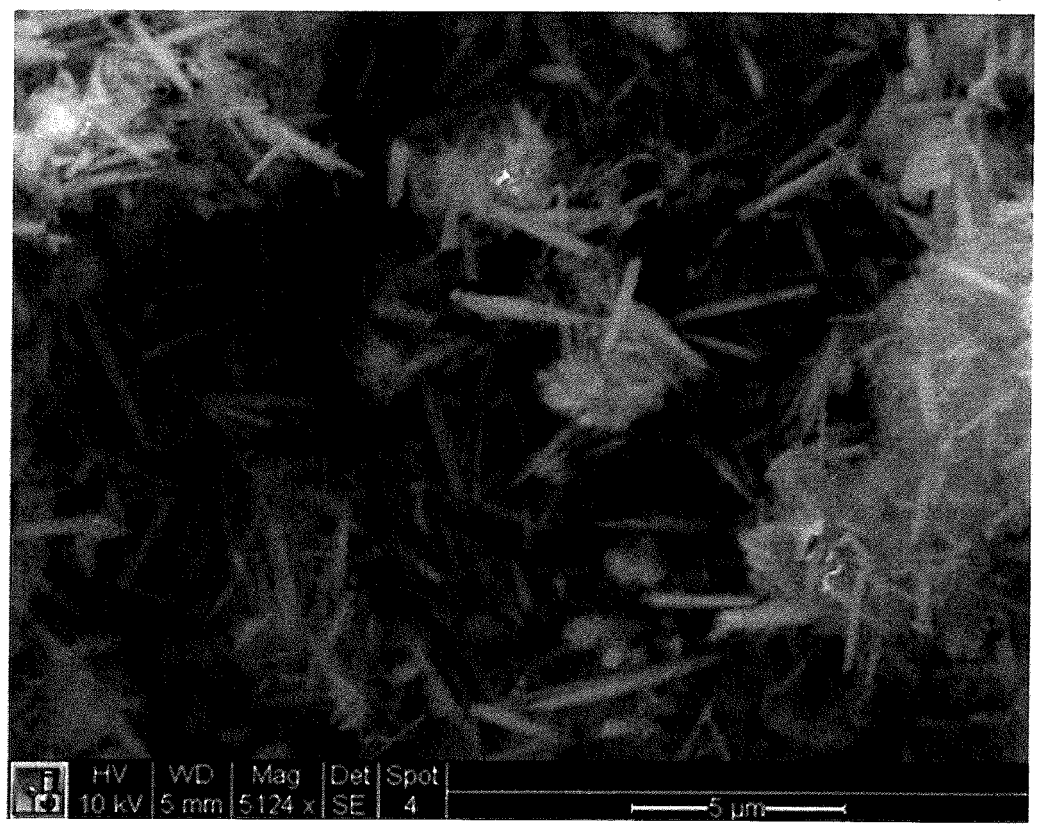
FIG. 30 shows a photograph taken using a scanning electron microscope at 5,124 times magnification of a sample of a novel, unique nano-composite material containing structured amorphous silica ("SAS") and a fibrous calcium carbonate in a selected phase, namely aragonite ("FCA"), together "SAS+FCA", as may be manufactured according to the instructions set forth herein.
Figure 31:
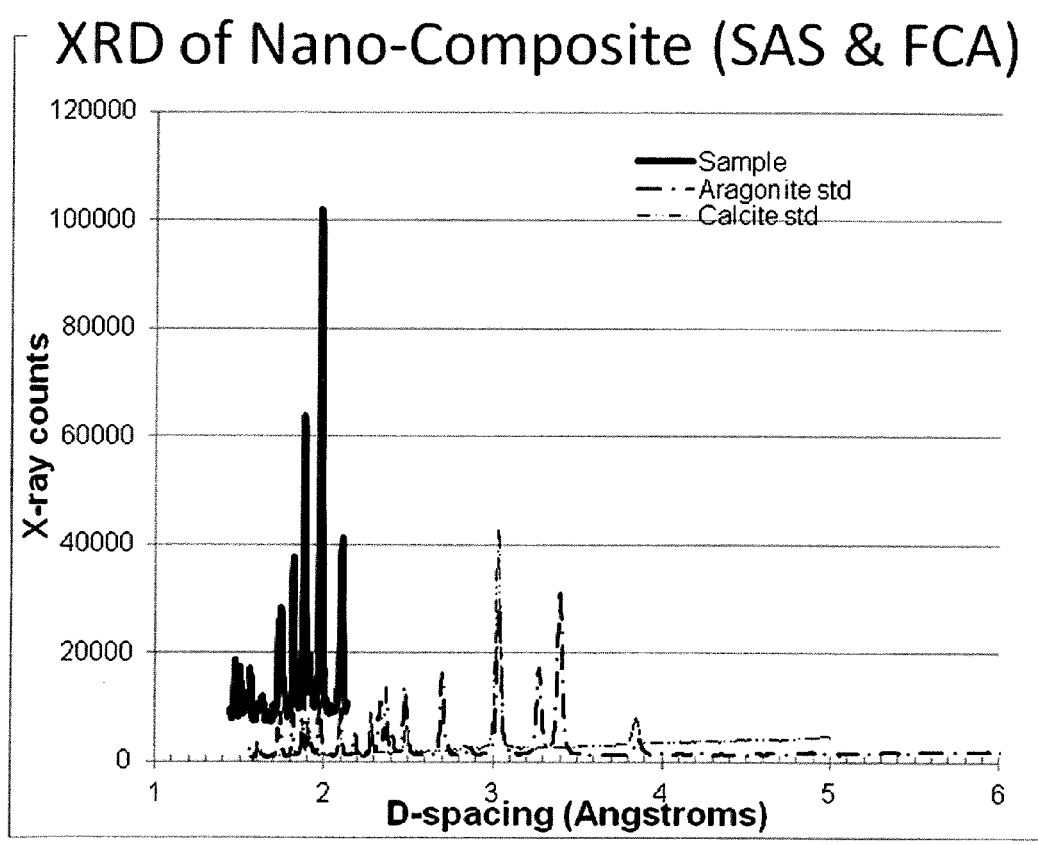
FIG. 31 shows a graph of an X-ray diffraction (XRD) scan of a sample of a novel, unique nano-composite material (SAS+FCA) as shown and described in FIG. 30, along with two other standard control materials, namely aragonite and calcite; note that this graph indicates that the nano-composite material (SAS+FCA) includes peaks at the same locations the major XRD peaks of aragonite.

The SEM photograph of this nano-composite is shown in FIG. 30. The graph of the XRD pattern of this nano-composite is shown in FIG. 31.

Example 4

Step 1: Preparation of Synthetic Calcium Silicate Hydrate—Foshagite

This novel, multiphase calcium silicate hydrate of was formed by the same hydrothermal reaction of lime and silica as described in Example 3. The reaction temperature was increased to 250° C., while the reaction time was reduced to 2 hours. The sample was labeled T30-8-082. The process conditions are given in Table 20 and the pigment properties are given in Table 21:

TABLE 20

Process conditions of Foshagite Formation (T30-8-082)

| Batch # | Raw Material | Molar Ratio ($CaO/SiO_2$) | Concentration (lb/gallon) | Temperature (° C.) | Reaction Time (hours) |
|---|---|---|---|---|---|
| T30-8-082 | Ground Quartz | 1.30 | 0.36 | 250 | 2 |

TABLE 21

Properties of Foshagite (T30-8-082)

| Batch # | BET ($m^2/g$) | pH | Water Absorption (%) | Oil Absorption (%) |
|---|---|---|---|---|
| T30-8-082 | 37 | 11.7 | 234 | 231 |

Figure 32:
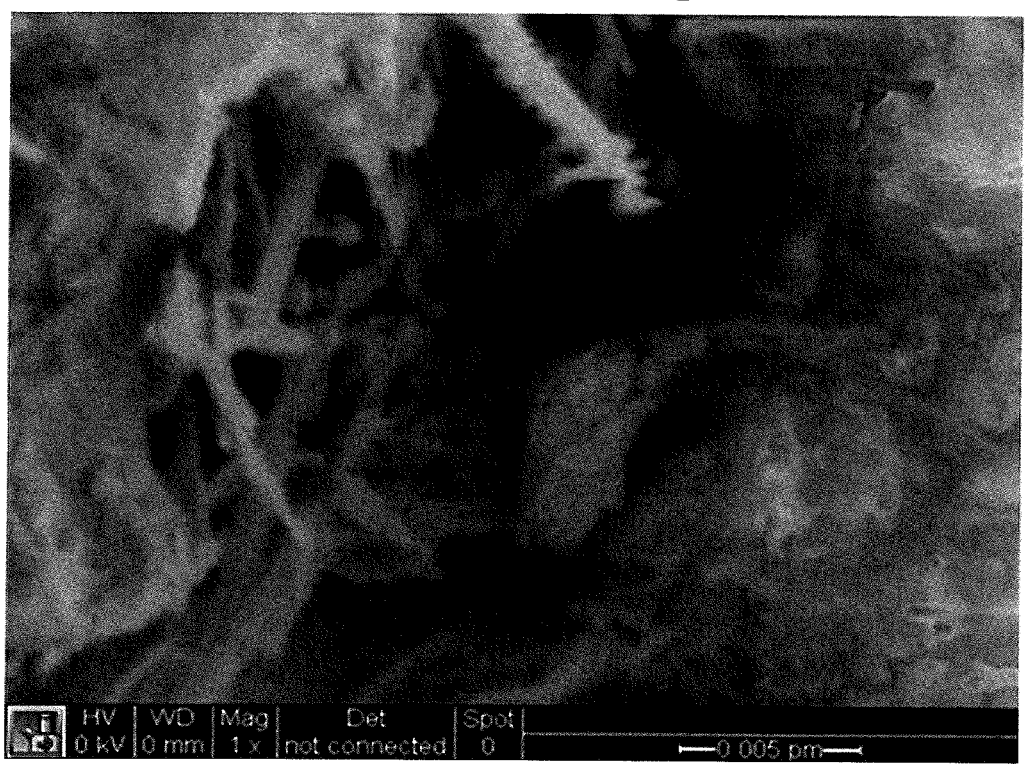
FIG. 32 shows a photograph taken with a scanning electron microscope at approximately 15,000 times magnification of a synthetic nano-fibrous calcium silicate hydrate in the foshagite phase, which may be useful as a raw material in the manufacture of nano-composite materials as further set forth herein below; note, however, the scale indicated at the bottom is not correct and the correct scale length (rather than 0.005 pm) should actually indicate two (2) microns.
Figure 33:
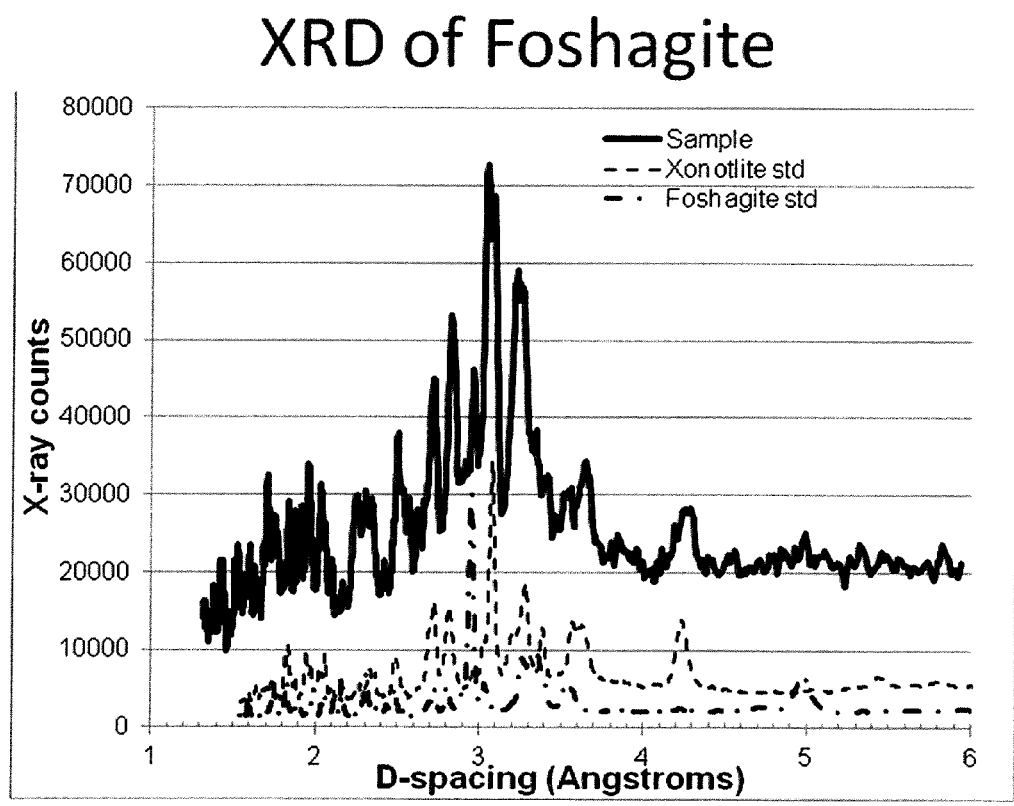
FIG. 33 shows a graph of an X-ray diffraction (XRD) scan of a sample of the material just illustrated in FIG. 32, along with other control materials, namely xonotlite and foshagite; note that this data indicates that the sample material includes major XRD peaks at the same locations as both xonotlite and foshagite.

The SEM photograph of this silicate is shown in FIG. 32. The graph of the XRD pattern of this silicate is shown in FIG. 33.

Step 2: Cogeneration of Nano-Composite Having a Structured Amorphous Silica Component and a Fibrous Crystalline Carbonate (Aragonite) Component by Pressure Carbonation In this example seed material was added to the slurry. Other than that the process conditions were the same as in Example 1. The sample ID was T30-8-082-ARA. The process conditions for cogeneration are given in Table 22 and the pigment properties are given in Table 23.

TABLE 22

Process conditions of T30-8-082-ARA

| Batch # | Start Temperature (° C.) | Final Temperature (° C.) | ΔT (° C.) | Start Pressure (psig) | $CO_2$ Flow Rate (L/min) |
|---|---|---|---|---|---|
| T30-8-082-ARA | 60 | 70 | 10 | 70 | 112 |

TABLE 23

Properties of Nano-Composite (T30-8-082-ARA)

| Batch # | BET ($m^2/g$) | pH | Water Absorption (%) | Oil Absorption (%) | Mohr Salt Test |
|---|---|---|---|---|---|
| T30-8-082-ARA | 171 | 6.9 | 211 | 220 | Green |

Figure 34:
FIG. 34 shows a photograph taken using a scanning electron microscope at 19591 times magnification of a sample of a nano-structured composite material that includes nano-fibrous structured amorphous silica ("SAS") and nano-fibrous precipitated calcium carbonate in the aragonite phase ("FCA"), which material (SAS+FCA) was made according to process(s) set forth herein.
Figure 35:
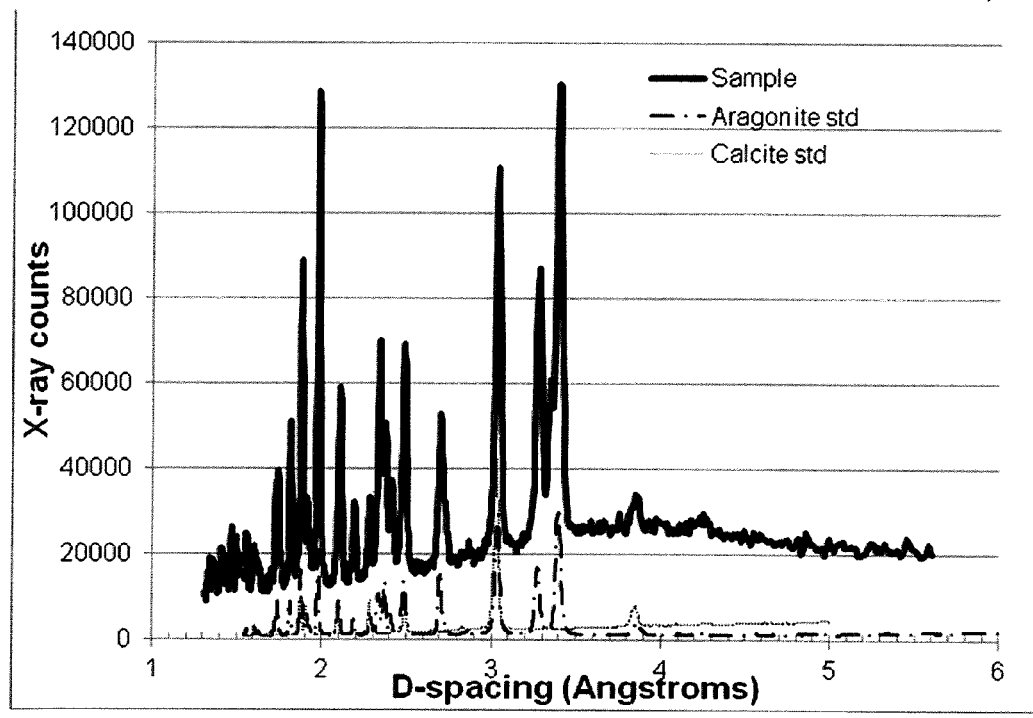
FIG. 35 shows a graph of the X-ray diffraction (XRD) scan of the nano-structured composite material (SAS+FCA) just shown and described in FIG. 34, along with two standard control materials, namely aragonite and calcite; note that the data indicates that the sample includes major XRD peaks at the same locations as aragonite.

The SEM photograph of this nano-composite is provided in FIG. 34. The graph of the XRD pattern of this nano-composite is provided in FIG. 35.

Applications for Nano-Composites (SAS & FCA) in Coatings

Process for Making Coatings

In an experimental apparatus, after a batch of nano-composite (SAS+FCA) material had been manufactured, validated, and approved by the tests described above, a slurry was then run through a 100 (152 micron) to 200 mesh (75 micron) screen to remove large particles, inert material, and reactor scale. After the oversized material was removed, the slurry was then run through a series of unit operations to remove the excess water. Such processes may include use of a drum filter, and/or press filters, and/or vacuum filtration, and/or spray drying, and/or oven drying, or the like. In any event, a dry, final product was obtained. The dry material was then ground up in a ball mill so that it could pass through a 100 mesh screen.

High Solids Pigment Slurry

After a dry pigment sample was screened, it was then mixed with water to make a high solids slurry with solids ranging from about 40% to about 60%. That was accomplished with the use of a high shear mixer (such as a Cowlez mixer or Silverson Unit). Before the dry pigment was mixed with the water, a dispersing agent was added to the water (e.g., a sodium polyacrylamide). The amount of dispersing agent added per dry pound of pigment may range from about 0.5% to about 4%. The resulting slurry was then again passed through a 100 mesh screen to remove large agglomerated particles.

Coating Formulation—Pigment Mixing

Several different coating pigments are combined to make a coating formulation. This may include coating clays, calcined clays, various forms of calcium carbonates, titanium dioxide, and other materials. These different coating pigments were dispersed individually, either at the manufacturer's plant or the consumer's plant. The order of mixing the various coating pigments was generally not too important, but care was taken to insure that agglomeration with different pigments does not occur. With the different coating mixtures, the dispersed pigments described above were blended based on a parts method. Coating formulations are given in specific examples set forth below.

After the various coating pigments were added to together, the various binding agents were added to the blend. Some of the synthetic binding agents can include styrene-butadiene latex, styrene-acrylate latex, polyvinyl acetate, polyvinyl alcohol, vinyl acrylic latex, vinyl acetate-ethylene latex. The natural binding agents can be selected from materials such as corn and potato starches that had been modified by enzyme conversion; acid thinned; cation protonated; oxidized; hydroxyethylated; thermally modified; and/or turned into a biopolymer. Also used were various soy proteins that were modified by adding carboxyl groups.

After the final material is added, the coating formulation was then screened through a 100 mesh screen.

Coating Application

After the coating formulations were made, a coating was then applied to a substrate/base in one of several methods. These methods included air knife, rod, blade, and other coating methods. In the lab, a lab rod coater (RK Control Coater) was used. After the coating is applied based on the end-user's requirements, the coated sample was dried, generally using a heated drum (Regal-Arkay ST-22). After the coating was dried, the resulting coated sample was examined for defects or gaps in the coating.

Testing of Coated Material

If the sample passed the examination, it was then tested for the following properties:
1. Brightness;
2. L Value;
3. a Value;
4. b Value;
5. Gloss;

6. Opacity (if applicable);
7. Scattering Power;
8. Absorption Power;
9. Smoothness/Roughness;
10. Appearance (APT, DAV 1, DAV 2, DMM);
11. IGT Pick;
12. IGT Blister; and
13. Caliper.

Coating of Unbleached Board

A coating operation was conducted at a laboratory in Tacoma, Wash. The pigment slurries were dispersed using a Silverson disperser then screened through a 100 mesh screen. Then the coating binders were added to the pigment slurry, first the protein followed by the latex, and blended with a Silverson low shear mixer. The coatings were applied to the paperboard using a RK rod coater and dried in a drum dryer having a Teflon coated, non-stick surface (Regal Arkey ST-22). Coatings were applied over a range of coat weights and then soft nip calendared. The test data for each coating condition, including the lab control, were plotted as a function of coat weight and normalized to a target coat weight for comparison.

Example 5: Unbleached Board Coating, Top Coat Only

For Example 5, an unbleached Kraft paperboard having a production base coating was used to apply the laboratory top coating. The $TiO_2$ range for the top coat control was in the 15 to 20 parts range per 100 dry parts of total pigment which included calcined clay and #1 coating clay with protein and SB Latex as binder. In this case study, 25%, 50%, and 75% of the $TiO_2$ was replaced with the nano-composite of SAS & FCA in the coating formulation. The coating formulation is given below in Table 24.

TABLE 24

| Material/Order of Addition | Dry Parts | | | |
| --- | --- | --- | --- | --- |
| | Control | 25% Nano-Composite | 50% Nano-Composite | 75% Nano-Composite |
| #1 High Brightness Coating Clay | 64 | 64 | 64 | 64 |
| TiO2 | 20 | 15 | 10 | 5 |
| Calcined Clay | 16 | 16 | 16 | 16 |
| SAS & FCA | 0 | 5 | 10 | 15 |
| Total Pigment | 100 | 100 | 100 | 100 |
| Protein | 5 | 5 | 5 | 5 |
| SB Latex | 15 | 15 | 15 | 15 |
| Total Binder | 20 | 20 | 20 | 20 |
| Total Pigment + Binder | 120 | 120 | 120 | 120 |

Figure 36:
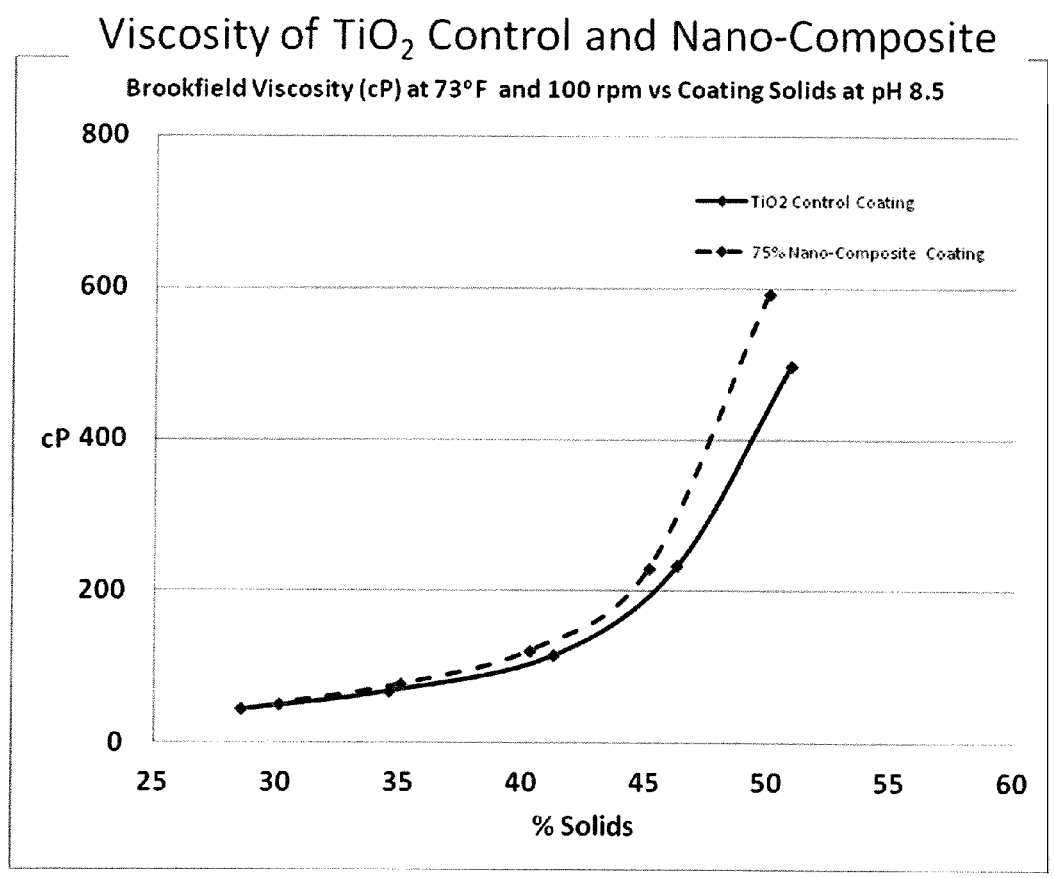
FIG. 36 is a graph illustrating an example where substitution of a novel nano-composite (SAS+FCA) as described herein for a major portion (e.g., 75%) of the conventionally utilized titanium dioxide ($TiO_2$) has the effect of increasing a viscosity of the coating formulation.

The high surface area, high aspect ratio and low bulk density of prior art materials similar to the tested nano-composite (SAS+FCA) generally results in a high binder demand, high viscosity, higher immobilization time, and low pick strength. However, it was surprising to find just the opposite with respects to the tested nano-composite (SAS+FCA) material. One of the unique characteristics of the nano-composite material described herein was that it performed equal or better than the $TiO_2$ containing control formulation. FIG. 36 is a plot of Brookfield viscosity over a solids range of 30% to 50% for both the $TiO_2$ control and the use of the nano-composite based coating, and shows that in the 40% to 45% solids range, where an air knife coater would most likely operate, we see that the viscosities are nearly identical.

Figure 37:
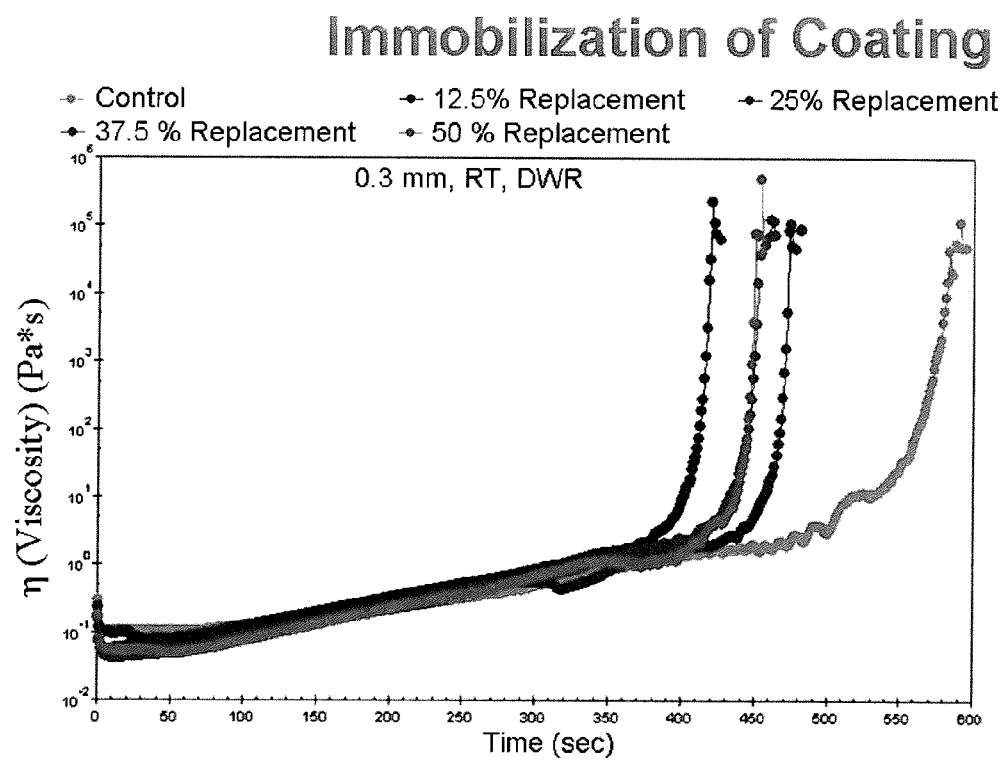
FIG. 37 is a graph illustrating various examples where substitution of a novel nano-composite (SAS+FCA) as described herein for various portions (e.g., 12.5%, 25%, 37.5%, and 50%) of the conventionally utilized titanium dioxide ($TiO_2$) in a coating formulation has the effect of the immobilization of the coating's pigments; note that as tested and illustrated, the shorter time elapsed until peak viscosity, the better the immobilization of pigments in the coating, in accord with a dynamic water retention (DWR) test as is known to those of skill in the art in the paper industry.

Coating immobilization study results are shown in FIG. 37. The tests were performed using a Dynamic Water Retention (DWR) device. FIG. 37 shows how long it takes for the coating to immobilize. There is a distinguishable difference between the control coating with $TiO_2$ and the nano-composite (SAS+FCA) based coatings. The data shows that the nano-composite coatings have a much faster immobilization rate as compared to the control $TiO_2$ coatings.

The coated sheets were soft-nip calendared to a target smoothness (PPS 10S) of 3.0. The calendared sheets were then tested as per the protocol described above. The test results are given in Table 25. Then the test data was plotted as a function of coat weight and normalized to a target coat weight of 17 to 19 grams per square meter for comparison.

Figure 38:
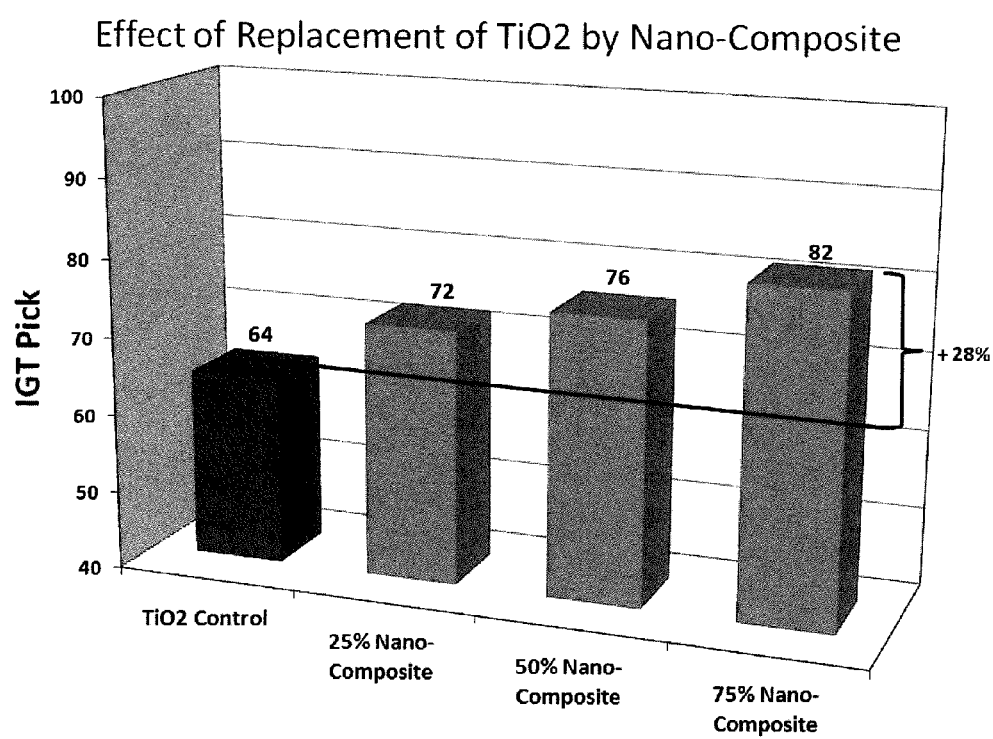
FIG. 38 is a graphical representation of the effect on IGT pick test results (see ISO 3783 or TAPPI Standard 514), when conventionally utilized titanium dioxide ($TiO_2$) is replaced (at 25%, 50%, and 75% replacement levels) by a novel nano-composite (SAS+FCA) as described herein, in an unbleached top coat formulation used on a calendared unbleached board paper product.
Figure 39:
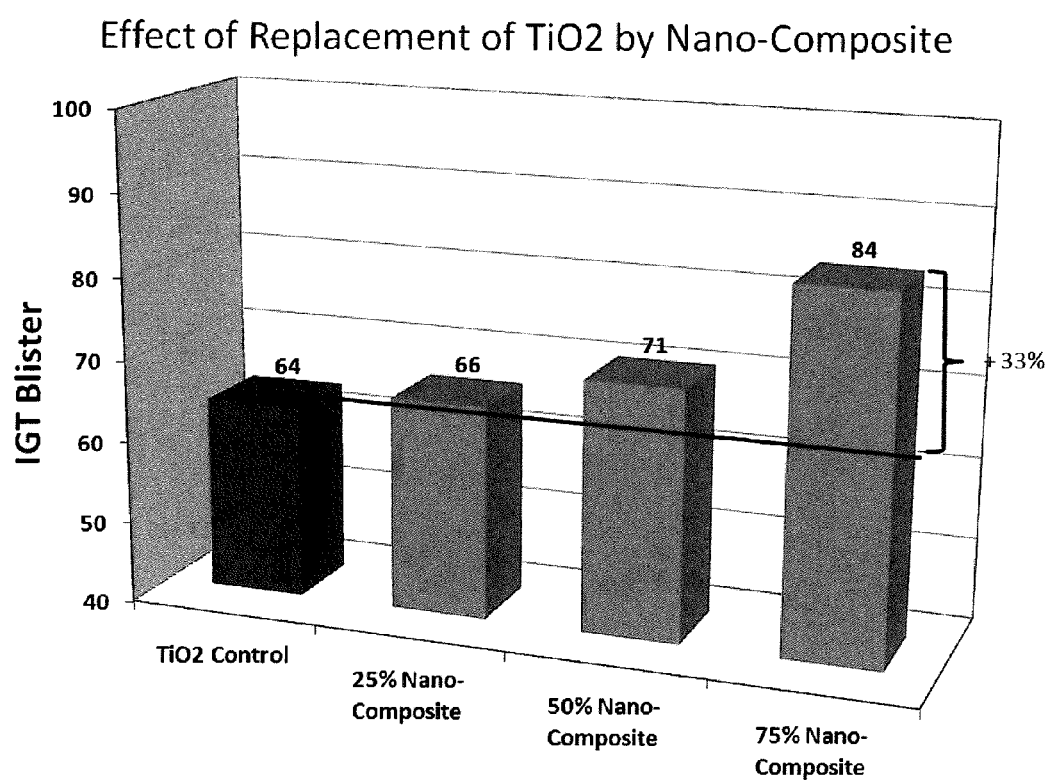
FIG. 39 is a graphical representation of the effect on IGT blister test results, when conventionally utilized titanium dioxide ($TiO_2$) is replaced (at 25%, 50%, and 75% replacement levels) by a novel nano-composite (SAS+FCA) as described herein, in an unbleached top coat formulation used on a calendared unbleached board paper product.

The IGT Pick strength and IGT Blister, shown in FIGS. 38 and 39, show the coating strength for the nano-composite containing SAS and FCA is significantly better (28% and 31% respectively) than the $TiO_2$ control. It is believed silanol bonding sites may play a role in this strength improvement, which could potentially translate into a lower binder demand.

Figure 40:
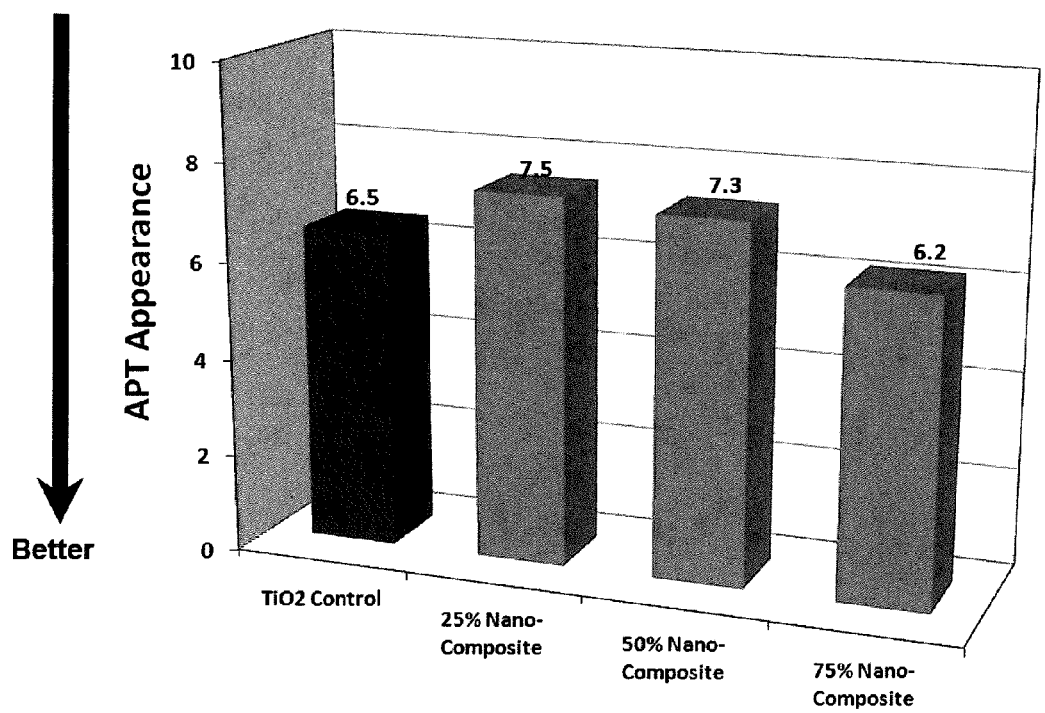
FIG. 40 is a graphical representation of the effect on the APT appearance test results, when conventionally utilized titanium dioxide ($TiO_2$) is replaced (at 25%, 50%, and 75% replacement levels) by a novel nano-composite (SAS+FCA) as described herein, in an unbleached top coat formulation used on a calendared unbleached board paper product; note that a smaller APT test result number indicates a more uniform appearance, which is desirable on calendared unbleached board.

The APT Appearance test, shown in FIG. 40, shows the nano-composite coating coverage is comparable to the TiO2 control.

Figure 41:
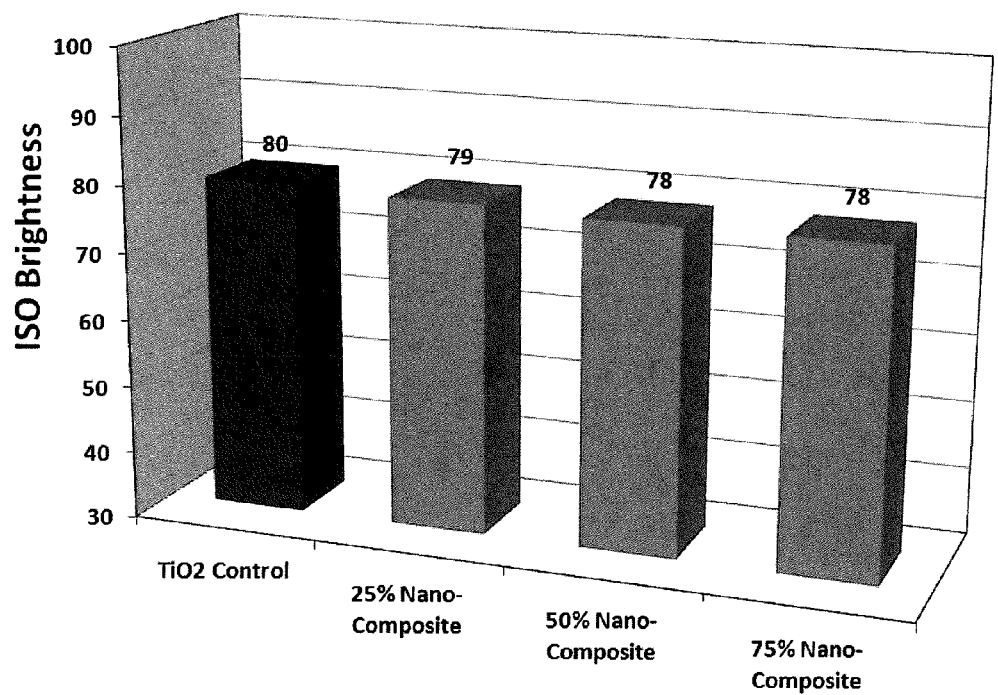
FIG. 41 is a graphical representation of the effect on ISO Brightness test results, when conventionally utilized titanium dioxide ($TiO_2$) is replaced (at 25%, 50%, and 75% replacement levels) by a novel nano-composite (SAS+FCA) as described herein, in an unbleached top coat formulation used on a calendared unbleached board paper product.

The ISO Brightness of the nano-composite coating was several points lower than the $TiO_2$ control, as indicated in FIG. 41. However, such characteristics do offer an advantage for reducing dye costs where dye-back methods are sometimes used to improve appearance.

Figure 42:
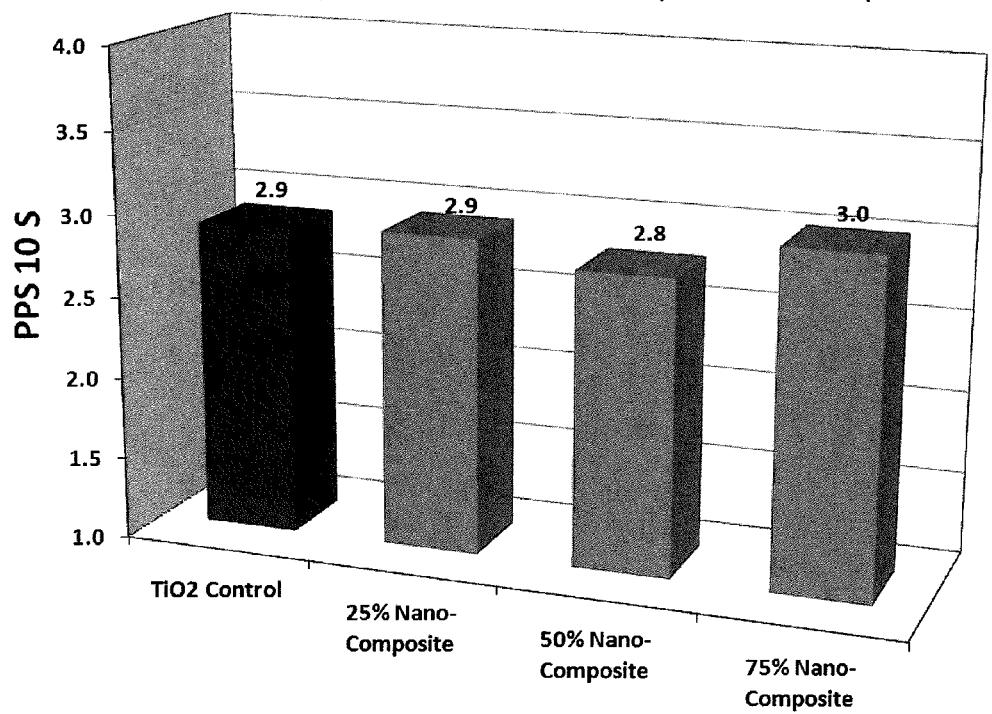
FIG. 42 is a graphical representation of the effect on Parker Print Roughness test results (at 10S), when conventionally utilized titanium dioxide ($TiO_2$) is replaced (at 25%, 50%, and 75% replacement levels) by a novel nano-composite (SAS+FCA) as described herein, in an unbleached top coat formulation used on a calendared unbleached board paper product.

The Parker Print Smoothness (10S) showed comparable results (see FIG. 42).

Figure 43:
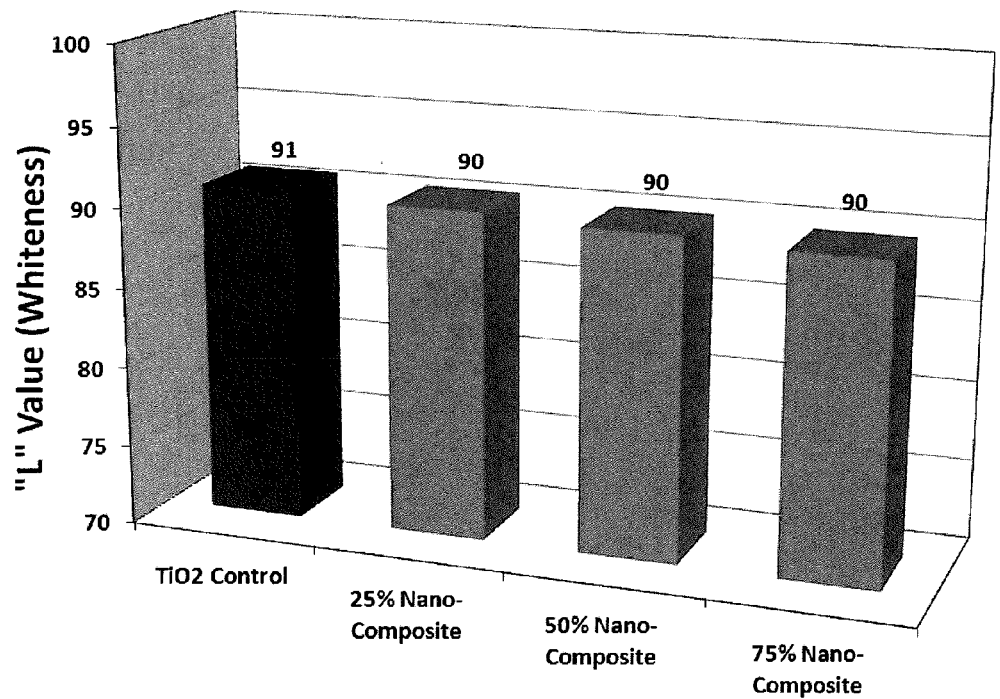
FIG. 43 is a graphical representation of the effect on Hunter "L" or Whiteness test results, when conventionally utilized titanium dioxide ($TiO_2$) is replaced (at 25%, 50%, and 75% replacement levels) by a novel nano-composite (SAS+FCA) as described herein, in an unbleached top coat formulation used on a calendared unbleached board paper product.

The "L" value showed a slight drop with the addition of the nano-composite (see FIG. 43).

Figure 44:
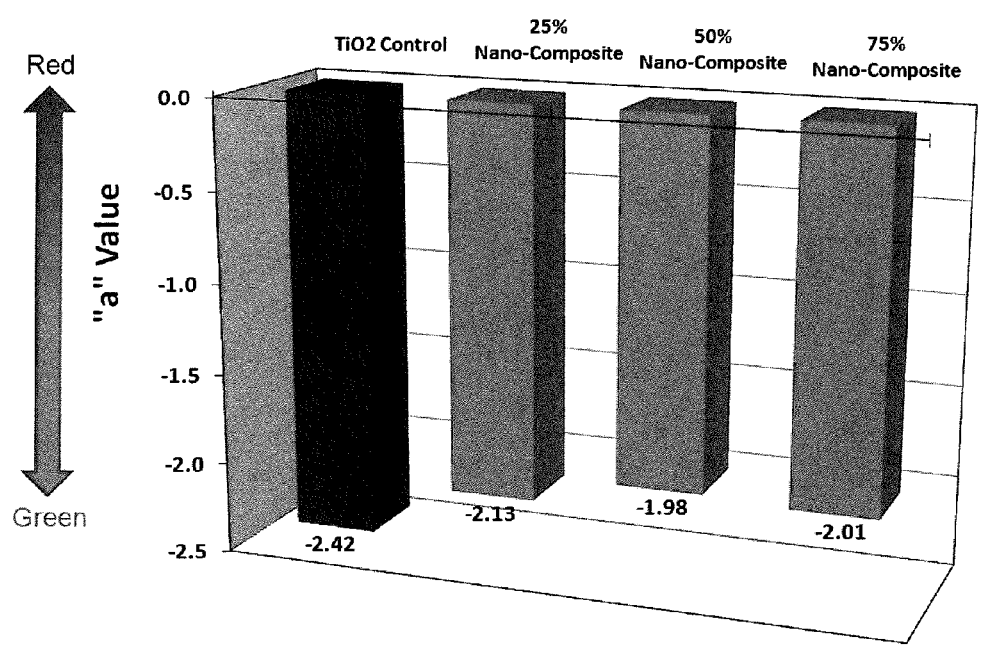
FIG. 44 is a graphical representation of the effect on Hunter "a" or "red-green" test results, when conventionally utilized titanium dioxide ($TiO_2$) is replaced (at 25%, 50%, and 75% replacement levels) by a novel nano-composite (SAS+FCA) as described herein, in an unbleached top coat formulation used on a calendared unbleached board paper product; note that a positive value indicates a reddish color, while a negative value indicates a more desirable greenish color.

The "a" value showed a slight shift of the coating color to the red (see FIG. 44).

Figure 45:
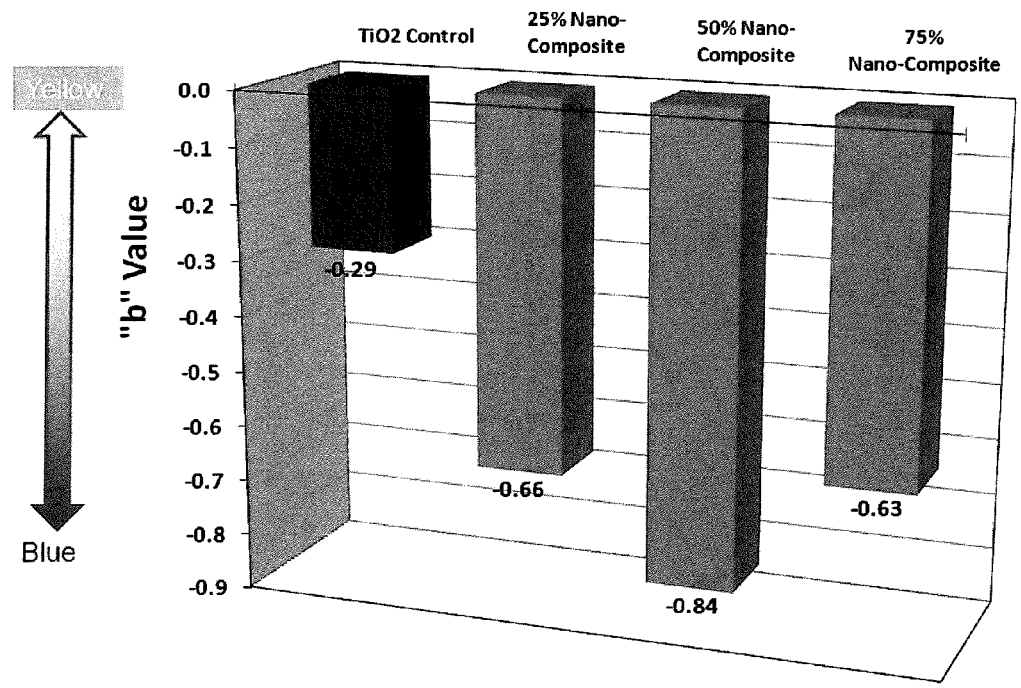
FIG. 45 is a graphical representation of the effect on Hunter "b" or "yellow-blue" test results, when conventionally utilized titanium dioxide ($TiO_2$) is replaced (at 25%, 50%, and 75% replacement levels) by a novel nano-composite (SAS+FCA) as described herein, in an unbleached top coat formulation used on a calendared unbleached board paper product; note that a positive value indicates a yellowish color, while a negative value indicates a more desirable blue-white color.

The "b" value showed a significant shift to a blue-white shade (see FIG. 45).

TABLE 25

| | Control | 25% Nano-Composite | 50% Nano-Composite | 75% Nano-Composite |
| --- | --- | --- | --- | --- |
| ISO Brightness | 79.71 | 78.90 | 78.20 | 78.11 |
| % Difference from Control | | −1.0% | −1.9% | −2.0% |
| MD Gloss | 27.6 | 23.3 | 21.5 | 20.7 |
| % Difference from Control | | −15.5% | −21.9% | −25.0% |
| CD Gloss | 26.9 | 23.1 | 21.1 | 20.1 |
| % Difference from Control | | −14.3% | −21.5% | −25.5% |
| L Value | 90.87 | 90.50 | 90.10 | 89.71 |
| % Difference from Control | | −0.4% | −0.8% | −1.3% |
| a Value | −2.42 | −2.13 | −1.98 | −2.01 |
| % Difference from Control | | −12.1% | −18.0% | −17.0% |
| b Value | −0.29 | −0.66 | −0.84 | −0.63 |
| % Difference from Control | | −37.3% | 188.4% | 115.3% |
| IGT Pick | 64.2 | 72.4 | 76.1 | 81.6 |
| % Difference from Control | | 12.9% | 18.5% | 27.2% |
| IGT Blister | 63.7 | 66.1 | 70.7 | 83.9 |
| % Difference from Control | | 3.8% | 10.9% | 31.7% |

TABLE 25-continued

|  | Control | 25% Nano-Composite | 50% Nano-Composite | 75% Nano-Composite |
|---|---|---|---|---|
| AGT Appearance | 6.51 | 7.51 | 7.32 | 6.23 |
| % Difference from Control |  | −15.4% | −12.5% | 4.2% |
| PPS Roughness | 2.9 | 2.9 | 2.8 | 3.0 |
| % Difference from Control |  | −1.4% | 3.1% | −5.0% |
| Caliper | 14.4 | 14.6 | 14.6 | 14.6 |
| % Difference from Control |  | 1.1% | 1.1% | 1.4% |
| Bulk | 1.31 | 1.31 | 1.30 | 1.32 |
| % Difference from Control |  | −0.4% | −1.0% | 0.7% |

Figure 46:
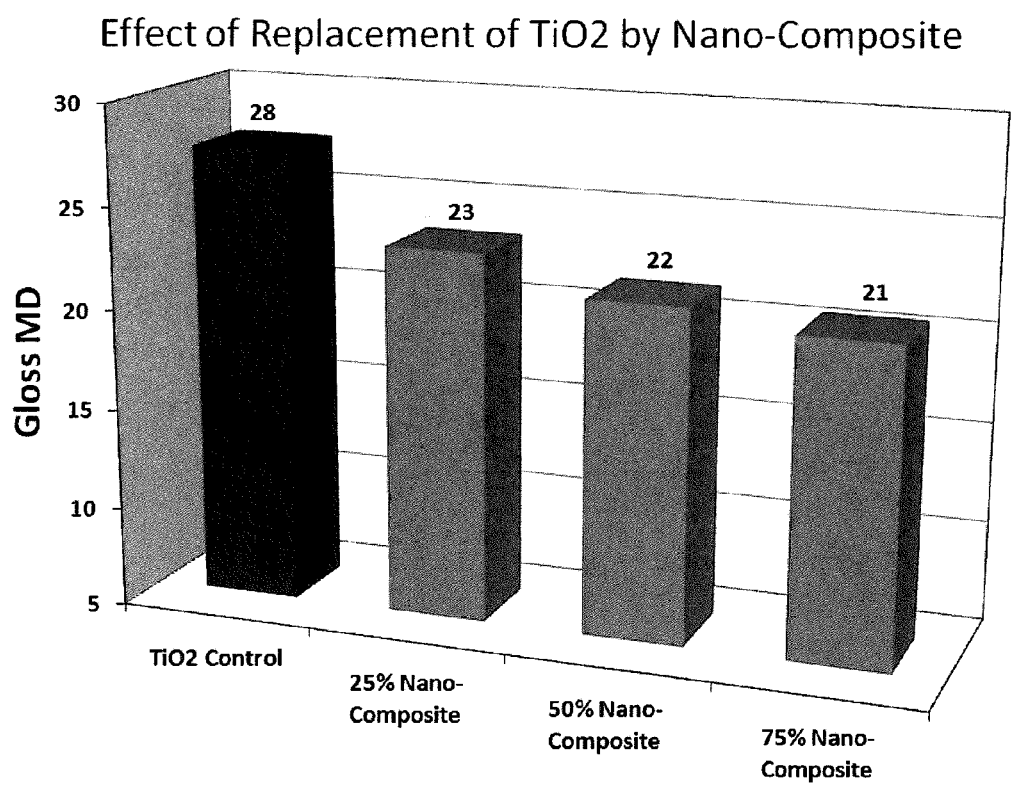
FIG. 46 is a graphical representation of the effect on gloss test results, in the machine direction ("MD") when conventionally utilized titanium dioxide ($TiO_2$) is replaced (at 25%, 50%, and 75% replacement levels) by a novel nano-composite (SAS+FCA) as described herein, in an unbleached top coat formulation used on a calendared unbleached board paper product.
Figure 47:
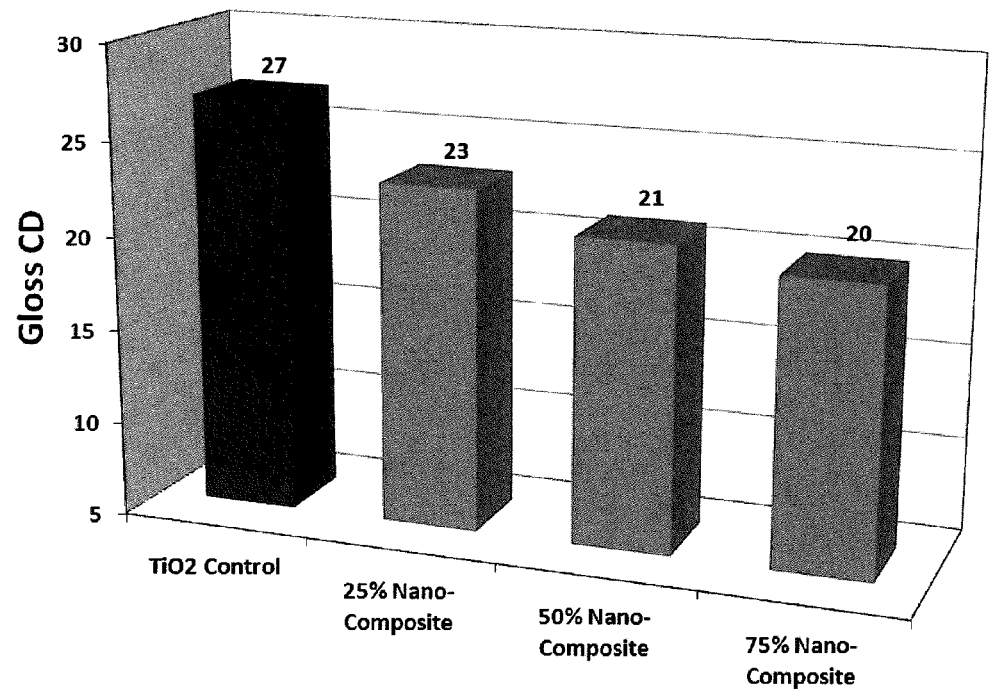
FIG. 47 is a graphical representation of the effect on gloss in the cross direction ("CD") when conventionally utilized titanium dioxide ($TiO_2$) is replaced (at 25%, 50%, and 75% replacement levels) by a novel nano-composite (SAS+FCA) as described herein, in an unbleached top coat formulation used on a calendared unbleached board paper product.

The gloss of the sheets coated with the nano-composite showed a shift towards a matte finish in both the machine direction and cross direction (FIGS. 46 and 47 respectively).

Figure 48:
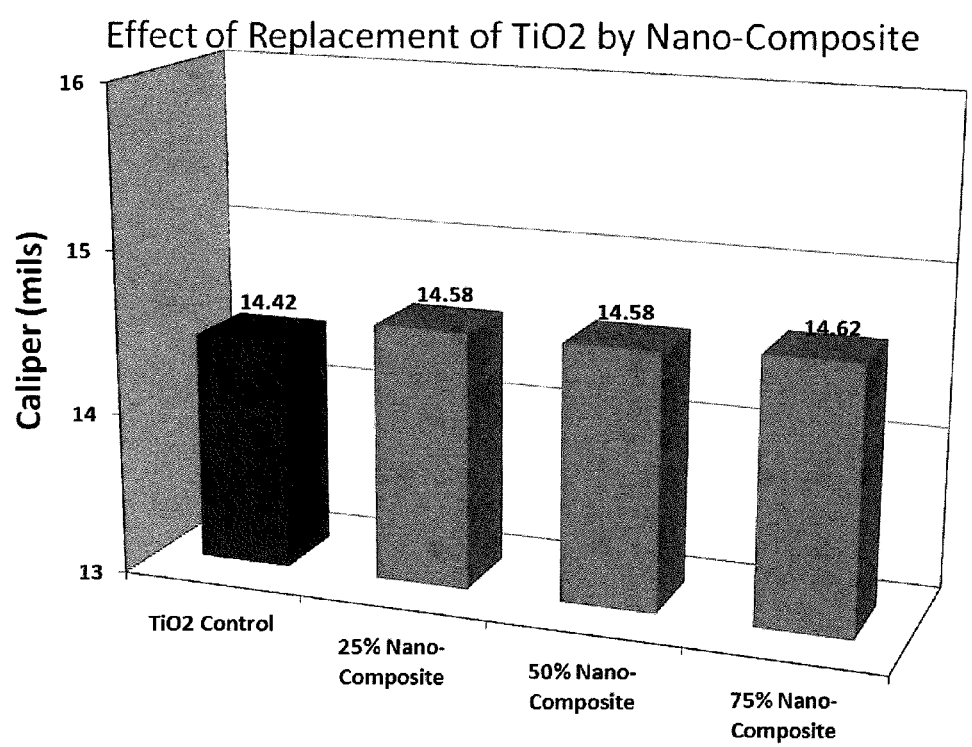
FIG. 48 is a graphical representation of the effect on the caliper of a sample paper product, when conventionally utilized titanium dioxide ($TiO_2$) is replaced (at 25%, 50%, and 75% replacement levels) by a novel nano-composite (SAS+FCA) as described herein, in an unbleached top coat formulations used on a calendared unbleached board paper product.

The addition of the nano-composite did increase the caliper (See FIG. 48).

Coated paperboard samples were sent to Nancy Plowman Associates for print testing to understand the potential print performance of the nano-composite coating as compared to the $TiO_2$ control. For the print tests performed, the print results, Table 26, indicated the nano-composite coating was comparable to the $TiO_2$ control.

TABLE 26

| Sample | $TiO_2$ Control | 75% Nano-Composite |
|---|---|---|
| P&I Slope (g/cm/sec) | 23.7-25.9 | 18.6-19.5 |
| Pass to Fail | 6 | 6 |
| % Transfer | 94 | 94 |
| % Wet Pick | 0 | 5 |
| Mottle Rating | 5 | 5 |

The criteria of these tests are given below:

Slope: The higher the slope the faster the coated surface can remove the thin oils from an ink.

Pass to Fail: Four passes or less indicates possible picking on an offset press.

% Transfer: A higher percentage means better fountain solution absorption. 60%+ is excellent.

% Wet Pick: A wet pick of <25% is excellent.

Mottle Rating: This test by itself does not predict mottle on press. It only shows absorption uniformity and a value of 1=excellent and 5=poor.

Example 6—Unbleached Kraft Paper Board—Base Coating and Top Coating

Example 6 used an unbleached Kraft paperboard, which was base coated with a 75/25 blend of aragonite S-PCC and nano-composite containing SAS & FCA, which replaced the #2 clay in the base coating. The coat weight target was 14 to 16 grams per square meter. The top coating was a 65/35 blend of aragonite S-PCC and nano-composite (SAS+FCA) at a coat weight target of 17 to 20 grams per square meter. The control coating was the same as in case #1. Both top coatings used the same blend of protein and latex. Finally, the coated sheets were soft-nip calendared to a target smoothness (PPS 10S) of 3.0.

TABLE 27

|  | Base Coating: Dry Parts | | Top Coating: Dry Parts | |
|---|---|---|---|---|
| Coating/Order of Addition | Control | 100% Replacement | Control | 100% Replacement |
| #2 Coating Clay | 100 | 0 | NA | NA |
| Aragonite S-PCC | 0 | 75 | 0 | 63 |
| SAS & FCA | 0 | 25 | 0 | 37 |
| #1 High Brightness Coating Clay | NA | NA | 64 | 0 |
| $TiO_2$ | NA | NA | 20 | 0 |
| Calcined Clay | NA | NA | 16 | 0 |
| Total Pigment | 100 | 100 | 100 | 100 |
| Protein | 3 | 3 | 5 | 5 |
| SB Latex | 14 | 14 | 15 | 15 |
| Total Binder | 17 | 17 | 20 | 20 |
| Total Pigment + Binder | 117 | 117 | 120 | 120 |

TABLE 28

|  | Control | 100% Replacement |
|---|---|---|
| ISO Brightness | 79.71 | 82.96 |
| % Difference from Control |  | 4.1% |
| L Value | 90.87 | 88.56 |
| % Difference from Control |  | −2.5% |
| a Value | −2.42 | −0.16 |
| % Difference from Control |  | −93.4% |
| b Value | −0.29 | −0.59 |
| % Difference from Control |  | 101.6% |
| IGT Pick | 64.2 | 111.0 |
| % Difference from Control |  | 73.0% |
| IGT Blister | 63.7 | 92.0 |
| % Difference from Control |  | 44.4% |
| AGT Appearance | 6.51 | 8.16 |
| % Difference from Control |  | 25.4% |

Figure 49:
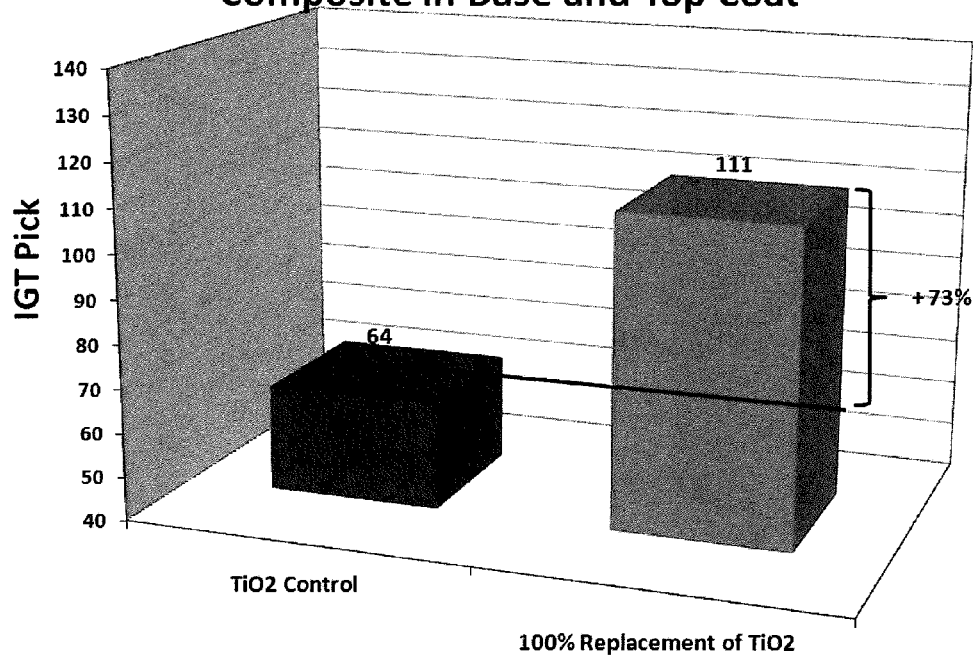
FIG. 49 is a graphical representation of the effect on IGT Pick test results when all of the conventionally utilized titanium dioxide ($TiO_2$) and coating clays are replaced (i.e., 100% replacement level) by a novel nano-composite (SAS+FCA) as described herein and aragonite S-PCC, in unbleached base and top coat formulations used on a calendared unbleached board paper product.
Figure 50:
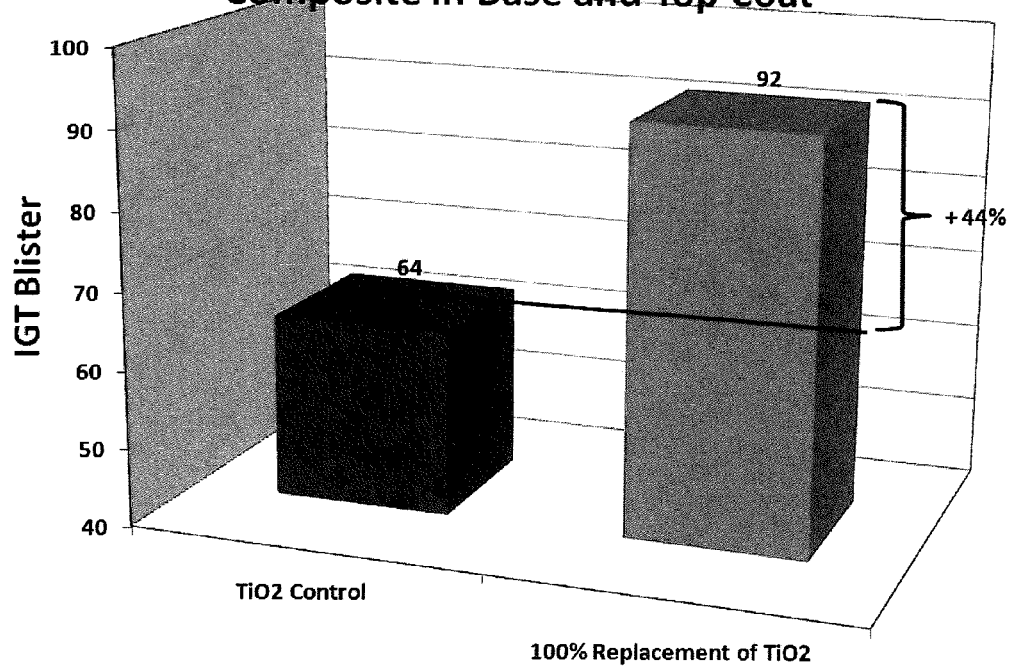
FIG. 50 is a graphical representation of the effect on IGT Blister Test results, when all of the conventionally utilized titanium dioxide ($TiO_2$) and coating clays are replaced (i.e., 100% replacement level) by a novel nano-composite (SAS+FCA) as described herein and aragonite S-PCC, in unbleached base and top coat formulations used on a calendared unbleached board paper product.

Findings:

IGT Pick strength and IGT Blister resistance, as indicated in FIGS. 49 and 50, showed a significant improvement (73% and 44% respectively) for the aragonite super precipitated calcium carbonate (S-PCC) and nano-composite (SAS+FCA) based coating over the control coating. The nano-composite (SAS+FCA) structures, as indicated in the photomicrograph illustrated in FIGS. 2 and 6, may retain a hollow macrosphere structure sized and shaped similar to the size and shape of a synthetic calcium silicate hydrate used as a raw material; compare FIGS. 2 and 6 with the structures seen in any one of FIGS. 12, 14, 16, and 18. In any event, the surface strength improvement offers an opportunity to reduce binder demand, when the novel nano-composite (SAS+FCA) materials are utilized.

Figure 51:
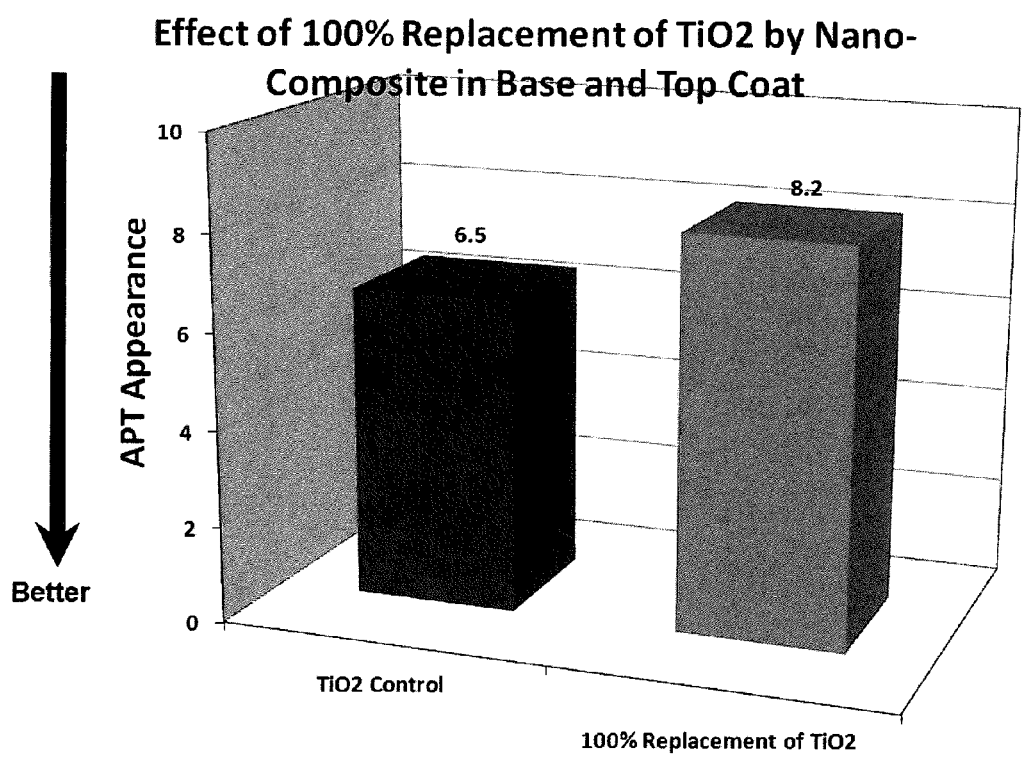
FIG. 51 is a graphical representation of the effect on APT Appearance test results, when all of the conventionally utilized titanium dioxide ($TiO_2$) and coating clays are replaced (i.e., 100% replacement level) by a novel nano-composite (SAS+FCA) as described herein and aragonite S-PCC, in unbleached base and top coat formulations used on a calendared unbleached board paper product.
Figure 52:
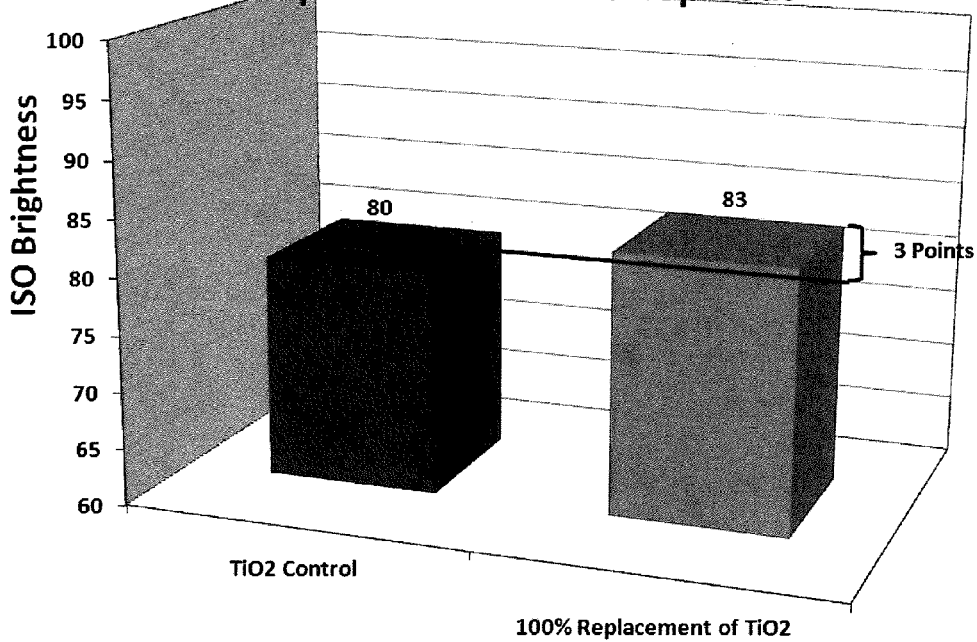
FIG. 52 is a graphical representation of the effect on ISO Brightness test results, when all of the conventionally utilized titanium dioxide ($TiO_2$) and coating clays are replaced (i.e., 100% replacement level) by a novel nano-composite (SAS+FCA) as described herein and aragonite S-PCC, in unbleached base and top coat formulations used on a calendared unbleached board paper product.

The APT Appearance was slightly better for the control, as noted in FIG. 51. However, the ISO Brightness showed a distinct improvement, as indicated in FIG. 52.

Figure 53:
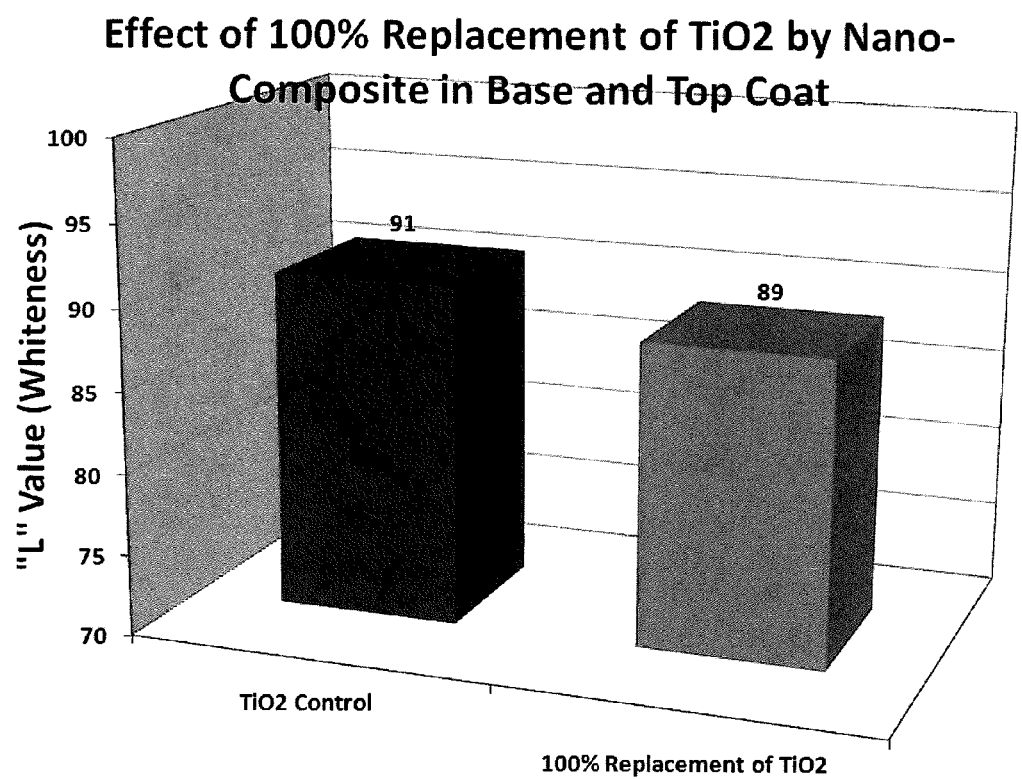
FIG. 53 is a graphical representation of the effect on Hunter "L" Value Whiteness test results, when, when all of the conventionally utilized titanium dioxide ($TiO_2$) and coating clays are replaced (i.e., 100% replacement level) by a novel nano-composite (SAS+FCA) as described herein and aragonite S-PCC, in unbleached base and top coat formulations used on a calendared unbleached board paper product.

The "L" value showed a slight drop with the addition of the nano-composite (see FIG. 53).

Figure 54:
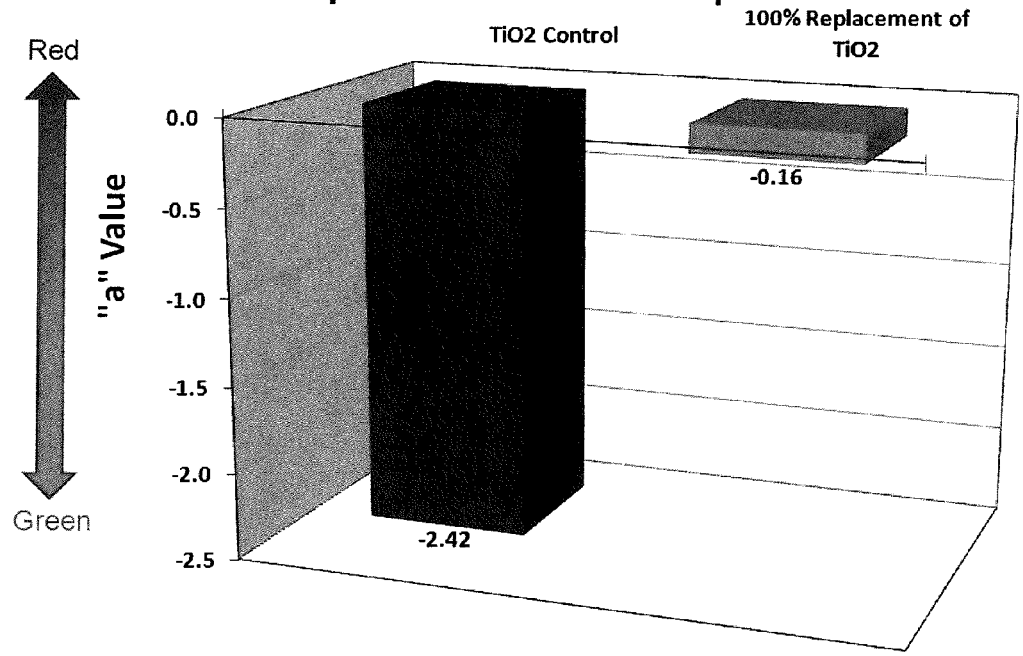
FIG. 54 is a graphical representation of the effect on Hunter "a" Value or "red-green" test results, when all of the conventionally utilized titanium dioxide ($TiO_2$) and coating clays are replaced (i.e., 100% replacement level) by a novel nano-composite (SAS+FCA) as described herein and aragonite S-PCC, in unbleached base and top coat formulations used on a calendared unbleached board paper product; note that a positive value indicates a reddish color, while a negative value indicates a more desirable greenish color.

The "a" value showed a shift of the coating color to the red (see FIG. 54).

Figure 55:
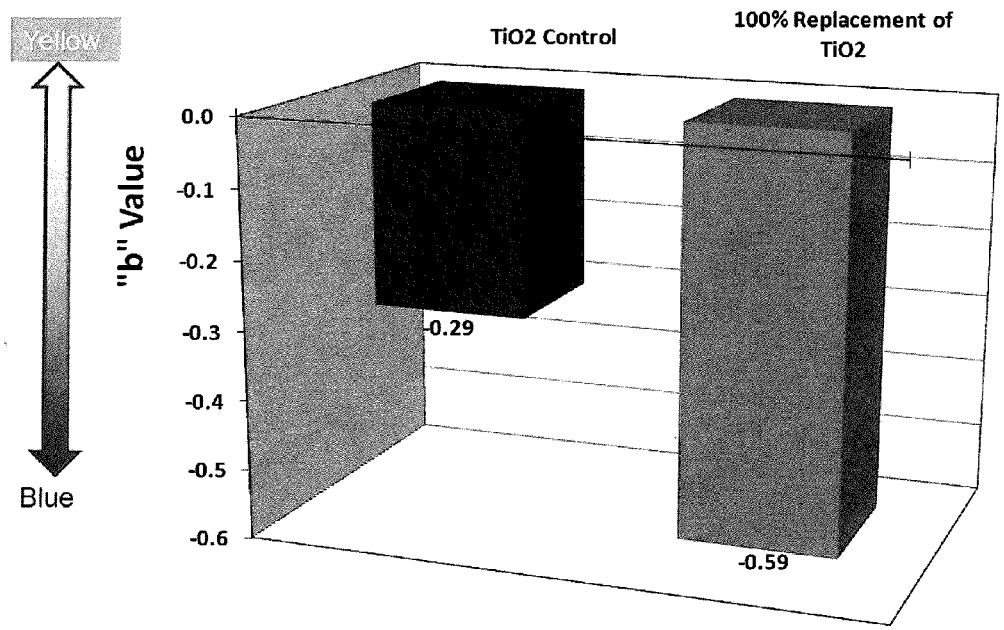
FIG. 55 is a graphical representation of the effect on Hunter "b" or "yellow-blue" test results, when all of the conventionally utilized titanium dioxide ($TiO_2$) and coating clays are replaced (i.e., 100% replacement level) by a novel nano-composite (SAS+FCA) as described herein and aragonite S-PCC, in unbleached base and top coat formulations used on a calendared unbleached board paper product; note that a positive value indicates a yellowish color, while a negative value indicates a more desirable blue-white color.

The "b" value showed a significant shift to a blue-white shade (see FIG. 55).

Coating of Label Stock

Example 7—Label Stock Coating—Single Coat

In this example, a bleached, uncoated, wood-free sheet with a basis weight of 41 pounds per 3300 square feet was used. The control coating was made up of 64 dry parts of #1 high brightness clay (supplied by Theile), 8 parts calcined clay (also supplied by Theile), and 24 parts Ground Calcium Carbonate (supplied by OMYA). The remaining 4 parts of the coating was made up of TiO2 (supplied by DuPont). The pigments in the example contained mostly the nano-composite containing nano structured amorphous silica (SAS) and nano fibrous crystalline aragonite calcium carbonate (FCA). The composition also consisted of calcium silicate hydrate (CSH from GR Nano Materials) (3 parts) and Aragonite S-PCC (from GR Nano Materials) (3 parts). 15.5 parts of SBIR Latex was added to the mixture with constant stirring. The slurry was thoroughly mixed in a Silverson unit for 5 minutes. The final coating formulation was further screened through a 100 mesh screen to give the final coating. Thus 100% of the TiO2 (only 4 parts) was replaced by GR Nano Materials pigments with 6 parts of GR Nano Materials products (including the nano-composite).

Table 29 shows the blend for the coatings used in this example. The actual coating and drying of the samples was carried out the same as described above. As per the testing profile, the coated sheets were tested for TAPPI Opacity, ISO Opacity as well as scattering and absorption coefficients (See Table 30).

TABLE 29

| Material/Order | Dry Parts | | | |
|---|---|---|---|---|
| of Addition | Control | Condition 1 | Condition 2 | Condition 3 |
| #1 High Brightness Coating Clay | 64.0 | 62.0 | 62.0 | 62.0 |
| Calcined Clay | 8.0 | 8.0 | 8.0 | 8.0 |
| Ground Calcium Carbonate | 24.0 | 24.0 | 24.0 | 24.0 |
| TiO2 | 4.0 | 0.0 | 0.0 | 0.0 |
| Calcium Silicate Hydrate (CSH) | 0.0 | 3.0 | 3.0 | 6.0 |
| SAS & FCA | 0.0 | 3.0 | 0.0 | 0.0 |
| Aragonite S-PCC | 0.0 | 0.0 | 3.0 | 0.0 |
| Total Pigment | 100.0 | 100.0 | 100.0 | 100.0 |
| Latex | 15.5 | 15.5 | 15.5 | 15.5 |
| Total Binder | 15.5 | 15.5 | 15.5 | 15.5 |
| Total Pigment + Binder | 115.5 | 115.5 | 115.5 | 115.5 |

TABLE 30

| | Control | Condition 1 | Condition 2 | Condition 3 |
|---|---|---|---|---|
| TAPPI Opacity | 86.8 | 86.5 | 86.7 | 86.6 |
| % Difference from Control | | −0.4% | −0.2% | −0.3% |
| ISO Opacity | 88.8 | 88.3 | 88.4 | 88.2 |
| % Difference from Control | | −0.6% | −0.5% | −0.7% |
| Scat. Coeff. | 704.3 | 696.4 | 701.4 | 687.9 |
| % Difference from Control | | −1.1% | −0.4% | −2.3% |
| Absorb. Coeff. | 3.6 | 3.2 | 3.2 | 3.3 |
| % Difference from Control | | −11.2% | −10.8% | −9.5% |

Figure 56:
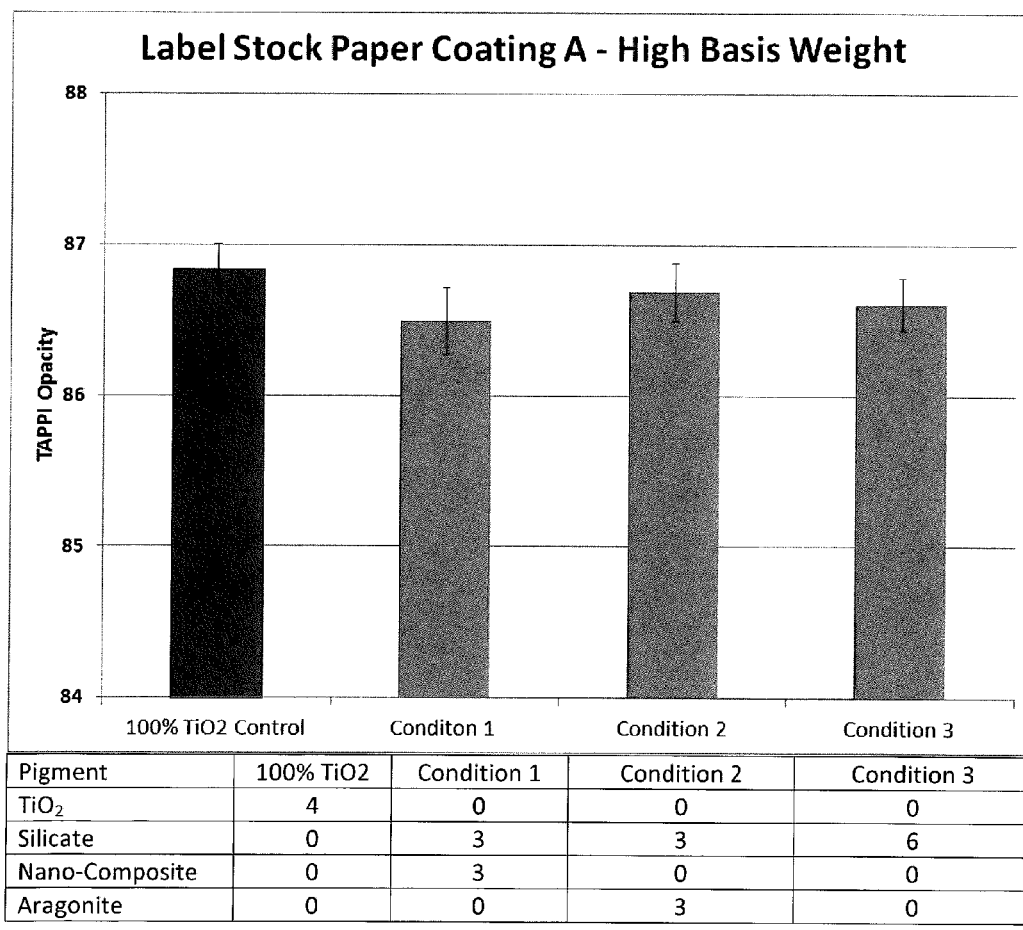
FIG. 56 is a graphical representation of the effect on TAPPI Opacity test results, when all of the conventionally utilized titanium dioxide ($TiO_2$) in a coating used on high basis weight label stock is replaced (i.e., 100% replacement level) by a novel nano-composite (SAS+FCA) as described herein, either by itself (condition 3), or in combination with another silicate product (condition 1), and also as compared to exclusive use of a conventional silicate and aragonite (condition 2).
Figure 57:
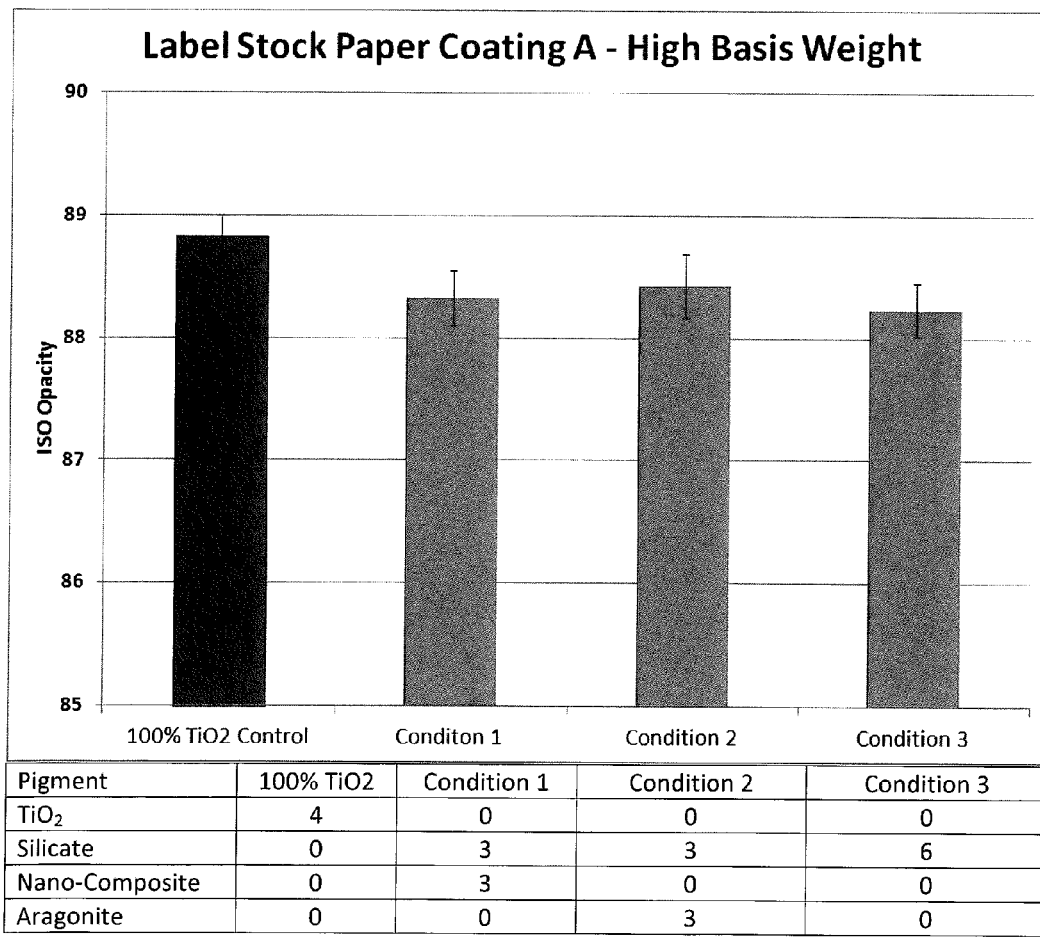
FIG. 57 is a graphical representation of the effect on ISO Opacity test results, when all of the conventionally utilized titanium dioxide ($TiO_2$) in a coating used for high basis weight label stock is replaced (i.e., 100% replacement level) by a novel nano-composite (SAS+FCA) as described herein, either by itself (condition 3), or in combination with another silicate product (condition 1), and also as compared to exclusive use of a conventional silicate and aragonite (condition 2).

Findings:

One finding was that it appears that 100% of the titanium dioxide (TiO$_2$) can be replaced by 6.0 parts of the silicate nano-composite. FIGS. 56 and 57 show the results of TAPPI Opacity and ISO Opacity, respectively.

Example 8—Label Stock, Low Basis Weight, High TiO$_2$ Coating

Example 8 was prepared as set forth in Example 7; however 38 lbs were applied per 3300 square foot of paper, and parts for the different coating pigments were changed, as shown in Table 31. The making of the coating and the testing of the sheets was the same. Table 32 has the results of opacity testing.

TABLE 31

| Material/Order of Addition | Dry Parts | | | |
|---|---|---|---|---|
| | Control | Condition 1 | Condition 2 | Condition 3 |
| #1 High Brightness Coating Clay | 50.0 | 44.0 | 44.0 | 44.0 |
| Calcined Clay | 10.0 | 10.0 | 10.0 | 10.0 |
| Ground Calcium Carbonate | 28.0 | 28.0 | 28.0 | 0.0 |
| TiO2 | 12.0 | 0.0 | 6.0 | 6.0 |
| Calcium Silicate Hydrate (CSH) | 0.0 | 9.0 | 6.0 | 12.0 |
| SAS & FCA | 0.0 | 9.0 | 0.0 | 0.0 |
| Aragonite S-PCC | 0.0 | 0.0 | 6.0 | 28.0 |
| Total Pigment | 100.0 | 100.0 | 100.0 | 100.0 |
| Latex | 16.5 | 16.5 | 16.5 | 16.5 |
| Total Binder | 16.5 | 16.5 | 16.5 | 16.5 |
| Total Pigment + Binder | 116.5 | 116.5 | 116.5 | 116.5 |

TABLE 32

| | Control | Condition 1 | Condition 2 | Condition 3 |
|---|---|---|---|---|
| TAPPI Opacity | 87.9 | 86.6 | 86.9 | 87.8 |
| % Difference from Control | | −1.5% | −1.1% | −0.1% |
| ISO Opacity | 89.5 | 88.6 | 88.5 | 89.3 |
| % Difference from Control | | −1.0% | −1.2% | −0.3% |
| Scat. Coeff. | 797.7 | 731.1 | 651.5 | 694.0 |
| % Difference from Control | | −8.3% | −18.3% | −13.0% |
| Absorb. Coeff. | 4.9 | 5.1 | 4.4 | 4.4 |
| % Difference from Control | | 4.3% | −10.6% | −9.4% |

Figure 58:
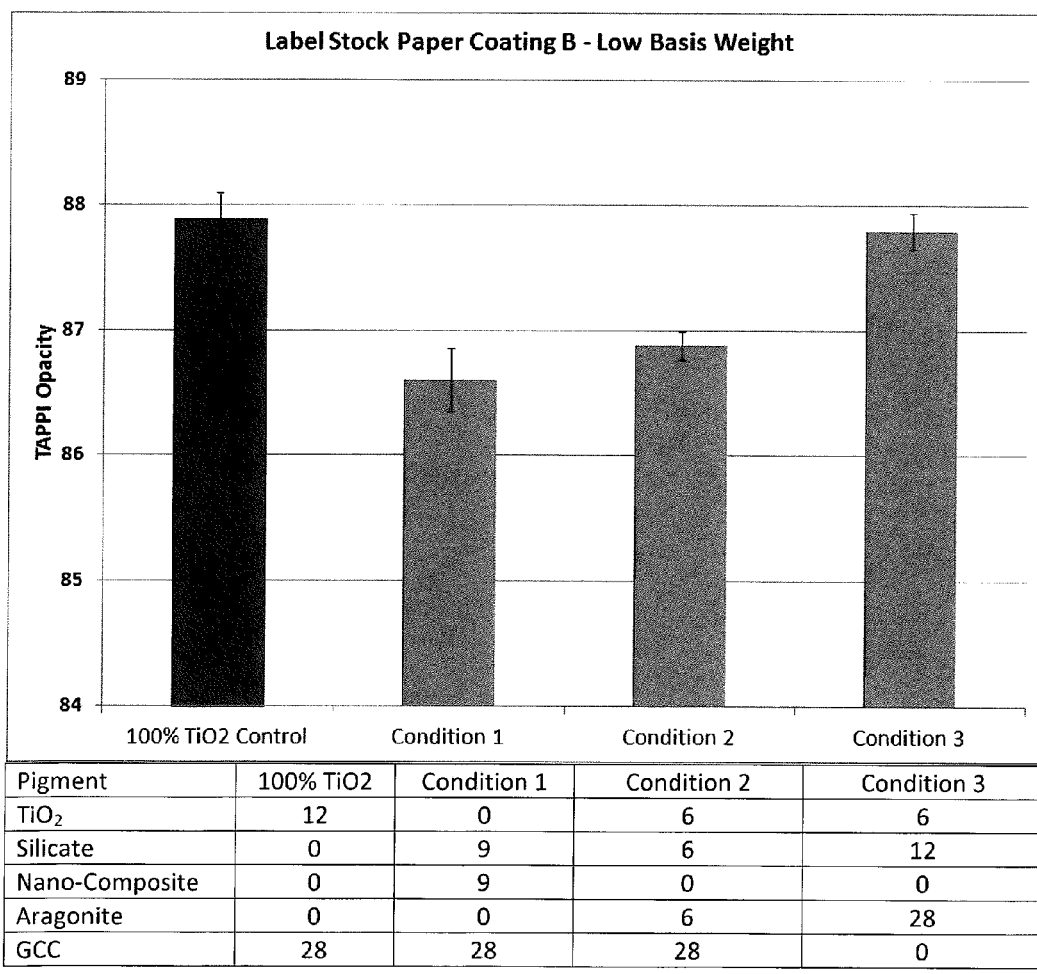
FIG. 58 is a graphical representation of the effect on TAPPI Opacity test results with respect to coating formulations used on label stock, when (a) all of the conventionally utilized titanium dioxide ($TiO_2$) in a coating used for low basis weight label stock is totally replaced (i.e., 100% replacement level) by the combination of a novel nano-composite (SAS+FCA) as described herein with another silicate product and ground calcium carbonate (condition 1), or (b) no nano-composite (SAS+FCA) is used, but titanium dioxide is combined with a conventional silicate product, aragonite, and ground calcium carbonate (condition 2); or (c) no nano-composite (SAS+FCA) is used, but titanium dioxide is combined with a conventional silicate product and aragonite (condition 3).
Figure 59:
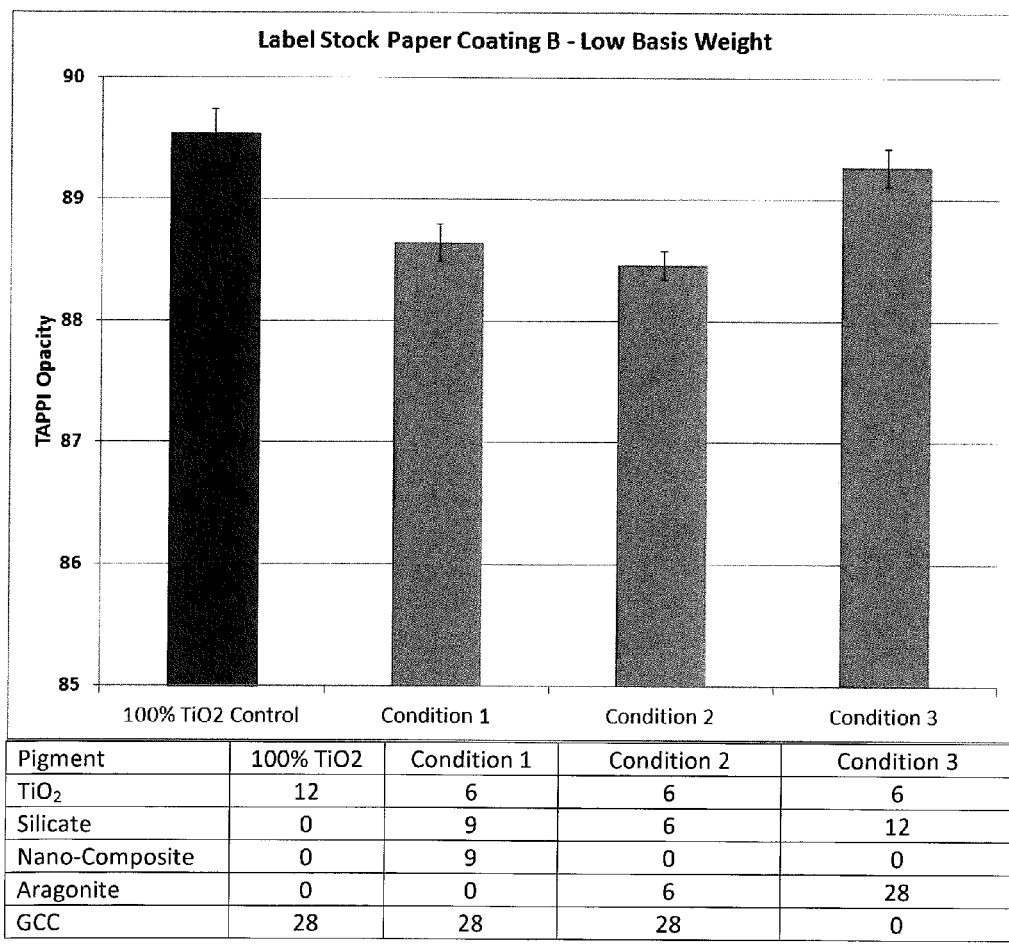
FIG. 59 is a graphical representation of the effect on TAPPI Opacity test results with respect to coating formulations used on label stock, when (a) some of the conventionally utilized titanium dioxide ($TiO_2$) in a coating used for low basis weight label stock is replaced by the combination of a novel nano-composite (SAS+FCA) as described herein with another silicate product and ground calcium carbonate (condition 1), or (b) no nano-composite (SAS+FCA) is used, but titanium dioxide is combined with a conventional silicate product, aragonite, and ground calcium carbonate (condition 2); or (c) no nano-composite (SAS+FCA) is used, but titanium dioxide is combined with a conventional silicate product and aragonite (condition 3).

Findings:

One finding was that 50% of the titanium dioxide (TiO$_2$) may be replaced by 12.0 parts of the silicate nano-composite. FIGS. 58 and 59 show the results of TAPPI Opacity and ISO Opacity, respectively. While the use of just the nano-composite and calcium silicate hydrate did not yield the desired opacity, the data shows that by replacing the GCC with aragonite PCC, it may be possible to replace 50% of the TiO$_2$.

In the foregoing description, numerous details have been set forth in order to provide a thorough understanding of the disclosed exemplary embodiments for providing novel nano-composite materials. However, certain of the described details may not be required in order to provide useful embodiments, or to practice selected or other disclosed embodiments. Further, the description may include, for descriptive purposes, various relative terms such as approximately, about, surface, adjacent, proximity, near, on, onto, and the like. Such usage should not be construed as limiting. Terms that are relative only to a point of reference are not meant to be interpreted as absolute limitations, but are instead included in the foregoing description to facilitate understanding of the various aspects of the disclosed embodiments. Various items in the apparatus and in the method(s) described herein may have been described as multiple discrete items, in turn, in a manner that is most helpful in understanding such aspects and details. However, the order of description should not be construed as to imply that such items or sequence of operations are necessarily order dependent, or that it is imperative to fully complete one step before starting another. For example, the choice of raw materials utilized may depend on a variety of cost and use factors, and such decisions may be different as regards installation particulars amongst various locales for production, or various end users, or various end use products. Further, certain details of manufacture may not need to be performed in the precise or exact order of presentation herein. And, in different embodiments, one or more items may be performed simultaneously, or eliminated in part or in whole while other items may be added. Also, the reader will note that the phrase "an embodiment" has been used repeatedly. This phrase generally does not refer to the same embodiment; however, it may. Finally, the terms "comprising", "having" and "including" should be considered synonymous, unless the context dictates otherwise.

Various aspects and embodiments described and claimed herein may be modified from those shown without materially departing from the novel teachings and advantages provided by the developments described herein, and may be embodied in other specific forms without departing from the spirit or essential characteristics thereof. Embodiments presented herein are to be considered in all respects as illustrative and not restrictive or limiting. This disclosure is intended to cover methods and compositions described herein, and not only structural equivalents thereof, but also equivalent structures. Modifications and variations are possible in light of the above teachings. Therefore, the protection afforded to the developments described herein should be limited only by the claims set forth herein, and the legal equivalents thereof.

The invention claimed is:

1. A coated, calendared, paperboard, comprising:
   (a) one or more layers of kraft pulp;
   (b) a base coating, said base coating comprising a coating composition including
      (1) a nano-composite material, said nano-composite material comprising a fibrous amorphous silica component, said fibrous amorphous silica component provided in three-dimensional haystack or globular configuration that presents a fibrous structure having interstitial spaces between amorphous silica fibers with inner layers and outer layers with irregular interlacing amorphous silica fibers or filaments which are fixed in relation to each other, and a crystalline calcium carbonate component, said crystalline calcium carbonate component comprising aragonite needle structures, said aragonite needle structures arising from said fibrous amorphous silica component, said nano-composite material having a major axis of length L in the range from about 10 microns to about 40 microns and a surface area of from about 40 meters squared per gram to about 200 meters squared per gram;
      (2) clay;
      (3) one or more binders, said one or more binders including a selected latex, and/or including a selected protein.

2. The coated, calendared paperboard as set forth in claim 1, further comprising a top coating, wherein said top coating comprises:
   (1) a nano-composite material, said nano-composite material comprising a fibrous amorphous silica component, said fibrous amorphous silica component provided in three-dimensional haystack or globular configuration that presents a fibrous structure having interstitial spaces between amorphous silica fibers with inner layers and outer layers with irregular interlacing amorphous silica fibers or filaments which are fixed in relation to each other, and a crystalline calcium carbonate component, said crystalline calcium carbonate component comprising aragonite needle structures, said aragonite needle structures arising from said fibrous amorphous silica component, said nano-composite material having a major axis of length L in the range from about 10 microns to about 40 microns and a surface area of from about 40 meters squared per gram to about 200 meters squared per gram;
   (2) clay;
   (3) one or more binders, said one or more binders including a selected latex, and/or including a selected protein.

3. The coated, calendared paperboard as set forth in claim 1, wherein said kraft pulp comprises unbleached kraft pulp.

4. The coated, calendared paperboard as set forth in claim 2, wherein said paperboard has an IGT Pick of at least 100.

5. The coated, calendared paperboard as set forth in claim 2, wherein said paperboard has an IGT Blister of least 92.

6. The coated, coated, calendared paperboard as set forth in claim 2, wherein said paperboard has an AGT Appearance of at least 8.

7. The coated, calendared paperboard as set forth in claim 2, wherein said paperboard has an ISO Opacity of at least 88.0.

8. The coated, calendared paperboard as set forth in claim 2, wherein said paperboard has a Tappi Opacity of at least 86.0.

9. Paper, comprising paper, paperboard, or label stock, and a coating composition, said coating composition comprising:
   (a) a nano-composite material, said nano-composite material comprising a fibrous amorphous silica component, said fibrous amorphous silica component provided in three-dimensional haystack or globular configuration that presents a fibrous structure having interstitial spaces between amorphous silica fibers with inner layers and outer layers with irregular interlacing amorphous silica fibers or filaments which are fixed in relation to each other, and a crystalline calcium carbonate component, said crystalline calcium carbonate component comprising aragonite needle structures, said aragonite needle structures arising from said fibrous amorphous silica component, said nano-composite material having a major axis of length L in the range from about 10 microns to about 40 microns and a surface area of from about 40 meters squared per gram to about 200 meters squared per gram;
   (b) clay;
   (c) one or more binders, said one or more binders including a selected latex, and/or including a selected protein;
   (d) said coating composition, after mixing, passing through a screen of selected size.

10. Paper, comprising paper, paperboard, or label stock, and a coating composition, said coating composition comprising:
- (a) a nano-composite material said nano-composite material comprising a fibrous amorphous silica component, said fibrous amorphous silica component provided in three-dimensional haystack or globular configuration that presents a fibrous structure having interstitial spaces between amorphous silica fibers with inner layers and outer layers with irregular interlacing amorphous silica fibers or filaments which are fixed in relation to each other, and a crystalline calcium carbonate component, said crystalline calcium carbonate component comprising aragonite needle structures, said aragonite needle structures arising from said fibrous amorphous silica component, said nano-composite material having a major axis of length L in the range from about 10 microns to about 40 microns and a surface area of from about 40 meters squared per gram to about 200 meters squared per gram;
- (b) clay;
- (c) one or more binders, said one or more binders including a selected latex, and/or including a selected protein;
- (d) said coating composition, after mixing, passing through a screen of selected size.

* * * * *